US010817572B2

(12) United States Patent
Spataro et al.

(10) Patent No.: US 10,817,572 B2
(45) **Date of Patent: *Oct. 27, 2020**

(54) SYSTEMS AND METHODS FOR PROVIDING ACCESS TO OBJECTS AND SEARCHABLE ATTRIBUTES OF OBJECTS IN A COLLABORATION PLACE

(71) Applicant: Open Text SA ULC, Halifax (CA)

(72) Inventors: Jared M. Spataro, Issaquah, WA (US); Cornelia A. West, Columbus, OH (US); David Glazer, Woodside, CA (US); Ronald E. Schneider, Northbrook, IL (US)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,408

(22) Filed: Sep. 24, 2018

(65) Prior Publication Data

US 2019/0026269 A1 Jan. 24, 2019

Related U.S. Application Data

(63) Continuation of application No. 14/218,143, filed on Mar. 18, 2014, now Pat. No. 10,108,613, which is a (Continued)

(51) Int. Cl.

| | |
|---|---|
| ***G06F 13/00*** | (2006.01) |
| ***G06F 16/93*** | (2019.01) |
| ***G06Q 10/10*** | (2012.01) |

(52) U.S. Cl.

CPC ............ *G06F 16/93* (2019.01); *G06Q 10/10* (2013.01)

(58) Field of Classification Search

CPC ........ G06Q 10/06; G06Q 10/10; G06F 13/00; G06F 16/90; G06F 16/93; G06F 17/3089; (Continued)

(56) References Cited

U.S. PATENT DOCUMENTS

| | | | |
|---|---|---|---|
| 5,107,443 | A | 4/1992 | Smith et al. |
| 5,208,912 | A | 5/1993 | Nakayama et al. |

(Continued)

FOREIGN PATENT DOCUMENTS

| | | | |
|---|---|---|---|
| CA | 2221026 | A | 4/1999 |
| CA | 2221790 | | 5/1999 |

(Continued)

OTHER PUBLICATIONS

Office Action for U.S. Appl. No. 15/694,548, dated Jun. 24, 2019, 6 pgs.

(Continued)

*Primary Examiner* — Robert B Harrell

(74) *Attorney, Agent, or Firm* — Sprinkle IP Law Group

(57) ABSTRACT

In some embodiments, the disclosed systems and methods provide a client-server infrastructure capable of supporting a variety of asynchronous and synchronous collaboration activities in a so-called collaboration place. Some of these activities include chatting, viewing and/or editing one or more data files, and sharing one or more applications, data files, and/or displays. The client-server infrastructure supports seamless navigation between the supported asynchronous and synchronous activities in the collaboration place. Additionally, the client-server architecture supports data persistence, so that data files associated with the collaboration place can be stored for subsequent access.

20 Claims, 43 Drawing Sheets

Related U.S. Application Data continuation of application No. 13/155,927, filed on Jun. 8, 2011, now Pat. No. 8,713,106, which is a continuation of application No. 12/754,039, filed on Apr. 5, 2010, now abandoned, which is a continuation of application No. 10/989,294, filed on Nov. 15, 2004, now Pat. No. 7,702,730.

(60) Provisional application No. 60/607,388, filed on Sep. 3, 2004.

(58) Field of Classification Search
CPC ......... G06F 17/30011; G06F 17/30867; G06F 17/30; G05B 15/02; G05B 19/042; G05B 19/409; G05B 19/0426; G05B 2219/25428; H04L 12/581; H04L 12/1822; H04L 29/06; H04L 29/06027; H04L 29/06034; H04L 29/08072
USPC ..................... 707/608; 700/83; 709/204, 205
See application file for complete search history.

(56) References Cited

U.S. PATENT DOCUMENTS 5,251,294 A 10/1993 Abelow
5,315,711 A 5/1994 Barone et al.
5,333,152 A 7/1994 Wilber
5,353,398 A 10/1994 Kitahara et al.
5,392,400 A 2/1995 Berkowitz et al.
5,432,934 A 7/1995 Levin et al.
5,442,788 A 8/1995 Bier
5,471,318 A 11/1995 Ahuja et al.
5,488,686 A 1/1996 Murphy et al.
5,548,506 A 8/1996 Srinivasan
5,555,375 A 9/1996 Sudama et al.
5,557,726 A 9/1996 Yoshizawa
5,572,643 A 11/1996 Judson
5,581,702 A 12/1996 McArdle et al.
5,606,693 A 2/1997 Nilsen et al.
5,649,104 A 7/1997 Carleton et al.
5,721,763 A 2/1998 Joseph et al.
5,724,508 A 3/1998 Harple et al.
5,742,768 A 4/1998 Gennaro et al.
5,781,909 A 7/1998 Logan et al.
5,787,175 A 7/1998 Carter
5,790,785 A 8/1998 Klug et al.
5,790,790 A 8/1998 Smith et al.
5,793,365 A 8/1998 Tang et al.
5,793,972 A 8/1998 Shane
5,805,809 A 9/1998 Singh et al.
5,809,242 A 9/1998 Shaw et al.
5,815,657 A 9/1998 Williams et al.
5,822,525 A 10/1998 Tafoya et al.
5,826,265 A 10/1998 Van Huben et al.
5,845,067 A 12/1998 Porter et al.
5,848,412 A 12/1998 Rowland et al.
5,859,974 A 1/1999 McArdle et al.
5,861,883 A 1/1999 Cuomo et al.
5,867,653 A 2/1999 Ares et al.
5,884,032 A 3/1999 Bateman et al.
5,884,038 A 3/1999 Kapoor
5,889,945 A 3/1999 Porter et al.
5,889,952 A 3/1999 Hunnicutt et al.
5,892,905 A 4/1999 Brandt et al.
5,940,082 A 8/1999 Brinegar et al.
5,940,834 A 8/1999 Pinard et al.
5,974,446 A 10/1999 Sonnenreich et al.
5,978,836 A 11/1999 Ouch
5,987,140 A 11/1999 Rowney et al.
5,991,810 A 11/1999 Shapiro et al.
5,996,003 A 11/1999 Namikata et al.
6,026,433 A 2/2000 D'Arlach et al.
6,052,785 A 4/2000 Lin et al.
6,057,841 A 5/2000 Thurlow et al.
6,073,112 A 6/2000 Geerlings
6,073,142 A 6/2000 Geiger et al.
6,085,192 A 7/2000 Mendez et al.
6,085,324 A 7/2000 Ogram
6,101,508 A 8/2000 Wolff
6,115,709 A 9/2000 Gilmour et al.
6,119,151 A 9/2000 Cantrell et al.
6,161,149 A 12/2000 Achacoso
6,167,432 A 12/2000 Jiang
6,167,435 A 12/2000 Druckenmiller et al.
6,175,842 B1 1/2001 Kirk et al.
6,182,273 B1 1/2001 Tarumi
6,185,603 B1 2/2001 Henderson et al.
6,199,116 B1 3/2001 May et al.
6,223,177 B1 4/2001 Tatham et al.
6,233,600 B1 5/2001 Salas et al.
6,237,025 B1 5/2001 Ludwig et al.
6,240,444 B1 5/2001 Fin et al.
6,286,034 B1 9/2001 Sato et al.
6,292,830 B1 9/2001 Taylor et al.
6,336,134 B1 1/2002 Varma
6,378,001 B1 4/2002 Aditham et al.
6,426,769 B1 7/2002 Ludwig
6,463,460 B1 10/2002 Simonoff
6,493,001 B1 12/2002 Takagi et al.
6,563,914 B2 5/2003 Sammon et al.
6,629,129 B1 9/2003 Bookspan et al.
6,662,210 B1 12/2003 Carleton et al.
6,724,373 B1 4/2004 O'Neill et al.
6,748,421 B1 6/2004 Ozkan et al.
6,766,356 B1 7/2004 Krautter
6,868,395 B1 3/2005 Szlam et al.
6,917,962 B1 7/2005 Cannata et al.
6,973,618 B2 12/2005 Shaughnessy et al.
6,981,223 B2 12/2005 Becker et al.
7,031,954 B1 4/2006 Kirsch
7,043,529 B1 5/2006 Simonoff
7,062,532 B1 6/2006 Sweat et al.
7,143,357 B1 11/2006 Snibbe et al.
7,209,948 B2 4/2007 Srinivasa
7,249,157 B2 7/2007 Stewart et al.
7,269,411 B2 9/2007 Corman et al.
7,287,055 B2 10/2007 Cannata et al.
7,299,258 B2 11/2007 Smith et al.
7,320,018 B2 1/2008 Cannata et al.
7,346,491 B2 3/2008 Kanagasabai
7,523,162 B2 4/2009 Cannata et al.
7,523,385 B2 4/2009 Nguyen et al.
7,590,665 B2 9/2009 Thomas et al.
7,620,902 B2 11/2009 Manion et al.
7,627,810 B2 12/2009 Glazer et al.
7,669,123 B2 2/2010 Zuckerberg et al.
7,672,995 B2 3/2010 Balasubramanyan et al.
7,680,882 B2 3/2010 Tiu, Jr. et al.
7,702,730 B2 4/2010 Spataro et al.
7,707,249 B2 4/2010 Spataro et al.
7,725,492 B2 5/2010 Sittig et al.
7,734,694 B2 6/2010 Cannata et al.
7,756,824 B2 7/2010 Campbell et al.
7,797,274 B2 9/2010 Strathearn et al.
8,176,122 B2 5/2012 Smith et al.
8,412,776 B2 4/2013 Smith et al.
8,464,206 B2 6/2013 Jenkins
8,484,292 B2 7/2013 Spataro et al.
8,713,106 B2 4/2014 Spataro et al.
8,739,017 B2 5/2014 Glazer
8,856,237 B2 10/2014 Spataro et al.
8,880,461 B2 11/2014 Jenkins
10,108,613 B2 10/2018 Spataro et al.
2002/0026478 A1 2/2002 Rodgers et al.
2002/0075305 A1 6/2002 Beaton et al.
2002/0156808 A1 10/2002 Duffy et al.
2003/0097408 A1 5/2003 Kageyama et al.
2004/0081951 A1 4/2004 Vigue et al.
2004/0100497 A1 5/2004 Quillen et al.
2004/0103156 A1 5/2004 Quillen et al.
2004/0128312 A1 7/2004 Shalabi et al.
2004/0143630 A1 7/2004 Kaufmann et al.
2004/0174392 A1 9/2004 Bjoernsen et al.
2004/0181796 A1 9/2004 Fedotov et al.

(56) References Cited

U.S. PATENT DOCUMENTS

2004/0252123 A1 12/2004 Estrada et al.
2005/0010640 A1 1/2005 Cannata et al.
2005/0010874 A1 1/2005 Moder et al.
2005/0021624 A1 1/2005 Herf et al.
2005/0064858 A1 3/2005 Makela et al.
2005/0084087 A1 4/2005 Rajagopalan et al.
2005/0086309 A1 4/2005 Galli et al.
2005/0114475 A1 5/2005 Chang et al.
2005/0160396 A1 7/2005 Chadzynski
2005/0235034 A1 10/2005 Chen et al.
2006/0053194 A1 3/2006 Schneider et al.
2006/0053195 A1 3/2006 Schneider et al.
2006/0080432 A1 4/2006 Spataro et al.
2006/0205518 A1 9/2006 Malabuyo et al.
2007/0186157 A1 8/2007 Walker et al.
2007/0266011 A1 11/2007 Rohrs et al.
2008/0005196 A1 1/2008 Beck
2008/0065701 A1 3/2008 Lindstrom et al.
2009/0037277 A1 2/2009 Zuckerberg et al.
2009/0049525 A1 2/2009 D'Angelo et al.
2009/0070412 A1 3/2009 D'Angelo et al.
2009/0094224 A1 4/2009 Ricket et al.
2009/0112937 A1 4/2009 Campbell et al.
2009/0144392 A1 6/2009 Wang et al.
2009/0157608 A1 6/2009 Strathearn et al.
2009/0182589 A1 7/2009 Kendall et al.
2009/0182763 A1 7/2009 Hawking
2009/0234813 A1 9/2009 Gutlapalli et al.
2009/0249446 A1 10/2009 Jenkins et al.
2009/0254422 A1 10/2009 Jenkins et al.
2009/0265634 A1 10/2009 Beringer et al.
2009/0327848 A1 12/2009 Glazer et al.
2010/0057679 A1 3/2010 King et al.
2010/0094848 A1 4/2010 Reddy et al.
2010/0162375 A1 6/2010 Tiu, Jr. et al.
2010/0192070 A1 7/2010 Peckelbeen
2010/0235396 A1 9/2010 Chaurasia et al.
2010/0241972 A1 9/2010 Spataro et al.
2011/0238650 A1 9/2011 Jenkins
2011/0239134 A1 9/2011 Spataro et al.
2011/0246444 A1 10/2011 Jenkins
2011/0252093 A1 10/2011 Spataro et al.
2013/0167042 A1 6/2013 Smith et al.
2013/0275885 A1 10/2013 Spataro et al.
2018/0011848 A1 1/2018 Spataro et al.

FOREIGN PATENT DOCUMENTS

EP 0616448 A2 9/1994
WO WO 02/19128 A1 3/2002

OTHER PUBLICATIONS

Summons to Attend Oral Proceedings in European Patent Application No. 11192422.1, dated Feb. 26, 2019, 12 pgs.

Summons to Attend Oral Proceedings in European Patent Application No. 11192410.6, dated Feb. 28, 2019, 70 pgs.

Summons to Attend Oral Proceedings in European Patent Application No. 11192424.7, dated Mar. 2, 2019, 11 pgs.

Office Action for U.S. Appl. No. 13/762,959, dated May 7, 2019, 29 pgs.

ETSI Technical Report, Multimedia applications and services; Inband and Outband Signalling Protocols; A Survey, European Telecommunications Standards Institute, Valbonne, FR, ETR 227, (Source: ETSI-TC-TE), Nov. 1995, 75 pgs.

Ackerman et al., "Answer Garden 2: Merging Organizational Memory with Collaborative Help," Proceedings of the 1996 ACM Conference on Computer Supported Cooperative Work, Boston, Massachusetts, pp. 97-105, 1996.

Ackerman et al., "Collaborative Support for Informal Information in Collective Memory Systems," Information Systems Frontiers, 2(3/4):333-347, 2000.

Chalfant et al., "Raindance Meeting Edition 1.0 and eMeetings." Inside Collaboration Newsletter, vol. III, Issue 3, Mar. 2004.

Erickson et al., "Social Translucence: Designing Social Infrastructures that Make Collective Activity Visible," Communications of the ACM, vol. 45, Issue 4, Apr. 2002.

Greenfield, "Web Conferencing Comes Together—Servers or services? New Web conferencing products let IT have the best of both worlds," Network Magazine, Sep. 2004, 6 pgs.

Roseman et al., "TeamRooms: Network Places for Collaboration," Proceedings of the 1996 ACM Conference on Computer Supported Cooperative Work, Boston, Massachusetts, pp. 325-333, 1996.

Raindance Meeting Edition: Full Review, http://www.pcmag.com/article2/0,1759,1596059,00.asp, pp. 1-5, May 20, 2004.

"Impact of IM and Presence on Core Business Processes," eDial, Inc., pp. 1-5, Nov. 2003.

"eDial Advanced Communications Server," Carrier-grade Feature Server for Telephony and Collaboration, eDial, Inc., Jul. 2004, 2 pgs.

"Alcatel 8628 Multimedia Instant Conferencing (MMIC)," Release 4.0, Alcatel-Lucent, Dec. 2006, 2 pgs.

"EDial Instant Collaboration System: Transform collaboration into a pervasive productivity tool," eDial, Inc., Oct. 2004, 4 pgs.

"A Web Conferencing Primer," The Business Consumer's Advisor, vol. 39, No. 4, Apr. 2003, 8 pgs.

"Collaboration: The Next Big Thing in Enterprise Software?" The Gilbane Report, vol. 12, No. 3, pp. 1-28, Apr. 2004.

"Pushing the Blogging Envelope: Better, Faster, Simpler, Free, My Blog Functionality Scorecard," May 10, 2004.

Lotus.software, "Lotus QuickPlace 3.0 Deployment Guide," IBM, pp. 1-82, published 2002.

Lotus.software, "Lotus QuickPlace 3.0 Installation and Upgrade Guide," IBM, pp. 1-33, published 2002.

Office Action for U.S. Appl. No. 10/989,294, dated Mar. 5, 2007, 9 pgs.

Office Action for U.S. Appl. No. 10/989,294, dated Nov. 27, 2007, 10 pgs.

Office Action for U.S. Appl. No. 10/989,294, dated Jun. 27, 2008, 11 pgs.

Office Action for U.S. Appl. No. 10/989,294, dated Mar. 16, 2009, 16 pgs.

Office Action for U.S. Appl. No. 12/754,024, dated Sep. 16, 2011, 8 pgs.

Office Action for U.S. Appl. No. 12/754,024, dated Jul. 18, 2012, 9 pgs.

Office Action for U.S. Appl. No. 12/754,039, dated Sep. 29, 2011, 8 pgs.

Office Action for U.S. Appl. No. 12/754,039, dated Jul. 30, 2012, 11 pgs.

Office Action for U.S. Appl. No. 13/155,287, dated Mar. 22, 2012, 6 pgs.

Office Action for U.S. Appl. No. 13/155,287, dated Sep. 26, 2012, 9 pgs.

Office Action for U.S. Appl. No. 13/155,852, dated Dec. 23, 2011, 8 pgs.

Office Action for U.S. Appl. No. 13/155,852, dated Jan. 17, 2013, 8 pgs.

Office Action for U.S. Appl. No. 13/155,875, dated Mar. 28, 2012, 7 pgs.

Office Action for U.S. Appl. No. 13/155,875, dated May 9, 2013, 10 pgs.

Office Action for U.S. Appl. No. 13/155,927, dated Feb. 22, 2012, 8 pgs.

Office Action for U.S. Appl. No. 13/155,927, dated May 7, 2013, 7 pgs.

Livelink Intranet Tutorial, Evaluation Kit, Version 7.0, Oct. 1996, 59 pgs.

Livelink Intranet, Web Client, User's Guide, Software Version 7.1, 1996, 202 pgs.

Livelink Client and System, Administrator's Guide, Document Revision 7.1b, Jan. 1997, 98 pgs.

Livelink Intranet Client and System, Administrator's Guide, Document Revision 7.1d, 1997, 162 pgs.

(56) References Cited

OTHER PUBLICATIONS

Livelink Intranet Suite, Installation Guide, Opentext Intranet, 10-User Version, Aug. 1997, 116 pgs.
Livelink Intranet Suite, Version 7.3, Release Notes, Nov. 24, 1997, 10 pgs.
Livelink Intranet, Livelink Change Agents™, Notification, User's Guide, Livelink Change Agents Notification 7.3, Feature for Users, Notification Interests, 1997, 32 pgs.
Livelink Intranet Web Client, Quick Start, This guide introduces the key functions of the Livelink Intranet Suite, 1997, 113 pgs.
Livelink Intranet Suite, 10 User Netscape Bundle Version 7.1. 3,Release Notes, Jul. 31, 1997, 4 pgs.
Livelink Intranet Server and Search, Overview of Livelink Intranet Suite, Installation Guide, 1997, 93 pgs.
Livelink Intranet Server and Search, Installation Guide, Document Version 71b, Feb. 1997, 44 pgs.
Livelink Intranet Suite, Tour Guide, 10-User Version, Aug. 1997, 29 pgs.
Livelink Intranet Developer's Guide, Web Client, 1997, 466 pgs.
Livelink™ Intranet, Product Data Sheet, 1997, 4 pgs.
Livelink, We Click& Find, Search Spider, Knowledge From the Internet Data Haystack, 1997, 2 pgs.
Open Text Livelink Intranet Suite,V7.1b2sgi Release Notes, Feb. 14, 1997, 8 pgs.
Open Text Livelink Intranet Suite,V7.1 Release Notes, Notices for Livelink 7.1 Release, Differences Between Livelink 7.0 and Livelink 7.1 Releases, Jan. 24, 1997, 8 pgs.
Open Text Livelink Intranet Suite,V7.1.1 Release Notes, Notices for Livelink 7.1.1 Release, Jan. 31, 1997, 8 pgs.
Livelink Intranet Suite,Version 7.2, Release Notes, Notes on Livelink Intranet Suite Version 7.2, Jul. 2, 1997, 11 pgs.
Livelink Intranet Suite,Version 7.2.1, Release Notes, Notes on Livelink Intranet Suite Version 7.2.x, Aug. 8, 1997, 12 pgs.
Livelink Intranet Suite, Version 7.2.1, Release Notes, Notes on Livelink Intranet Suite Version 7.2.x, Aug. 22, 1997, 12 pgs.
Warranty and Special Provisions for Australia, New Zealand, or Papua New Guinea Express Limited Warranty, Nov. 1997, 233 pgs.
Warranty and Special Provisions for Australia, New Zealand, or Papua New Guinea, Express Limited Warranty, Nov. 1997, 149 pgs.
Accessing the File Walker Specific Info Page, to open the Specific Info page For a File Walker process, Creating Slices, Administering Data Flow and Processes, (113 pgs.)1998.
Livelink Forms, and Livereports Administrator's Guide Livelink 8.0.0: , Opentext Intranet, 1998, 62 pgs. (Warranty and Special Provisions for Australia, New Zealand, or Papua New Guinea).
Livelink, Putting Knowledge to Work™, Frequently Asked Questions, May 11, 1998, 14 pgs.
Livelink Module Development Guide, Opentext Intranet, 1998, 178 pgs.
Livelink 8 Quickstart, Opentext Livelink, 1998, 108 pgs.
Livelink Intranet Suite, Version 7.3, Release Notes, Notes on Livelink Intranet Suite Version 7.3, Mar. 11, 1998, 9 pgs.
Livelink Intranet Version 8.0.1, Release Notes, Oct. 14, 1998, 6 pgs.
Livelink Intranet, Version 8.0.2 , Release Notes, Nov. 30, 1998, 6 pgs.
Livelink Sdk Version 8.0.1, Release Notes, Sep. 25, 1998, 2 pgs.
Livelink Sdk Version 8.0.2, Release Notes, Nov. 4, 1998, 2 pgs.
Livelink Version 8.1.2, Release Notes, New Features in Livelink 8.1, Apr. 22, 1999, 8 pgs.
Livelink Version 8.0.2, Release Notes, Nov. 24, 1998, 6 pgs.
Livelink Intranet Version 8.0, Release Notes, Jun. 1, 1998, 5 pgs.
Livelink Version 8.0.2, Release Notes, Nov. 12, 1998 5 pgs.
Abbreviated Installation Instructions for Experienced Livelink Administrators, Open Text Corporation, 1999, 66 pgs.
Livelink Administration: Introduction to Livelink, Background Info, Open Text, Inc., 1999, 167 pgs.
Livelink Help, Channels and News, Open Text, Inc., 1999, 21 pgs.
Livelink Help, Discussions, Open Text, Inc., 1999, 8 pgs.
Livelink Help, Glossary, Open Text, Inc., 1999, 13 pgs.
Livelink Help, Personal Workspace, Open Text, Inc., 1999, 14 pgs.
Livelink, Installation Guide, Open Text Corporation, 1999, 212 pgs.
Livelink, Putting Knowledge to Work™, Api Developer's Reference, Warranty and Special Provisions for Australia, New Zealand or Papua New Guinea, Express Limited Warranty, Open Text Corporation 1999, 544 pgs.
Livelink, Collaborative Commerce, Business Is a Conversation in the Conversation Join™, Open Text Enterprise Solutions, Open Text Corporation, 1999, 2 pgs.
Livelink® 9.0 Feature Preview, Open Text Corporation, Jun. 13, 2000, 15 pgs.
Livelink® 9.0.0 New Feature List, Open Text Corporation, Oct. 2000, 16 pgs.
Livelink Help, Projects, Open Text, Inc., 1999, 18 pgs.
Livelink QuickStart for Users, Open Text Corporation, 1999, 96 pgs.
Livelink Help, LiveReports, Projects, Open Text, Inc., 1999, 20 pgs.
Livelink Help, TasksLists, Projects, Open Text, Inc., 1999, 5 pgs.
Livelink Help, Using Online Help, Projects, Open Text, Inc., 1999, 73 pgs.
Livelink Help, Livelink Explorer, Projects, Open Text, Inc., 1999, 16 pgs.
Livelink Help, Change Agents Overview, Open Text, Inc., 1999, 10 pgs.
Livelink Help, Search, Open Text, Inc., 1999, 31 pgs.
Livelink Livelink Help, Users and Groups, Open Text, Inc., 1999, 13 pgs.
Livelink Help, Create a Workflow Map, Open Text, Inc., 1999, 38 pgs.
Livelink Help, Workflow Overview, Open Text, Inc., 1999, 22 pgs.
Livelink Version 8.1.3, Release Notes, New Features in Livelink 8.1.3, Jun. 18, 1999, 14 pgs.
Livelink Version 8.1.5, Release Notes, New Features in Livelink 8.1.5, Dec. 2, 1999, 20 pgs.
Livelink Condensed Installation Guide for Experienced Livelink Administrators, Open Text Corporation, 2000, 57 pgs.
Livelink 9.0.0 Product Summary, Oct. 2000, 57 pgs.
MyLivelink Installation and Administration Guide, Create your own space, Open Text Corporation, 2000, 100 pgs.
MyLivelink Version 1.0, Release Notes, Mar. 31, 2000, 3 pgs.
Livelink QuickStart for Users, Open Text Corporation, 2000, 76 pgs.
67. Livelink™ Version 8.1.6 Release Notes, New Features in Livelink 8.1.6, Nov. 28, 2000, 27 pgs.
Data Sheet Livelink, Directory Servces™, Open Text Enterprise Solutions, Open Text Corporation, 2000, 2 pgs.
Data Sheet Livelink, Livelink eLink™, Open Text Enterprise Solutions, Open Text Corporation, 2000, 2 pgs.
Data Sheet Livelink, Livelink Explorer™, Open Text Enterprise Solutions, Open Text Corporation, 2000, 2 pgs.
Data Sheet Livelink, Livelink Offline™ for Livelink users on the go, Open Text Enterprise Solutions, Open Text Corporation, 2000, 2 pgs.
Data Sheet Livelink, Livelink OnTime®, Open Text Enterprise Solutions, Open Text Corporation, 2000, 2 pgs.
Data Sheet Livelink, Livelink PDF Forms™, An e-Forms Solution for Livelink, Open Text Enterprise Solutions, Open Text Corporation, 2000, 2 pgs.
Data Sheet Livelink, Livelink Prospectors™, Open Text Enterprise Solutions, Open Text Corporation, 2000, 2 pgs.
Data Sheet Livelink, Livelink Remote Cache™, Open Text Enterprise Solutions, Open Text Corporation, 2000, 2 pgs.
Data Sheet Livelink, Livelink®, Transit Central®, e-Publisher™, Open Text Enterprise Solutions, Open Text Corporation, 2000, 2 pgs.
Data Sheet Livelink, Livelink PDF Forms Professional™, An enhanced forms solution for Livelink, Open Text Enterprise Solutions, Open Text Corporation, 2000, 2 pgs.
Data Sheet Livelink, myLivelink™, Open Text Enterprise Solutions, Open Text Corporation, 2000, 2 pgs.
Livelink™ 8.1.5 Service Pack 1, Release Notes, Apr. 20, 2000, 2 pgs.
Livelink Version 8.1.5, Release Notes, New Features in Livelink 8.1.5, Jan. 20, 2000, 21 pgs.

(56) References Cited

OTHER PUBLICATIONS

Livelink Intranet, Chapter One, Overview of Livelink Intranet, Livelink Intranet Modules, Installation Guide, 5 pgs, undated.
Livelink Intranet, Chapter Two, Getting Started, Contents of the Livelink 7.2 CD-ROM Contents, Installation Guide, 8 pgs, undated.
Livelink Intranet, Chapter Three, Installing Livelink Intranet on Windows NT, Installation Guide, 90 pgs, undated.
Livelink Intranet, Chapter Four, Installing Livelink Intranet on Unix, Installation Guide, 68 pgs, undated.
Livelink Intranet, Chapter Five, Upgrading the Livelink Search and Livelink Spider Modules, Installation Guide, 4 pgs, undated.
Livelink Intranet, Chapter Six, Installing and Configuring Client-Side Software, RDBMS Client-Side Software Requirements, Installation Guide 28 pgs, undated.
Livelink, Chapter One, Overview of Livelink Intranet, Livelink Installation Guide, 6 pgs, undated.
Livelink, Chapter Two, Getting Started, System Requirements, Livelink Installation Guide, 8 pgs, undated.
Livelink, Chapter Three, Installing Livelink Intranet on Windows NT, Installation Overview, Livelink Installation Guide, 8 pgs, undated.
Livelink Chapter Four, Installing Livelink Intranet on Unix, Installation Overview, Livelink Installation Guide, 74 pgs, undated.
Livelink, Chapter Five, Completing the Installation and Setup of Livelink Intranet, Installing Modules, Livelink Installation Guide, 28 pgs, undated.
Livelink, Chapter Six, Tasks to Perform After an Upgrade Installation, Uninstalling a Previous Version of Livelink Intranet, Livelink Installation Guide, 14 pgs, undated.
Livelink, Chapter Seven, Installing, Uninstalling, and Upgrading Modules, Installing New Modules, Livelink Installation Guide, 8 pgs, undated.
General OneFile, Henry Bortman, Share and share alike, MacUser. 5.2 (Feb. 1989) p. 251 (http://0.galegroup.com.books.kpl.org/...sition=21&contentSet=GALE%7CA723-0937&&docId=GALE|A7230937&docType=GALE&role=[Jul. 3, 2012 2:42:53 PM], 2 sheets.
Steve Hannaford, Dow Jones, More Newspaper Slots for Mac. (Use of Macintoshes in Newspaper Industry) MacWEEK, Sep. 19, 1989, ©2013 Factiva, Inc., 3 pgs.
Susan Janus, Odesta tools streamline proposal process, PC Week. 6.43 (Oct. 30, 1989) p. 97. http://0-go.galegroup.com.books.kpl.org/...sition=19&contentSet=GALE%7CA7-832438&&docId=GALE|A7832438&docType=GALE&role= [Jul. 3, 2012 2:40:47 PM].
Stuart Silverstone, Dow Jones, U.S. Newspapers Try Desktop Experiments, MacWEEK, Macw, Feb. 28, 1989, © 2013 Factiva, Inc., 2 pgs.
Dartanyan L. Brown, Odesta Enhances Vax-Based ODMS, Readies Version for Mac Servers. (Odesta Corp.'s ODMS Release 2 and ODMS/Matrix, Odesta Document Management System) MacWEEK, MACW, Jan. 27, 1992, ©2013 Factiva, Inc., 2 pgs.
Michael Roney, Dow Jones, Workgroup publishing. (guide to workgroup publishing systems) (Software Review) (Techniques—column)(includes related article on add-ins for Quark XPress) (Evaluation), Feb. 1, 1992, MacUser, MACU 211, vol. 8, No. 2, ISSN: 0884-0997, ©2013 Factiva, Inc. , 8 pgs.
General OneFile, Dartanyan L. Brown, Odesta Systems opens up ODMS work-flow, Product, MacWEEK. 6.16 (Apr. 20, 1992): p. 9. http://0-go.galegroup.com.books.kpl.org/...&contentSegment=&searchType=Ba-sicSearchForm¤tPosition=11&contentSet=GALE%7CA12161397&&docId=GALE|A- 12161397&docType=GALE&role= [Jul. 3, 2012 2:25:47 PM].
Dow Jones, Odesta Ships Document Management and Workflow for Oracle Document, Architecture, Nov. 4, 1994, PR Newswire PRN, © 2013 Factiva, 2 pgs.
Open Text and Odesta announce Livelink latitude;First comprehensive workgroup collaboration and document management systems; Now Livelink Latitude is first Web-enabled system for searching, developing and distrubiting documents, Sep. 26, 1995, Business Wire, http://www.thefreelibrary.com/.sub.--/print/PrintArticle.aspx?id=17477729 Oct. 10, 2011, 3 pgs.
David Weinberger, Dow Jones, Odesta: back in a big way with LiveLink, Oracle. (Odesta's LiveLink workflow and document management software) Apr. 14, 1995,The Seybold Report on Publishing Systems, SRPS, 23, vol. 24, No. 15, ISSN: 0736-7260, © 2013 Factiva, Inc., 4 pgs.
Introducing Livelink, What Is Livelink Intranet?Intranethttp://web.archive.org/web/19961113034156/http://www.ope-ntext.com/livelink/otm.sub.--II.sub.--II.html [Jul. 4, 2012 1:01:59 PM], 4 pgs.
Dow Jones, Open Text Introduces First Application Suite for Corporate Intranets; Livelink Intranet Makes Business-Critical Group Collaboration a Reality on Intranets—Transforms Intranets Into Strategic Corporate Application.Platforms, Business Wire, BWR Feb. 20, 1996, © 2013 Factiva, Inc., 2 pgs.
Dow Jones, Open Text Livelink Demonstrates First Intranet Application Suite for Network Computers, Business Wire, BWR, Jul. 23, 1997, © 2013 Factiva, Inc., 2 pgs.
Dow Jones, Open Text Corporation Announces Industry's Most Powerful, Comprehensive Intranet Suite, Livelink Intranet Suite 7 Makes True Corporate Intranets a Reality by Providing Integrated Management of Business Processes and Documents, Canada NewsWire, CNNW, Dec. 11, 1996.
Dow Jones, Open Text Ships Livelink Intranet Suite 7.2, Enhanced Security and Scalability: Microsoft Server and Desktop, Support Increase Enterprise Capabilities Business Wire, BWR, Sep. 15, 1997, © 2013 Factiva, Inc., 3 pgs.
Howard Solomon, Dow Jones, LiveLink V. 8 gives executives an enterprise view, May 4, 1998, Computing Canada CMPC 23, vol. 24, No. 17, © 2013, 2 pgs.
Livelink, Solutions Sheet, Collaborative Intranet, Extranet and E-Business Applications, Extranets Creating Collaborative Extranets that Span the Globe, The business challenge, Open Text Corporation, 2000, 2 pgs.
Pat Turocy, Doculabs, Market focus Report, Executive Brief: Functional Assessment of Open Text Livelink, 2000 Doculabs, 12 pgs.
John Balla and Linda Andrews, Doculabs, Market Focus Report, Executive Brief: Functional Assessment of Open Text myLivelink 2000 Doculabs, 16 pgs.
Livelink, Solutions Sheet, Collaborative Intranet, Extranet and E-Business Applications, Livelink and the Food Manufacturing Industry, The Business Challenge, Open Text Corporation, 2000, 2 pgs.
Livelink, Solutions Sheet, Collaborative Intranet, Extranet and E-Business Application, Livelink and Government Agencies, The Business Challenge, Open Text Corporation, 2000, 2 pgs.
Livelink, Solutions Sheet, Collaborative Intranet, Extranet and E-Business Applications, Livelink and the Manufacturing Industry, The Business Challenge, Open Text Corporation, 2000, 2 pgs.
Livelink, Solutions Sheet, Collaborative Intranet, Extranet and E-Business Applications. Livelink and the Oil and Gas Industry, The Business Challenge, Open Text Corporation, 2000, 2 pgs.
Livelink, Solutions Sheet, Collaborative Intranet, Extranet and E-Business Applications, Livelink e-Business Insurance Solutions, The Business Challenge, Open Text Corporation, 2000, 2 pgs.
Livelink, Open Text Corporation Security Framework, Sep. 29, 1999, 16 pgs.
Mike Finney Title: myLivelink FAQ, Beyond Knowledge Management, Hyper Innovation for your organization, Open Text Corporation, Mar. 2000, 13 pgs.
Livelink intranet, Stefan Somogyi, Version: 1.00, CTT-0008 Per. Workspace accessible from all user, Open Text Customer Support CyberTechTip, Aug. 9, 1998, 2 pgs.
International Search Report for International Patent Application No. PCT/US05/30982, dated Jul. 12, 2006, 1 pg.
International Preliminary Report on Patentability (Chapter 1) and Written Opinion for International Patent Application No. PCT/US05/30982, dated Mar. 6, 2007, 7 pg.
Office Action for U.S. Appl. No. 10/989,259, dated Mar. 2, 2007, 10 pgs.
Office Action for U.S. Appl. No. 10/989,262, dated Mar. 2, 2007, 9 pgs.

(56) References Cited

OTHER PUBLICATIONS

Office Action for U.S. Appl. No. 10/989,295, dated Mar. 5, 2007, 15 pgs.
Office Action for U.S. Appl. No. 10/989,296, dated Mar. 13, 2007, 14 pgs.
Office Action for U.S. Appl. No. 10/989,296, dated Dec. 11, 2007, 18 pgs.
Office Action for U.S. Appl. No. 10/989,296, dated Jun. 25, 2008, 18 pgs.
Office Action for U.S. Appl. No. 10/989,296, dated Mar. 16, 2008, 23 pgs.
European Search Report for European Patent Application No. 05793475.4, dated Aug. 21, 2009, 5 pgs.
European Search Report for European Patent Application No. 11192414.8, dated May 4, 2012, 7 pgs.
European Search Report for European Patent Application No. 11192424.7, dated May 4, 2012, 7 pgs.
European Search Report for European Patent Application No. 11192418.9, dated May 4, 2012, 8 pgs.
European Search Report for European Patent Application No. 11192422.1, dated May 4, 2012, 7 pgs.
European Search Report for European Patent Application No. 11192410.6, dated May 4, 2012, 7 pgs.
Office Action for U.S. Appl. No. 13/911,013, dated Jul. 17, 2015, 5 pgs.
Office Action for European Patent Application No. 11192424.7, dated May 6, 2016, 8 pgs.
Office Action for European Patent Application No. 11192418.9, dated May 6, 2016, 7 pgs.
Office Action for European Patent Application No. 11192410.6, dated May 6, 2016, 7 pgs.
Office Action for European Patent Application No. 05793475.4, dated May 9, 2016, 7 pgs.
Office Action for European Patent Application No. 11192414.8, dated May 9, 2016, 6 pgs.
Office Action for European Patent Application No. 11192422.1, dated May 9, 2016, 7 pgs.
Order Granting Rule 12(c) Motion for Judgment of Invalidity of Groupware Patents, Case No. 13-CV-04910-JD, *Open Text S.A.* v. *Box, Inc.*, In the United States District Court for the Northern District of California, Jan. 20, 2015, 10 pgs.
Claim Construction Order, Case No. 13-CV-04910-JD, *Open Text S.A.* v. *Box, Inc.*, In the United States District Court for the Northern District of California, Dec. 1, 2014, 21 pgs.
Balla et al., "Marketfouc Report—Executive Brief: Functional Assessment of Open Text myLivelink," Doculabs 2000 ©, 16 pgs.
Sinclair, J. et al., "Intranets vs. Lotus Notes," AP Professional, Copyright 1997 by Academic Press, Inc., 38 pgs.
Tamura, R. et al., "Lotus Notes and Domino Server 4.5," Copyright 1997 by Sams Publishing, 1119 pgs.
Brown, K. et al., "Mastering Lotus Notes 4," Copyright 1996 by SYBEX Inc., 1034 pgs.
Londergan, S., "The Lotus Domino Server: Integrating Lotus Notes 4.5 with the Internet," Copyright 1997 by M&T Books, 621 pgs.
Mann, E. et al., "PCWEEK Guide to Lotus Notes Release 4," WorkGroup Systems, Inc., © 1996 by Macmillan Computer Publishing USA, 70 pgs.
"Product Information Asset Management Solution," Whirlpool Corporation, Sep. 13, 1996, 120 pgs.
Casselberry, R. et al., "Running a Perfect Intranet, Chapter 7—Installing and Configuring the Lotus Notes Web Publishing Products," retrieved from <<http://mm.iit.uni-miskolc.hu/Data/texts/BOOKS/Running_a_Perfect_Intranet/ch7.htm>>, Copyright 1996 by Que Corporation, 23 pgs.
Grous, Paul J., "Creating and Managing a Web Site with Lotus' InterNotes Web Publisher," The View, Sep./Oct. 1995, pp. 3-18.
"What Was New in Domino 1.5 Release Candidate 2?," Lotus Domino Release Notes, retrieved from <<http://web.archive.org./web/19770415174825/http://domino.lotus.c...085256324006d4ddc/d759d23d6a75aca8852563ee0076fe60?OpenDocument>>, Apr. 15, 1997, 2 pgs.
Andersen, et al., "MMS: An Electronic Message Management System for Emergency Response," IEEE Transactions on Engineering Management, vol. 45, No. 2, May 1998, pp. 132-140.
Garrett, D. et al., "Intranets Unleashed," Copyright 1996 by IntraACTIVE, Inc., 928 pgs.
Leland, M. et al., "Collaborative Document Production Using Quilt," Copyright 1998 by ACM, pp. 206-215.
"Web Client User's Guide," Livelink Intranet, Version 7.1, Copyright 1996 by Open Text Corporation, 202 pgs.
Ball, Steve, "Surflt!—A WWW Browser," Proceedings of the Fourth USENIX Tcl/TK Workshop, Jul. 1996, 12 pgs.
Greenberg, Saul et al., "GroupWeb: A WWW Browser as Real Time Groupware," 1996, 2 pgs.
Jang Ho Lee, et al., "Supporting Multi-User, Multi-Applet Workspaces in CBE," Computer Supported Cooperative Work '96, Copyright 1996 by ACM, 11 pgs.
Appelt, Wolfgang, "CoopWWW—Interoperable Tools for Cooperation Support using the World-Wide Web," Proceedings of the ERCIM Workshop on CSCW and the Web, Feb. 1996, 3 pgs.
Bentley, Richard et al., "Supporting Collaborative Information Sharing with the World Wide Web: The BSCW Shared Workspace System," retrieved from <<http://www.w3.org/Conferences/WWW4/Papers/151/>>, Sep. 25, 2013, 11 pgs.
<Readme.txt>, BSCW—2.1, Sep. 25, 1996, 4 pgs.
Appelt, Wolfgang et al., "The BSCW: A WWW-Based Application to Support Cooperation of Distributed Groups," Proceedings of WET ICE '96, Copyright 1996 by IEEE, 6 pgs.
Roseman, Mark et al., "TeamRooms: Network Places for Collaboration," Mar. 1, 1996, retrieved from <<http://hdl.handle.net/1880/45961>>, 10 pgs.
Roseman, Mark, "Managing Complexity in TeamRooms, a Tcl-Based Internet Groupware Application," 1996, 8 pgs.
Groupwise 5 Readme.txt, Nov. 5, 1996, 24 pgs.
Dennis, Alan R. et al., "TCBWorks: A First Generation Web-Groupware System," Proceedings of the Thirtieth Annual Hawaiian International Conference on System Sciences, Copyright 1997 by IEEE, 10 pgs.
Miller, Michael, "Using Prodigy," Copyright 1995 by Que Corporation, 365 pgs.
December, John et al., "The World Wide Web Unleashed Second Edition," Copyright 1995 by Sams.net Publishing, 1358 pgs.
"BCSW Version 3.0 Help," Copyright 1997 by GMD and horz informatik, 75 pgs.
Tatters, Wes, "Navigating the Internet with CompuServe," Copyright 1995 by Sams.net Publishing, 484 pgs.
Info World, vol. 18, Issue 25, Jun. 1, 1996, 184 pgs.
"BSCW User Manual," Copyright 1996 by BSCW project, 51 pgs.
Baecker, Ronald M., "Readings in Groupware and Computer-Supported Cooperative Work Assisting Human-Human Collaboration," Copyright 1993 by Morgan Kaufmann Publishers, Inc., 882 pgs.
Casselberry, R. et al., "Running a Perfect Intranet, Chapter 18—Groupware Applications," Copyright 1996 by Que Corporation, 23 pgs.
Stack, Bob et al., "Understanding and Deploying the InterNotes Web Navigator," The View, Jul./Aug. 1996, Copyright by Wellesley Information Services, 14 pgs.
"TCBWorks Webware for Teams Installation Information & Instructions," Copyright 1996 by The University of Georgia Research Foundation, 4 pgs.
Wheeler, Bradley C., "Groupware Comes to the Internet: Charting a New World," The Data Base for Advances in Information Systems, vol. 30, No. 3,4, Summer-Fall 1999, pp. 8-21.
Groupware on the Web, Jun. 27, 2014, 4 pgs.
Dennis, Alan et al., "TCBWorks: Using a Web-Groupware System for Teaching and Research," International Conference on Information Systems (ICIS) 1996 Proceedings, Paper 84, 2 pgs.
Dennis, Alan R. et al., "Lessons from the Early Adopters of Web Groupware," Journal of Management Information Systems, Spring 1998, vol. 14, No. 4, pp. 65-86.

(56) References Cited

OTHER PUBLICATIONS

Dennis, Alan et al., "TCBWorks: Experiences from a First-Generation Web-Groupware System," Jun. 27, 2014, 6 pgs.
"Groupware: The Web Changes Everything," Jun. 27, 2014, 1 pg.
Dennis, Alan R. et al., "Developing Groupware for the Web," Jun. 27, 2014, 5 pgs.
Kroeger, Thomas M. et al., "CREW Access Control Service Design Specification," Version 0.70, Mar. 3, 1996, 8 pgs.
"Admin Training Agenda," Crew Administrator, Jun. 27, 2014, 1 pg.
Mansour, Steve, "CREW System Architecture," Version 0.95, Oct. 5, 1995, 9 pgs.
Haytko, Moonhee, "CREW Calendar Design Specification," Version 0.07, Mar. 25, 1996, 23 pgs.
Pfutzenreuter, Dean, "Crew Card Server and Database Design Specification," Version .6, Aug. 7, 1995, 16 pgs.
"Technical Support and Contact Information" Crew, Jun. 27, 2014, 1 pg.
"CREW Channel Partner Checkoff List," CREW Channer Partner Product Training, Jun. 27, 2014, 2 pgs.
"Channel Partner Product Training Agenda," Dec. 18, 1999, 1 pg.
"CREW Review," Jun. 27, 2014, 1 pg.
"Your CREW Office," Crew Training Guide *DRAFT*, Jun. 27, 2014, 27 pgs.
"Crew Groupware for the Internet/Intranet Administration and Maintenance Guide," Revision 1.0, Copyright 1996 by Thuridion, 51 pgs.
"License Agreement," Thuridion, Jun. 27, 2014, 1 pg.
"Crew Groupware for the Internet/Intranet Quick Start Guide," Copyright 1996 by Thuridion, 19 pgs.
Crew Messenger—Inbox, Figures 1-5, Jun. 27, 2014, 3 pgs.
Galpin, Dan et al., "Crew URL Design Specification," Version 1.00, Dec. 11, 1995, 10 pgs.
"CREW Demo Split," Crew Office, Jun. 27, 2014, 4 pgs.
Mansour, Steve, "CREW Error Service Design Specification," Version 0.1, Jul. 31, 1996, 8 pgs.
Pfutzenreuter, Dean, "Crew File Service Design Specification," Version.10, Oct. 30, 1995, 11 pgs.
Francis, John, "CREW Groups Proposal," Version 1.0, Mar. 21, 1996, 7 pgs.
Kroeger, Thomas M., "CREW Guest User Specification Design Specification," Version 0.01, Mar. 5, 1996, 2 pgs.
Channel Partner Sales Training Agenda, Thuridion, 1996, 2 pgs.
Mansour, Steve, "CREW Locker," Version 0.1, Oct. 23, 1995, 8 pgs.
CREW Training, Thuridion, Aug. 29, 1996, 5 pgs.
Mansour, Steve, "CREW Messenger Design Specification," Version 0.85, Feb. 21, 1996, 15 pgs.
"Rowers' Shortcuts," CREW, Jun. 27, 2014, 4 pgs.
Mansour, Steve, "MEMORANDUM, re: Current CREW Status," Jun. 27, 2014, 1 pg.
Mansour, Steve, "CREW Product Description," Version 0.47, Aug. 10, 1995, 34 pgs.
Mansour, Steve, "TM Design Specification," Version 1.01, Oct. 25, 1996, 16 pgs.
"User Training Agenda," CREW, Dec. 6, 1996, 1 pg.
Mansour, Steve, "CREW Web Calendar Design Specification," Version 0.2, Mar. 16, 1996, 7 pgs.
Roseman, Mark, "README for Windows TeamRooms 1.0 Beta 4," Nov. 1, 1996, 2 pgs.
<_Alfresco file listing.txt>, 2011, 82 pgs.
<_DEFS001094_codarpms_listings.txt>, 1997, 109 pgs.
<_DEFS013953_CollabraShare_listing.txt>, 1994, 5 pgs.
<_DEFS013954_WarFTPDaemon_listing.txt>, 2014, 1 pg.
<_DEFS013955_TCBWorks_listing.txt>, 2014, 1 pg.
<_DEFS013977_CREW_listing.txt>, 1996, 3 pgs.
<_DEFS013978_Teamrooms_listing.txt>, 1996, 1 pg.
Roseman, Mark et al., "Building Real-Time Groupware with GroupKit, a Groupware Toolkit," ACM Transactions on Computer-Human Interaction, vol. 3, No. 1, Mar. 1996, pp. 66-106.
Panko, Raymond, "Designing Groupware for Implementation," Designing Groupware for Implementation, Between Communication and Information, Information & Behavior, vol. 4, 1993, 35 pgs.
Backer, et al., "DocMan: A document management system for cooperation support," Proceedings of the 29th Hawaii International Conference on System Science, vol. 3, pp. 82-91, Jan. 1996.
Bentley, et al., "Designing a system for cooperative work on the World-Wide Web: Experiences the BSCW System," Proceedings of the 30th Hawaii International Conference on System Sciences: Information systems Track-internet and the Digital Economy, vol. 4, pp. 297, Jan. 1997.
Bentley, et al., "The Architecture of the BSCW Shared Workspace System," Proceedings of the ERCIM Workshop on CSCW and the Web, Sankt Augustin, Germany, Feb. 1996.
Child, Don, "How does Lotus Notes Work with the Internet?," Chapter 3, Lotus Notes and Domino Server 4.5, Sams Publishing, 1997, pp. 51-61.
Child, Don, "Using the Notes Client on the Internet, " Chapter 23, Lotus Notes and Domino Server 4.5, Sams Publishing, 1997, pp. 562-578.
Fredell, Thomas L., "Developing Web Applications with Domino. Action," Chapter 25, Lotus Notes and Domino Server 4.5, Sams Publishing, 1997, pp. 606-628.
Hiltuneni, et al., "Access Control in Wide-Area Networks," Proceedings of the 17th International Conference on Distributed Computing Systems, May 1997, pp. 330-337.
Wunderlich, Rob, "Connecting Notes to the Internet with InterNotes," Chapter 26, Lotus Notes and Domino Server 4.5, Sams Publishing, 1997, pp. 630-697.
Yavatkar, et al., "Clique: A Toolkit for Group Communication using IP Multicast," Proceedings of the First International Workgroup on Service in Distributed and Networked Environments, Jun. 1994, pp. 132-138.
The Sourceforge Crew, <admin@sourceforge.net>: "SourceForge. version 1.1.0" http://sourceforge.net, May 4, 2000, Internet; the whole software program & Open Source Development Network: "[fmll]—Project details for SourceForge" Freshmeat.Net, [Online], Oct. 15, 2001, XP002180271 Internet; Retrieved from Internet: <url:http://freshmeat.net/projects/sourceforge/> [retrieved on Oct. 15, 2001] p. 1 , lines 1-8; p. 2, lines 5-6.
Office Action for U.S. Appl. No. 08/955,569, dated Jan. 7, 1999, 9 pgs.
Office Action for U.S. Appl. No. 08/955,569, dated Aug. 12, 1999, 6 pgs.
Office Action for U.S. Appl. No. 09/195,905, dated Mar. 29, 2000, 9 pgs.
Office Action for U.S. Appl. No. 09/590,099, dated Jun. 12, 2003, 14 pgs.
BSCW 3.1 Help, Jul. 20, 1998, BSCW, Sankt Augustin, Germany, 89 pgs.
Office Action for U.S. Appl. No. 09/590,099, dated Dec. 3, 2003, 15 pgs.
International Search Report for PCT Application No. PCT/CA01/00835, dated Dec. 28, 2001, 3 pgs.
Office Action for U.S. Appl. No. 09/590,099, dated Jun. 9, 2004, 18 pgs.
Office Action for U.S. Appl. No. 09/590,099, dated Oct. 5, 2004, 25 pgs.
Web-Page article, "How to Get your Web Page on the Sympatico Service," 7 pgs, undated.
Office Action for Australian Patent Application No. 2001267199, dated Jul. 20, 2006, 2 pgs.
Office Action for European Patent Application No. 01944802.6, dated Nov. 28, 2006, 4 pgs.
Office Action for U.S. Appl. No. 10/898,133, dated Jan. 11, 2007, 6 pgs.
Office Action for U.S. Appl. No. 10/898,132, dated Apr. 2, 2007, 6 pgs.
Office Action for U.S. Appl. No. 10/898,131, dated Apr. 2, 2007, 6 pgs.
Office Action for U.S. Appl. No. 11/044,830, dated Oct. 5, 2007, 5 pgs.

(56) References Cited

OTHER PUBLICATIONS

Office Action for Australian Patent Application No. 2001267199, dated Mar. 19, 2008, 1 pg.
Office Action for U.S. Appl. No. 11/044,830, dated Jun. 13, 2008, 4 pgs.
Office Action for U.S. Appl. No. 12/037,679, dated Jul. 27, 2009, 5 pgs.
Office Action for European Patent Application No. 01944802.6, dated Sep. 24, 2010, 4 pgs.
European Search Report for European Patent Application No. 10183500.7, dated Dec. 6, 2010, 7 pgs.
Alton-Scheidl R, et al., Web4Groups—a Tool for Telematic Collaboration, Database and Expert Systems Applications, 1997, Eighth Int'l Workshop, Toulouse, France, Sep. 1-2, 1997, IEEE Comput. Soc., Sep. 1, 1997, pp. 425-430.
Grundy, John, et al., Coordinating Distributed Software Development Projects with Integrated Process Modelling and Enactment Environments, Seventh IEEE Int'l Workshop, Jun. 17, 1998-Jun. 19, 1998, US, IEEE Comput. Soc., Jun. 17, 1998, pp. 39-44.
Gong, Li, Enclaves: Enabling Secure Collaboration over the Internet, IEEE Journal on Selected Areas in Communications, vol. 15, No. 3, Apr. 1, 1997, 10 pgs.
Office Action for U.S. Appl. No. 12/768,387, dated Jul. 29, 2011, 5 pgs.
Office Action for European Patent Application No. 10183500.7, dated Oct. 12, 2011, 6 pgs.
Office Action for U.S. Appl. No. 13/441,548, dated Jun. 20, 2012, 6 pgs.
Office Action for U.S. Appl. No. 13/762,959, dated Jul. 24, 2015, 10 pgs.
Office Action for U.S. Appl. No. 13/762,959, dated Apr. 1, 2016, 9 pgs.
Office Action for U.S. Appl. No. 13/762,959, dated Oct. 31, 2016, 33 pgs.
Order re: Post-Trial Motions, *Open Text S.A.* v. *Box, Inc.*, Case No. 13-cv-04910-JD, Aug. 19, 2015, 24 pgs.
Microsoft white paper, "Managing Web Content Using Microsoft Visual SourceSafe, (Version 5.0 released Oct. 1996)", published Jan. 1996, revised Jan. 1997, 6 pgs. VSS1997.
Microsoft Visual SourceSafe 5.0, Harty, published Mar. 31, 1997, 4 pgs, VSS031997.
Office Action for U.S. Appl. No. 13/762,959, dated May 31, 2017, 42 pgs.
Ball et al., Web-based Analysis of Large-Scale Software Systems, Feb. 26, 2017, 9 pgs.
Edwards, Mark Joseph, Microsoft Enables Collaborative Conferencing, Nov. 30, 1996, at http://windowsitpro.com/windows/microsoft-enables-collaborative-conferencing, May 25, 2017, 4 pgs.
Summons to Attend Oral Proceedings Pursuant to Rule115(1) EPC, for European Patent Application No. 10183500.7, mailed Mar. 16, 2017, 7 pgs.
Summons to Attend Oral Proceedings Pursuant to Rule115(1) EPC, for European Patent Application No. 01944802.6, mailed Dec. 21, 2016, 6 pgs.
Office Action for U.S. Appl. No. 14/218,143, dated Dec. 13, 2017, 5 pgs.
Office Action for U.S. Appl. No. 13/762,959, dated Jan. 5, 2018, 32 pgs.
Torvalds et al., Linux Basics Tutorial Guide for Beginners—About Debian Linux Guides, published online on Mar. 15. 1997 at http://www.aboutdebian.com/linux.htm (Year 1997), 30 pgs.
Li Gong, "Enclaves: Enabling Secure Collaboration over Internet," published in the Proceedings of the Sixth USENIX UNIX Security Symposium, San Jose California, Jul. 1996 (Year 1996), 12 pgs.
Trevor et al., "Meta Web: Bringing Synchronous Groupware to the World Wide Web," published on Jun. 1, 1997, at http://www.ecscw.uni-siegen.de/1997/05.pdf (Year 1997), pp. 65-80.
Office Action for U.S. Appl. No. 13/762,959, dated Jul. 9, 2018, 35 pgs.
Office Action for U.S. Appl. No. 13/762,959, dated Nov. 27, 2018, 36 pgs.
MacWorld Magazine, Aug. 1996, 256 pgs.

| | | FROM | | | | |
|---|---|---|---|---|---|---|
| | | Outside | Private | | Public | |
| | | | Chat/Voice | Content | Chat/Voice | Content |
| TO | Outside | X | | | | |
| | Private Chat/Voice | | X | | | |
| | Private Content | | | X | | |
| | Public Chat/Voice | | | | X | |
| | Public Content | | | | | X |

FIG. 12F

SYSTEMS AND METHODS FOR PROVIDING ACCESS TO OBJECTS AND SEARCHABLE ATTRIBUTES OF OBJECTS IN A COLLABORATION PLACE

REFERENCE TO RELATED APPLICATION

This application is a continuation of U.S. patent application Ser. No. 14/218,143, filed on Mar. 18, 2014, issued as U.S. Pat. No. 10,108,613, which is a continuation of U.S. patent application Ser. No. 13/155,927 filed on Jun. 8, 2011, issued as U.S. Pat. No. 8,713,106, which is a continuation of U.S. patent application Ser. No. 12/754,039 filed on Apr. 5, 2010, now abandoned, which is a continuation of U.S. patent application Ser. No. 10/989,294 filed on Nov. 15, 2004, now U.S. Pat. No. 7,702,730, which claims the benefit of U.S. Patent Application No. 60/607,388 filed on Sep. 3, 2004, the contents of which applications are expressly incorporated by reference herein in their entirety.

COPYRIGHT NOTICE

The present application includes material that is subject to copyright protection. The copyright owner does not object to the facsimile reproduction of the application by any person as the application appears in the records of the U.S. Patent and Trademark Office, but otherwise reserves all rights in the copyright.

FIELD

The general field is in the field of collaboration systems and methods. The particular fields of application include enterprise software, productivity software tools, online conferencing, network collaboration software, instant messaging, real-time collaboration applications, and office software applications.

BACKGROUND

Traditionally, people who were separated by geographic distances and who desired to collaborate with each other in so-called "real time" had relatively few options. An expensive option included traveling to a common geographic location or place to meet, chat, share notes, and discuss ideas. A less expensive, but arguably less productive, option included participating in a telephone conference call and concurrently exchanging email messages.

However, companies are just beginning to fully realize that phone and e-mail are no longer the most efficient ways for communication in today's disperse organizations. Currently the market of collaboration consists of a variety of companies offering a variety of separate solutions. The capabilities of these known solutions include: presence, instant messaging, web conferencing and team or project workspaces. In the current market, vendors can only offer stand-alone products for each of these solutions. Solutions are generally limited in scope to address either asynchronous collaboration or synchronous collaboration. Known attempts to combine synchronous and asynchronous collaboration have provided awkward solutions because they require leaving one mode in order to act in the other mode.

A drawback of these solutions is that each is a separate application and the use of these software on a separate basis is cumbersome, complicated, and expensive. For example, in current workspace applications, more than one person can view a document in the same virtual environment, but these technologies only offer serial editing, allowing only a single individual to make edits to the document when that individual has that document open on his or her computer. As such, while collaborating in a serial editing environment, people are only allowed to edit one at a time. Each edit must be discussed over instant messaging or e-mail and collaborators must wait to make edits. Thus, in such systems, the permission to edit the document must be passed back and forth as if they were writing on the same piece of paper with one pen. Such techniques can result in ending that momentum that can come with successful collaboration sessions.

Another application commonly used for collaboration is E-mail. However, companies are finding that e-mail is overwhelming their organizations. Companies are complaining of losing hours of productivity a day to sorting through e-mail. Another example of a conventional collaboration tool is instant messaging (IM), otherwise referred to herein as chat. IM is typically implemented using peer-to-peer communications. Chat is a transit real-time or "live" activity in which interface activity is synchronously updated as the interaction progresses. Prior known attempts to combine synchronous IM-type tools with asynchronous collaboration tools, such as browser-based conferencing tools, have resulted in cumbersome products that often require users to leave one of the modes of communication to enter the other of the modes of communication.

Another example of a conventional collaboration tool is browser-based conferencing. Such on-line conferencing activity is typically a transient event. In some known systems, static recordings of the sessions are recorded for later replay. One drawback of such systems is the inability to provide features for continued collaboration, resuming collaboration, or sharing asynchronous collaboration on the same subject.

Concurrently using a number of stand-alone collaboration tools, such as combinations of one or more of the previously described tools and/or one or more other available tools, leads to inevitable problems. For example, compatibility problems and productivity losses are inevitable when using several separate stand-alone collaboration tools. Transferring information from one tool to another tool can often result in data files or edits being lost, permissions being incorrectly updated, and/or sessions or connections being dropped. Switching from one stand-alone application to another stand-alone application so that a collaboration can "move" from IM, to a browser-based conference, and to a shared workspace can waste valuable time and frustrate collaboration participants.

Therefore, it would be beneficial to provide improved systems and methods for collaboration, which for example can overcome the illustrative drawbacks of existing collaboration tools mentioned or provide new functionality to users.

SUMMARY

In accordance with the principles of the present invention, systems and methods for collaboration and related features are provided. A collaboration application can be implemented to provide collaboration tools and features to users. The application can be implemented within a client-server environment to, for example, provide seamless synchronous and asynchronous collaboration comprising a central persistent database for a particular project and seamless integration of synchronous and asynchronous collaboration tools. A collaboration place can be implemented on a server and/or in combination with client computers.

In accordance with the principles of the present invention, a collaboration place, when referred to herein, means collaboration software that has at least the characteristics of being persistent, addressable, and capable of holding more than one data file. For example, a collaboration place can be an addressable persistent set (i.e., more than just one) of data files accessible by at least two users simultaneously, in which data introduced by one user is made available to other allowed users based on update(s) via a back channel and not requiring selection of "refresh" as in a browser-based system. Users may interact with the application through a collaboration place interface (e.g., a desktop application). As used herein, a collaboration place interface can be understood to be part of a collaboration place.

As used herein, seamless refers to the elimination or absence of one or more intervening user-required steps, and preferably all user required steps, to move from one type of collaboration tool to another (e.g., a desktop application containing different types of collaboration tools, no separate log-in, no launching of a separate application). Seamless can also refer to the implementation of a plurality of collaboration tools and unifying data (e.g. in a things window, as further described herein) in a collaboration place.

A plurality of different types of collaboration is preferably supported (e.g., chat, content editing, conferencing, meetings, document versioning, etc.). In one aspect, the software is implemented to provide users with freedom to move or escalate to additional types of collaboration tools when working in a first collaboration tool. Features can be implemented to gradually or gracefully escalate to this greater environment.

For example, one or more requests (e.g., from a first client and second client) can be received by a server to establish a collaboration place. Based on the one or more requests, a collaboration place can be established (e.g., by the server). Network connections are implemented between the collaboration place and the one or more users who requested the collaboration place (e.g., the first and second clients). The collaboration place is implemented to be associated with collaboration place interfaces executing on the user's platform (e.g., the first and second clients) wherein the collaboration place interfaces include a primary display for presenting a primary type of data and are configured for being escalated based on a request from the users (e.g., their respective clients) to include at least one secondary display for presenting a secondary type of data. The primary type of data can, for example, include data related to at least one of a chat application and an instant messenger application. The secondary type of data can, for example, include data related to at least one of an application for processing audio data, an application for processing graphic data, an application for processing multimedia data, an application for processing text data, and an application for processing video data. Another feature may involve escalating, based on receiving a request from a first client, one of the collaboration place interfaces to include a secondary display for presenting data related to the clients connected to the collaboration place and/or related to at least one of an application for processing audio data, an application for processing graphic data, an application for processing multimedia data, an application for processing text data, and an application for processing video data. In another aspect, based on receiving a request from the first client, the one of the collaboration place interfaces can be escalated to include a secondary display for presenting data related to data files associated with the collaboration place.

Escalation can occur in a user's collaboration place interface to include a secondary display based on a request from another user's collaboration place interface. In another feature, pulling an object into a collaboration place interface can synchronously escalate other collaboration place interfaces connected to the same collaboration place. Additional displays can be displayed in the collaboration place interfaces to implement different collaboration tools. A resident application can be implemented to provide the collaboration place interface to provide secondary displays for collaboration. A window for objects associated with the place can be displayed along with a chat window in each of the collaboration place interfaces. A private place may be implemented as part of a collaboration place interface and the collaboration place. A database may be associated with the collaboration of the clients in the collaboration place. Objects related to a place can be stored and accessed from the collaboration place interfaces for later resumption of collaboration. Information on activity in the place can be recorded and made available through the database.

Co-editing can be a feature that is implemented as part of a collaboration application, for example, as part of a collaboration place. Co-editing can, for example, be provided by implementing a software resident application (e.g., a desktop application) configured to provide and integrate a plurality of collaboration tools on a plurality of user platforms, establishing communications via a plurality of Internet connections between the software resident applications and a server that supports collaboration among users, administering interactions in another application implemented on the user platforms via the server, synchronizing activity in the other application via back channel connection of the Internet connections dedicated to pushing content to the software resident application; and storing information related to the activity on the server. The software resident application can be configured to implement a collaboration place. (As used herein, unless otherwise indicated by context, the term software resident application can be understood to include a client software application or a client-resident software application as those terms are understood by those of ordinary skill in the art.) The administering can include managing sequential co-editing activity among the users. If desired, the administering can include managing simultaneous co-editing activity among the users. The storing can include storing user identifier information. If desired, the storing can include storing a history of interactions. Access to the stored information is provided to the user who participated in the interaction for later retrieval of that stored information. A software development kit for the software resident application can be distributed to provide a framework for independently implementing such cooperative activity.

A private interface can be implemented as part of a collaboration application, for example, as part of a collaboration place. A private interface can, for example, be implemented by providing a collaboration application configured to provide integrated collaboration tools to a plurality of users through network-connected user platforms, providing a private interface configured for private use by a user when the user is in an interface for one of the collaboration tools, and moving content from the private place to the interface when directed by the user and storing the content for later retrieval by other users. The private interface can be privately displayed for the user when the user is interacting with different collaboration tools of the collaboration application. The private interface is preferably displayed in conjunction with a collaboration place in which the user is a collaborator. The system or method is configured to provide a user with the authority to provide guest access to another user to have temporary access to a portion of the private interface. A list of collaboration places related to the user can be displayed in the private interface. Visual cues can be displayed in association with items in the list. The visual cues can include information on an upcoming meeting. If desired, content is stored in the private interface based on the user's past interaction with the collaborative application. In another aspect, the collaborative application is configured to be responsive and to support a user's selecting an icon of another user and dragging and dropping the icon into the private place (e.g., to provide that user with temporary/guest access to the personal interface).

A time-line feature can be provided in a collaboration application, for example, as part of a collaboration place. Such a feature can, for example, be provided by implementing a collaboration tool through which networked users collaborate asynchronously, storing artifacts of the collaboration in a database associated with a particular instance of the collaboration tool, providing access to the database to the users through the collaboration tool so that artifacts can be manipulated, and displaying a user-selectable option for viewing a previous state of one or more of the artifacts. If desired the collaboration tool includes a collaboration place. An associated feature can be to implement a player that plays information on how one, more than one, and/or all of the artifacts evolved over time.

A collaboration application may include a feature for providing "peripheral vision" to one or more users by informing users of activity within a collaborative application. Such information can be related to number of users, roles of users, the existence of meeting, etc. For example, peripheral vision can be provided by providing a database for storing data associated with two or more independent collaboration places, administering collaboration activities among participating clients in each of the two or more independent collaboration places, generating activity data for each of the two or more independent collaboration places based on administering the collaboration activities, receiving a request from a requesting client for the activity data for one or more of the two or more independent collaboration places, and based on the request, providing the activity data to the requesting client for presentation in a collaboration place interface. Other forms of peripheral vision can also be implemented.

Other features can, for example, also include persistence of a tool, a place, or a database dedicated to a place, polling, content sharing, voice conferencing, video, meeting related features, activity threads, workflows and templates, indexing, place presence, integration of enterprise document management software with collaboration tools, worldview, "drag-and-drop" features, access, and security.

Some aspects of the systems and methods of embodiments the present inventions can include: drag and drop escalation, enhancement of interface from a "non-collaborative space" to a "live" collaborative space with tools or options that are gradually added based on the collaboration, enhancement of interface from a relatively simple live collaborative space to a relatively complex live collaborative space with tools or options that are gradually added based on the collaboration, a seamless blend of synchronous and asynchronous collaboration, integrated platform for viewing and editing documents and for synchronous and asynchronous collaboration that adds functionality on a gradual basis as collaboration progresses, implementation of tools or changes to a user's environment based on the attributes of a person, group, document, or application that is "dragged" into the environment, reversal of escalation, template based escalation, and escalation to audio (e.g., telephone, Voice over Internet Protocol (VoIP)), video, or other audio-video content.

These and other features of the systems and methods described herein can be more fully understood by referring to the following detailed description and accompanying drawings.

BRIEF DESCRIPTION OF THE DRAWINGS

Features of the invention, its nature, and various advantages will be apparent from the following detailed description, taken in conjunction with the accompanying drawings in which:

FIG. 12F provides a chart illustrating escalation and de-escalation features in accordance with one embodiment of the present invention;

DETAILED DESCRIPTION

Figure 1A:
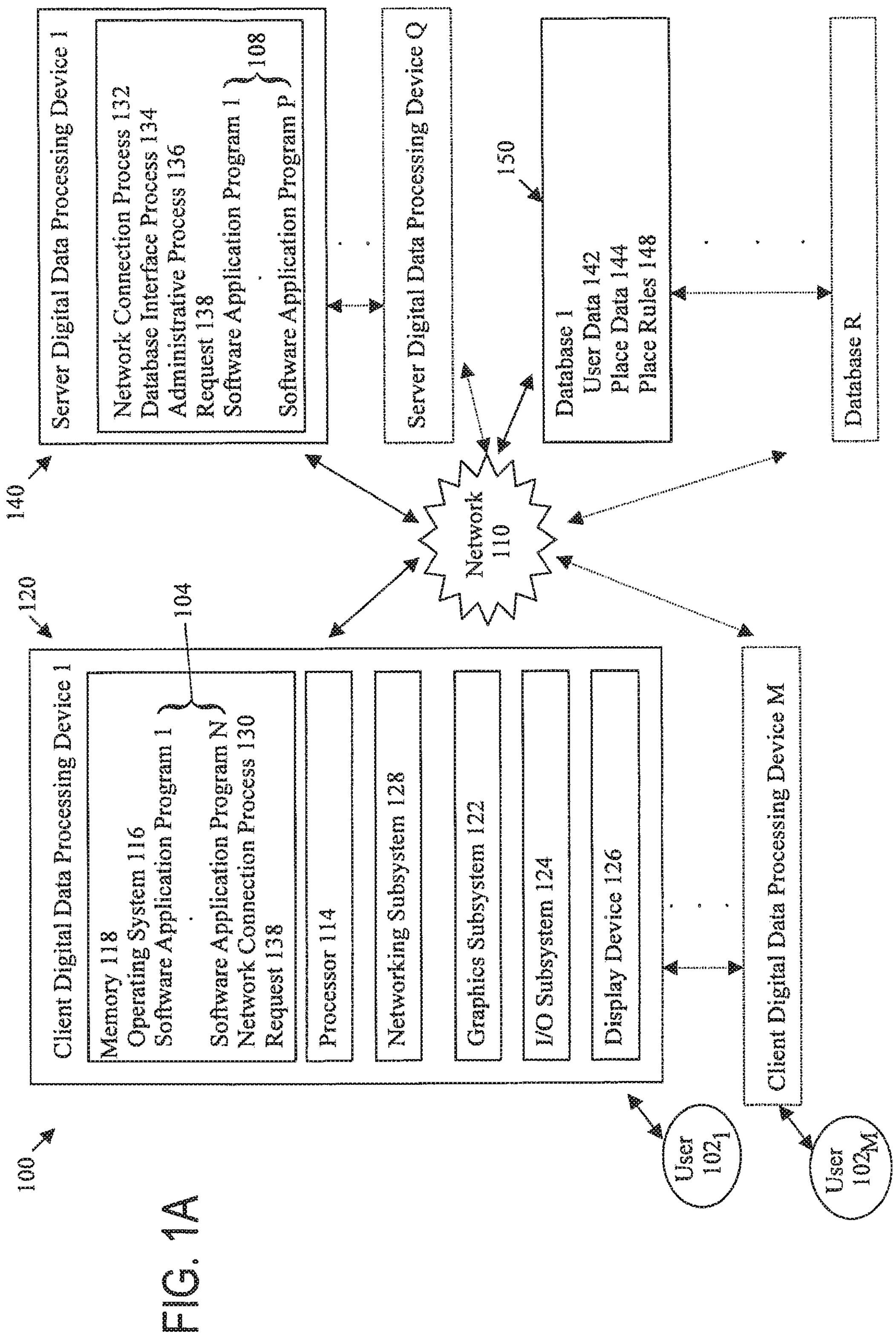
FIG. 1A schematically illustrates an exemplary system for supporting a place in accordance with one embodiment of the present invention.

Illustrative embodiments will now be described to provide an overall understanding of the systems and methods for collaboration described herein. One or more examples of the illustrative embodiments are shown in the drawings. The disclosed systems and methods can be adapted and modified to provide systems and methods for other applications, and that other additions and modifications can be made to the disclosed systems and methods without departing from the scope of the present disclosure. For example, features of the illustrative embodiments can be combined, separated, interchanged, and/or re-arranged to generate other embodiments. Such modifications and variations are intended to be included within the scope of the present disclosure.

Systems and methods of the present invention provide next generation collaboration and related features. In one aspect, collaboration will be a seamless blend of presence, conferencing, and teamware functionality backed by a repository of appropriate size such as an enterprise-class repository. As such, a true unified collaboration application can be provided to users for enterprise collaboration. In some embodiments, systems and methods that implement a seamless blend of synchronous and asynchronous collaboration or implement synchronous collaboration in the context of a enterprise-class Enterprise Content Management ("ECM") store are provided.

In one embodiment, systems and methods are implemented that provide seamless integration of each of the solutions mentioned above (and/or a desired combination thereof): presence, instant messaging, web conferencing, standard document management functionality (check-in, check-out, document sharing, etc), or team or project workspaces. Separate environments (e.g., each separate environment integrated in the collaboration application) can work together in a full collaborative effort. For example, documents can be opened during an initial conversation over IM and then easily dragged from the repository into the workspace, where simultaneous co-editing can begin while each user views the document in real time. As mentioned above, in known conventional systems, work has to be passed back and forth and each edited version is then manually and/or automatically saved back to a remote server.

Another feature that can be implemented to add asynchronous characteristics to these synchronous characteristics is that conversations (e.g., all conversations in the application) are saved regardless of what environment the conversation occurs in. The application is configured to identify who it came from, when, what program, regarding what project. This can be important information in businesses that deal with compliance. User activity is automatically tracked for them and information is stored and managed to track activity in the application to maintain tracking and information on all interactions, downloads, viewing, conferences, IM's, etc. Both synchronous and asynchronous activity (e.g., communications) is tracked and available for viewing. The tracking can extend to all types of synchronous and asynchronous communications, which may include conversations, meetings, IMs, VoIP, etc., but is not limited to such activity. An advantage of synchronized collaboration backed by a store of activity related information is that information or activity can all be maintained in context.

Another feature is the implementation of the ability of the application to interact with users through graceful escalation of the user interface. For example, this provides the users with the ability to gracefully escalate a conversation within the same application. A conversation can be taken from voice to video conferencing without jumping from one application to another or any other environment change. Another example is a two-person IM escalating to a multi-person discussion thread.

In some embodiments, the disclosed systems and methods provide a client-server infrastructure capable of supporting a variety of asynchronous and synchronous collaboration activities in a unified virtual environment. Some of these activities include chatting, viewing and/or editing one or more data files, and sharing one or more applications, data files, and/or displays. The client-server infrastructure supports seamless navigation between the supported asynchronous and synchronous activities. Additionally, the client-server architecture supports data persistence, so that at least data files that are viewed, edited, and/or otherwise accessed in the collaboration place during a collaboration activity can be stored for subsequent access.

In some embodiments of the disclosed systems and methods, a server receives requests from clients for accessing (e.g., logging or entering into) a previously established place. In reply, the server provides data associated with the place to the clients via a place interface, forms a network connection among the clients, and mediates interactions among the clients in the place. While they are logged into the place, the clients can share content with each other via the server. For example, in some of such embodiments, the clients can concurrently display and/or modify data files via the place interface. As further described herein, the data files can include audio data files, video data files, documents with text and/or graphics, multimedia presentations, and/or other types of data files. The server associates the place with a place identifier and other types of place data, such as client identifiers and data files. Based on detecting a termination event, the server stores the place identifier and the data associated therewith for subsequent access by the clients (e.g., for provision to clients in reply to subsequent requests to access the place).

FIG. 1A schematically illustrates an exemplary system for supporting a place. As shown in FIG. 1A, the exemplary system 100 includes one or more client digital data processing devices 120 ("clients"), one or more server digital data processing devices 140 ("servers"), and one or more databases 150. The clients 120, servers 140, and databases 150 communicate using one or more data communications networks 110 ("networks").

In FIG. 1A, the features in a digital data processing device are shown as residing in client 120. If desired, one or more features of client 120 can be implemented as part of server 140.

Generally, references herein to a client and a server are used to differentiate two communicating devices and/or sets of processor instructions. References herein to a client and/or a server can thus be understood to be references to communications originating from a client and/or a server as these terms are understood by those of ordinary skill in the art. Such communications can be based on or otherwise initiated from one or more input devices (e.g., a keyboard, a stylus, a mouse, etc.) controlled by a user. Also, references herein to a client and/or a server can thus be understood to include one or more processor-controlled devices that act in a client-server (i.e., request-response) model, in which the client and the server can reside on the same processor-controlled device, and in which, based on perspective, the client can act as a server, and the server can act as a client. More generally, references herein to a client can be understood to include computer software and/or hardware.

As shown in FIG. 1A, a user $\mathbf{102}_1$ desiring to access a place can execute one or more software application programs 104 residing on the client 120 to generate data messages that are routed to, and/or receive data messages generated by, one or more software application programs 108 (e.g., programs for establishing a new place and/or administering a previously established place) residing on server 140 via network 110. A data message includes one or more data packets, and the data packets can include control information (e.g., addresses of the clients and servers 120 and 140, names and/or identifiers of the software application programs 104 and 108, etc.) and payload data (e.g., data relevant to a request 138 to establish a new place or access a pre-existing place, such as a place identifier for the pre-existing place).

The software application programs 104 can include one or more software processes (e.g., a calculation process or engine) executing within one or more memories 118 of the client 120. Similarly, the software application programs 108 can include one or more software processes executing within one or more memories of the server 140.

The software application programs 108 can include one or more sets of instructions and/or other features that enable the server 140 to, for example, establish a place, regulate access to the place, and mediate interactions between user $\mathbf{102}_1$ and user $\mathbf{102}_M$ while logged into the place via clients 120(1) and 120(M). As described herein, the software application programs 104 and 108 can include instructions for authenticating users 102, authorizing users 102 (e.g., to access a place), and otherwise processing places (e.g., establishing places and administering interactions between users 102 logged into the place). The software application programs 104 and 108 can be provided using a combination of built-in features of one or more commercially available software application programs and/or in combination with one or more custom-designed software modules. Although the features and/or operations of the software application programs 104 and 108 are described herein as being executed in a distributed fashion (e.g., operations performed on the networked client and servers 120 and 140), those of ordinary skill in the art will understand that at least some of the operations of the software application programs 104 and 108 can be executed within one or more digital data processing devices that be connected by a desired digital path (e.g., point-to-point, networked, data bus, etc.).

The digital data processing device 120 and 140 can include a personal computer (PC), a computer workstation (e.g., Sun, Hewlett-Packard), a laptop computer, a server computer, a mainframe computer, a handheld device (e.g., a personal digital assistant (PDA), a Pocket PC™, a cellular telephone, an e-mail device (e.g., a Blackberry™, a Clie™, or a Trio™ e-mail device), etc.), an information appliance, and/or another type of generic or special-purpose, processor-controlled device capable of receiving, processing, and/or transmitting digital data. Processor 114 refers to the logic circuitry that responds to and processes instructions that drive digital data processing devices such as, without limitation, a central processing unit, an arithmetic logic unit, an application specific integrated circuit, a task engine, and/or combinations, arrangements, or multiples thereof.

Instructions for programs 104 or other executables can be pre-loaded into a programmable memory that is accessible to the processor 114 and/or can be dynamically loaded into/from one or more volatile (e.g., RAM, cache, etc.) and/or non-volatile (e.g., a hard drive, optical disk, etc.) memory elements communicatively coupled to the processor 114. The instructions can, for example, correspond to the initialization of hardware within the digital data processing devices 120 and 140, an operating system 116 that enables the hardware elements to communicate under software control and enables other computer programs to communicate, and/or software application programs 104 and 108 that are designed to perform operations for other computer programs, such as operations relating to establishing and administering a place. The operating system 116 can support single-threading and/or multi-threading, where a thread refers to an independent stream of execution running in a multi-tasking environment. A single-threaded system is capable of executing one thread at a time, while a multi-threaded system is capable of supporting multiple concurrently executing threads and can perform multiple tasks simultaneously.

Local user 102 can interact with client 120 by, for example, viewing a command line, using a graphical and/or other user interface, and entering commands via an input device, such as a mouse, a keyboard, a touch sensitive screen, a stylus, a track ball, a keypad, etc. The user interface can be generated by a graphics subsystem 122 of the client 120, which renders the interface into an on- or off-screen surface (e.g., on display device 126 and/or in a video memory). Inputs from the user 102 can be received via an input/output (I/O) subsystem 124 and routed to processor 114 via an internal bus (e.g., system bus) for execution under the control of the operating system 116.

Similarly, a remote user can interact with the digital data processing devices 120 and 140 over the network 110. The inputs from the remote user can be received and processed in whole or in part by a remote digital data processing device collocated with the remote user. Alternatively and/or in combination, the inputs can be transmitted back to and processed by the local client 120 or to another digital data processing device via one or more networks using, for example, thin client technology. The user interface of the local client 120 can also be reproduced, in whole or in part, at the remote digital data processing device collocated with the remote user by transmitting graphics information to the remote device and instructing the graphics subsystem of the remote device to render and display at least part of the interface to the remote user. Network communications between two or more digital data processing devices can include a networking subsystem 128 (e.g., a network interface card) to establish the communications link between the devices. The communications link that interconnects the digital data processing devices can include elements of a data communications network, a point to point connection, a bus, and/or another type of data path.

In one illustrative operation, the processor 114 of the client 120 executes instructions associated with software application programs 104 (including, for example, runtime instructions specified, at least partially, by the local user 102 and/or by another software application program, such as a batch-type program) that can instruct the processor 114 to at least partially control the operation of the graphics subsystem 122 in rendering and displaying a graphical user interface (including, for example, one or more menus, windows, and/or other visual objects) on the display device 126.

The network 110 can include a series of network nodes (e.g., the clients 120 and servers 140) that can be interconnected by network devices and wired and/or wireless communication lines (e.g., public carrier lines, private lines, satellite lines, etc.) that enable the network nodes to communicate. The transfer of data (e.g., messages) between network nodes can be facilitated by network devices, such as routers, switches, multiplexers, bridges, gateways, etc., that can manipulate and/or route data from an originating node to a server node regardless of dissimilarities in the network topology (e.g., bus, star, token ring), spatial distance (e.g., local, metropolitan, wide area network), transmission technology (e.g., TCP/IP, Systems Network Architecture), data type (e.g., data, voice, video, multimedia), nature of connection (e.g., switched, non-switched, dial-up, dedicated, or virtual), and/or physical link (e.g., optical fiber, coaxial cable, twisted pair, wireless, etc.) between the originating and server network nodes.

FIG. 1A shows processes 130, 132, 134, and 136. A process refers to the execution of instructions that interact with operating parameters, message data/parameters, network connection parameters/data, variables, constants, software libraries, and/or other elements within an execution environment in a memory of a digital data processing device that causes a processor to control the operations of the digital data processing device in accordance with the desired features and/or operations of an operating system, a software application program, and/or another type of generic or specific-purpose application program (or subparts thereof). For example, network connection process 130 and 132 refers to a set of instructions and/or other elements that enable the digital data processing devices 120 and 140 to establish a communication link and communicate with other digital data processing devices during one or more sessions. A session refers to a series of transactions communicated between two network nodes during the span of a single network connection, where the session begins when the network connection is established and terminates when the connection is ended. Database interface process 134 refers to a set of instructions and other elements that enable the server 120 to access the database 150 and/or other types of data repositories to obtain access to, for example, user data 142, place data 144, and place rules 148. The accessed information can be provided to the software application program 108 for further processing and manipulation. Administrative process 136 refers to a set of instructions and other features that enable the server 120 to monitor, control, and/or otherwise administer a place. For example, the administrative process 136 can (i) maintain and update configuration, runtime, and/or session data for the one or more digital data processing devices 120, 140 and/or the software application programs 104 or 108 executing on the devices 120, 140, (ii) provide buffer management, multi-threaded services, and/or data structure management, (iii) provide initialization parameters to the digital data processing devices 120, 140 and/or the software application programs 104, 108, (iv) manage groups of objects (e.g., groups of data elements stored on the digital data processing devices 120, 140 and/or stored or otherwise maintained in the database 150, groups of software application programs 104, 108, groups of users authorized to access software application programs 104 or 108, groups of licenses, etc.), (v) manage relationships between objects in response to messages communicated between digital data processing devices 120 and 140, (vi) provide support services (e.g., encryption and/or decryption, compression, path routing, message parsing, message format manipulation, etc.) to the digital data processing devices 120 and 140, and/or (vii) provide load balancing based on, for example, processor usage/availability, network usage/availability, memory usage/availability, software application program usage/availability, message length, and/or message volume.

Although the illustrated processes 130, 132, 134, and 136 and their features are described as being separate, the illustrated processes and/or their features can be combined into one or more processes if desired. One or more of the illustrated processes 130, 132, 134, and 136 can be provided using a combination of built-in features of one or more commercially available software application programs and/or in combination with one or more custom-designed software modules.

The databases 150 can be stored on a non-volatile storage medium or a device known to those of ordinary skill in the art (e.g., compact disk (CD), digital video disk (DVD), magnetic disk, internal hard drive, external hard drive, random access memory (RAM), redundant array of independent disks (RAID), or removable memory device). As shown in FIG. 1, the databases 150 can be located remotely from the client 120 and server 140. In some embodiments, the databases 150 can be located locally to client 120 or server 140 and/or can be integrated into client 120 or server 140, respectively. The databases 150 can include distributed databases. The databases 150 can include different types of data content and/or different formats for stored data content. For example, the databases 150 can include tables and/or other types of data structures.

Figure 1B:
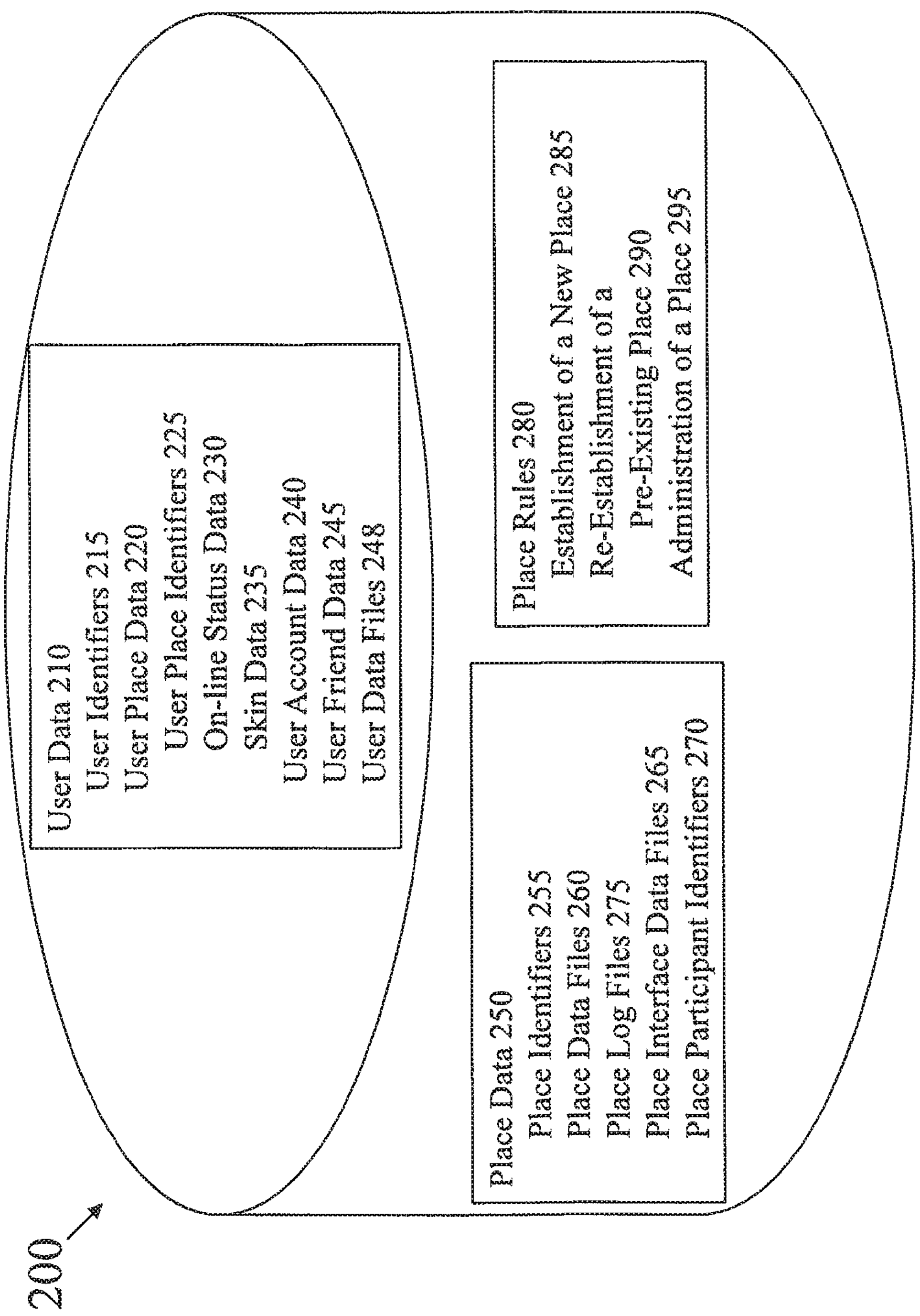
FIG. 1B schematically illustrates exemplary data for supporting a place in accordance with one embodiment of the present invention.

FIG. 1B schematically illustrates exemplary data for supporting a place. As shown in FIG. 1B, the exemplary data 200 includes user data 210, place data 250, and place rules 280.

User data 210 includes user identifiers 215, user place data 220, user account data 240, user friend data 245, and user data files 248. User identifiers 215 include data identifying the name and login information of each user of system 100. Usually, the login information includes a user identifier and associated authorization information for accessing system 100. The user identifier can include a numeric, an alphabetic, or an alphanumeric identifier, such as a username and/or an email address. The authorization information can include a password or passphrase and/or one or more types of biometric data unique to the user (e.g., a retinal scan, a thumb print, a voice sample, etc.). In some embodiments, the authorization information also includes data identifying a server capable of supporting one or more places in system 100 (e.g., server 140), such as, but not limited to, an Internet Protocol (IP) or other network address of the server and/or a domain name. In some embodiments, user identifiers 215 include contact information for the users of system 100. The contact information can be based on a wireless and/or a wired communication network and can include one or more of email addresses, regular/postal (i.e., non-electronic) mail addresses, and telephone numbers (e.g., cellular telephone numbers and landline telephone numbers).

User place data 220 include user place identifiers 225, data representing the on-line status 230 of the user, and skin data 235. Place identifiers 225 include data identifying the names of the places which the user has been authorized to access. The on-line status data 230 includes an on-line indicator that indicates whether a user has entered and/or otherwise accessed an active place (e.g., logged into an active place). In some embodiments, the on-line indicator includes a bit or flag that is set based on whether the user has entered a place. Usually, if a user has entered a place, the on-line status data 230 (and/or other data in user data 210) also includes the IP or other network address of the client 120 associated with the user for logging and/or debugging purposes. In some embodiments, the on-line status data 230 includes an activity indicator that represents a type and/or a degree of user activity in a place. For example, the activity indicator can include a binary busy/idle indicator that represents a period of activity/inactivity in the place (e.g., idle for the previous 10 seconds). Also for example, the activity indicator can include a complex, e.g., non-binary, indicator that can identify user activity inside and/or outside the place. Such a complex activity indicator can identify an active display or window on client 120 (e.g., a display or window into which data is currently being (and/or has recently been) entered and/or otherwise provided by a user input device) and a type and/or a degree of activity in the active display or window (e.g., 100 keystrokes per minute in an active word processing window).

User account data 240 includes credits and debits associated with user accounts, such as credits based on payments from the user and debits based on purchases by the user (e.g., purchases of access to and/or privileges within a place). Purchases can be made on an item-by-item basis (e.g., a rate per unit of time logged into a place) or, alternatively, on a subscription basis (e.g., a flat fee for unlimited access to a place in a time period). In some embodiments, user account data 240 can include information related to transactions between users 102 and system 100 (e.g., places which a user 102 visited, units of time elapsed during those visits, etc.). As will be understood by those of ordinary skill in the art, the disclosed systems and methods can be implemented with free (e.g., wide-open) access as an alternative to pay access.

User friend data 245 includes data identifying the friends of users of system 100. The friends of a user are other users with whom the user desires to correspond, collaborate, or otherwise interact in one or more places. The friend identifiers can include alphabetic, numeric, and/or alphanumeric identifiers, such as usernames and email addresses. In some embodiments, based on detecting the entrance of user 102 into system 100, server 140 can alert and/or otherwise notify the user friends that the user 102 has entered the system (e.g., transmit messages to the clients 120 associated with those friends). For example, in one embodiment, server 140 can provide a friend notification display for presentation in the place interface and/or in the active displays of the clients 120 of the user friends. Alternatively and/or in combination, in some embodiments, based on detecting the entrance of user 102 into an active place, server 140 can alert and/or otherwise notify the user friends in the active place that the user has entered the place.

Place data 250 includes data representing the features of places that are supported by system 100. Place data 250 includes place identifiers 255, place data files 260, place log files 275, place interface data files 265, and place participant identifiers 270. Generally, places can have one of two states, specifically, active or dormant, which states are determined based on whether the places are currently being administered by server 140 (e.g., based on whether one or more users are currently logged into the places). As further described herein, each place is associated with a place identifier 255, and each place identifier 255 is associated with one or more place data files 260, one or more place log files 275, one or more place interface data files 265, and one or more place participant identifiers 270. The place identifiers 255 include data identifying the names of the places supported by system 100. The place identifiers 255 can include alphabetic, numeric, and/or alphanumeric identifiers that can be at least partially chosen and/or otherwise determined by users of system 100.

Each place interface data file 265 includes data identifying features of the place interface corresponding to a place identifier 225. As previously indicated herein, server 140 can provide data to clients 120 via a place interface, form a network connection among the clients 120, and mediate interactions among the clients 120. A place interface can include a display and/or one or more sub-displays, and each display and each sub-display can include one or more check boxes, one or more response boxes, one or more radio buttons, one or more pull-down menus, one or more icons, and/or one or more other visual objects that facilitate collaboration. (An exemplary place interface is shown in FIG. 3D.) Usually, a place interface includes a primary display (e.g., a window) and one or more secondary or sub-displays therein (e.g., secondary or sub-windows), in which each secondary display supports a different collaboration activity or a feature of a place. In some embodiments, the secondary displays are configured for presenting data based on one or more of the place data files 260, the place log files 275, and the place participant identifiers 270 associated with place identifier 255. Each place interface data file 265 thus includes data representing the type, number, and organization of displays and sub-displays in the place interface corresponding to place identifier 225.

In some embodiments, the originator of place (e.g., client 120 that first establishes a new place) selects and/or otherwise determines the default features of the place interface, such as the type, number, and organization of displays included in the interface and/or the type, number, and organization of applications included in a system tray of the place interface.

Alternatively and/or in combination, in some embodiments, the look-and-feel of the place interface of client 120 can be customized by end user 102. As shown in FIG. 1B, user place data 220 includes skin data 235, which includes user selections and/or determinations of customizable features of place interfaces. The customizable features can include sizes of displays and sub-displays; locations and organization of sub-displays within a display; font colors, sizes, and types; background colors and types; and/or other features known to those of ordinary skill in the art. Generally, each client 120 authorized to access a place can customize the place interface by which it interacts with server 140 and other clients 120.

Each place data file 260 includes data files that can be displayed, modified, and/or otherwise manipulated by one or more clients 120 (consecutively and/or concurrently) via a place interface corresponding to a place identifier. As further described herein, in most embodiments, place data files 265 are associated with a place identifier based on the uploading of those files into the corresponding place interface by a client 120 (e.g., based on detecting dragging-and-dropping actions by the client 120). As used herein, the term data files can be understood to include files having types and formats of data known to those of ordinary skill in the art. For example, the term data files can include application files, data files, executable files, object files, program files, operating system files, registry files, and other types of data files known to those of ordinary skill in the art. In some embodiments, the place data files 260 include one or more of audio data files, video data files (e.g., still and/or animated video files), documents including text and/or graphics, and multimedia presentations (e.g., presentations, such as a slide show, that include a combination of the foregoing types of data files).

Generally, the place data files 260 are accessible (e.g., are able to be accessed, viewed, and/or otherwise modified) by all users in a place, regardless of which user uploaded the data files 260 into the place. As such, the place data files 260 are public data files.

In contrast, user data files 248 are accessible by default by only a single user. As such, user data files 248 are private data files. As further described herein, the disclosed systems and methods provide an office utility via the place interface. In most embodiments, a user can associate one or more data files with the corresponding office utility based on uploading those data files into the utility. The uploaded data files are associated with the user identifier 215 of the user and are stored in user data files 248. The user data files 248 can be accessed by default only by the uploading user. In some embodiments, the uploading user can designate the user data files as public data files. For example, in some of such embodiments, the uploading user can copy and/or otherwise transfer one or more of the user data files 248 to the place data files 260 associated with a place identifier 255.

Place log files 275 include data that is generated by the disclosed systems and methods based on interactions between clients in a place corresponding to place identifier 255. As further described herein, in some embodiments, clients 120 can share data files and/or exchange chat messages with each other in a place, and server 140 can generate place log files 275 that can include, among other things, data representing the manipulation of the shared data files (such as the types of manipulation by clients 120) in the file and/or transcripts of the exchanged chat messages in the place. The place log files 275 can be provided to clients 120 upon subsequent access to the place.

Place participant identifiers 270 include data identifying the authorized participants of places supported by system 100. The authorized participants of a place are determined based on the schemes described herein. Place participant identifiers 270 also include data identifying the present participants in (i.e., participants logged into, signed into, or otherwise entered into) an active place.

Place rules 280 include rules for establishing new place 285, rules for re-establishing pre-existing place 290, and rules for administering place 295. As described further herein, the rules for establishing new place 285 include rules for determining the features of the place (e.g., participants, data files, etc.); the rules for re-establishing a pre-existing place 290 include rules for identifying the place identifier 255 of the place, accessing stored place data 250 that is associated with the place identifier 255, and providing the place data 250 to clients 120 via a place interface; and the rules for administering a place 295 include rules for authenticating and otherwise authorizing clients to participate in a place and administering asynchronous and synchronous interactions among clients 120 in the place, such as exchanging of chat messages or sharing of content.

Other advantageous features are also provided and illustratively described herein. Examples of systems and methods for collaboration that implement TCP/IP or that include object based implementations are illustratively shown in FIGS. 2A-2D. Systems and methods for collaboration as illustratively described herein can be implemented using a standard client/server model (FIG. 1) using, for example, TCP/IP as the transport mechanism. The server is, for example, a Java-based server that runs inside an Apache Tomcat container. The server is, for example, configured to maintain a list of active client sessions sockets for new clients, maintain the information store, and broadcast change and request notifications to clients as appropriate.

The server is, for example, configured to maintain a list of active client sessions, and their related collaboration objects. A "collaboration object" can include any object in the system that coordinates, facilitates, or otherwise tracks the actions of the participants and can reference a particular meeting or conference or collaboration (synchronous and/or asynchronous).

Collaboration places (e.g., each collaborative place initiated) can track which collaboration objects a client has open on their desktop. Open collaboration objects implicitly define the set of event notifications that a client would be interested in. In addition, the server has a distinguished identifier for each client connected so that other clients may easily direct specific messages to specific individuals (e.g., IM). The distinguished identifier may be specific to a person. Whenever a change happens in a collaboration object, the server notifies all of the other clients that are in that collaboration object of the event. Possible event notifications include:

content added, deleted, moved, renamed, or deleted,
screen sharing initiated, stopped, updated,
person entered, exited, idled, disconnected,
chat message added,
meeting started, stopped, suspended, postponed, updated The systems and methods of FIGS. 2A-2D can be implemented using a software language such as, but not limited to, Java and C #. C # is the component-oriented development language for creating XML Web services and Microsoft . NET-connected applications for Windows and the Web. The user, when installing or launching the client, indicates the address (IP address or domain name) of the system server they wish to use for communication. Examples of computer platforms for a system server and client for implementing collaboration are illustratively shown in FIGS. 2B and 2C.

Figure 2A:
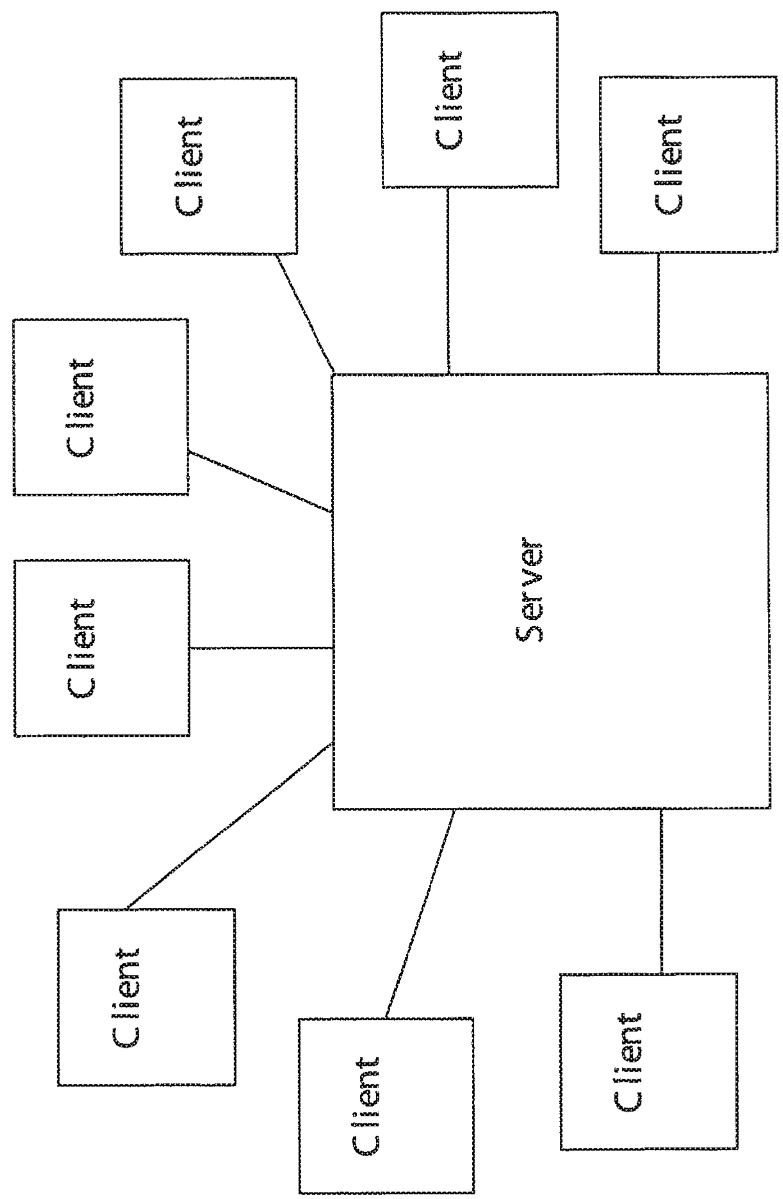
FIG. 2A is a functional block diagram of an illustrative system diagram in accordance with one embodiment of the present invention.
Figure 2B:
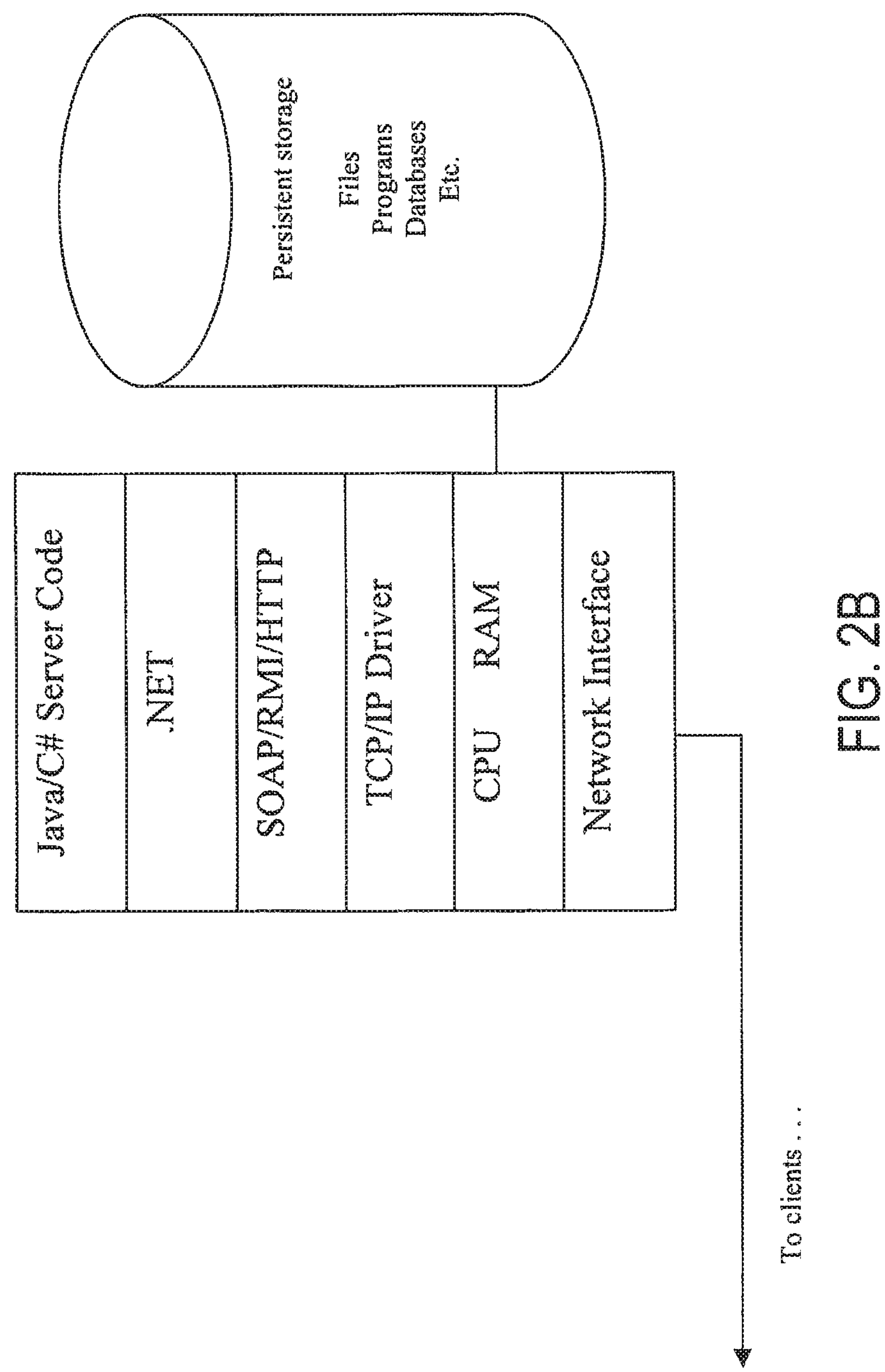
FIG. 2B is a functional block diagram of an illustrative system server in accordance with one embodiment of the present invention.
Figure 2C:
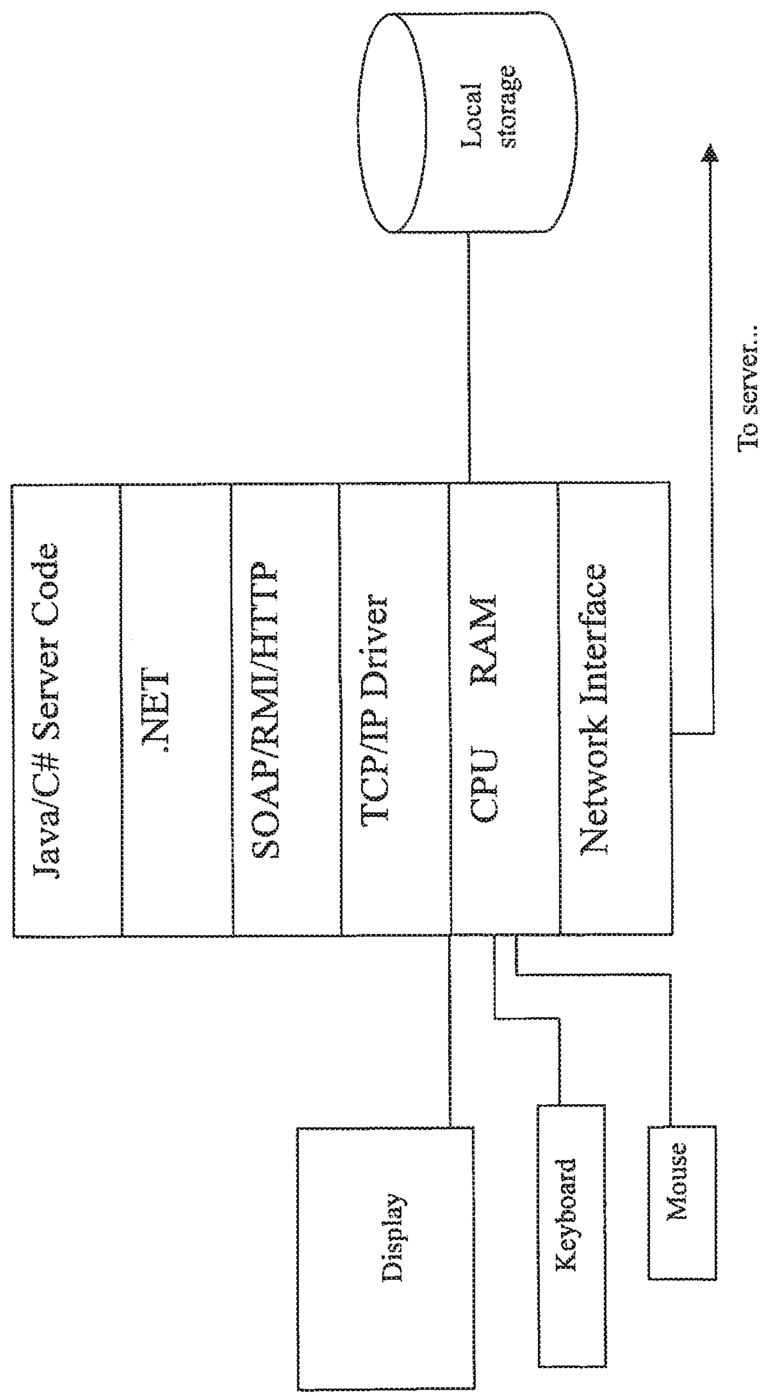
FIG. 2C is a functional block diagram of an illustrative system client in accordance with one embodiment of the present invention.
Figure 2D:
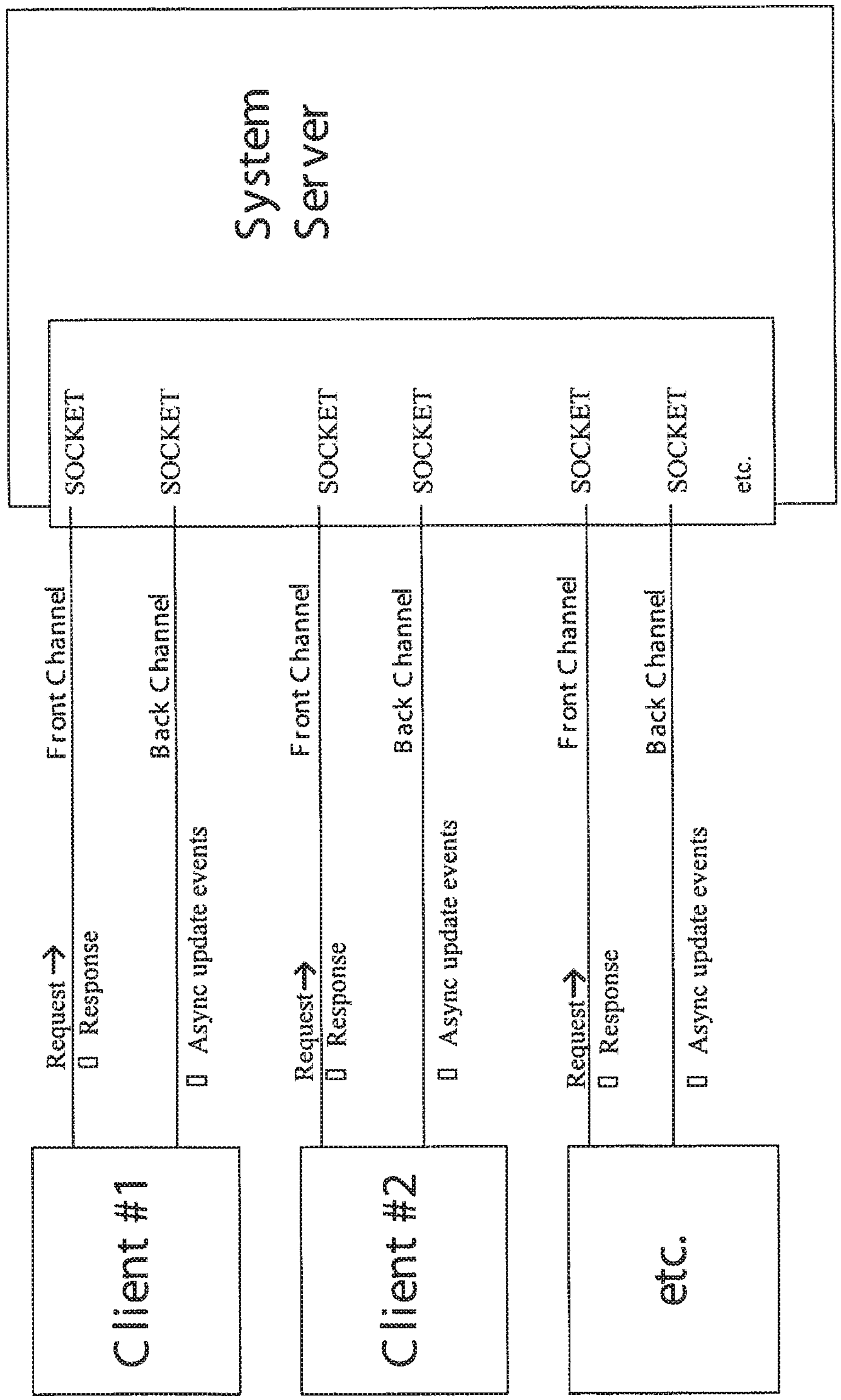
FIG. 2D is a functional block diagram of illustrative system server sockets in accordance with one embodiment of the present invention.

Communications in support of collaboration can be configured in different ways. For example, as shown in the example of FIG. 2D, the client opens two sockets to the server, called the front channel and the back channel. As shown, the front channel is used for normal request/response interactions with the server. The client makes a request of the server and the return value is returned in the response packet. These requests are all synchronous although they may have optional return values. The back channel is used for the server to push event notifications to the client. These happen asynchronously to any other activity on the client and can occur at any time. If desired, the client never writes to the back channel, only reads from it. In some embodiments, the back channel is a secondary TCP connection for asynchronous updates transmitted from the server to the client.

Other techniques, such as to use more than two sockets or to both receive and transmit on two or more socket connections can be used. Alternatively and/or in combination with a back channel connection, in some embodiments, the disclosed systems and methods can be implemented with polling (e.g., periodic, continuous, etc.) to provide updates from the server to the client. For example, in some of such embodiments, polling can be used to provide updates when a back channel connection is not available (e.g., in scenarios in which a firewall or other network security device prevents direct connection to a client.) Also, in some embodiments, by way of example, the disclosed systems and methods can be implemented without a back channel.

The client and server can use any of a number of protocols to communicate. For example, in an embodiment using a Java client, the Java client can be configured to communicate with the server using RMI. The Java Remote Method Invocation (RMI) system allows an object running in one Java Virtual Machine (VM) to invoke methods on an object running in another Java VM. RMI provides for remote communication between programs written in the Java programming language. The C # client can for example communicate with the server using SOAP, or Simple Object Access Protocol, which defines the use of XML and HTTP to access services, objects, and servers in a platform-independent manner or a similar a protocol. The protocol used should preferably be able to handle multiple, arbitrarily sized binary attachments inline.

Illustrative displays of user interfaces that facilitate collaboration are shown in FIGS. 3A-3G. The illustrative displays can include one or more check boxes, one or more response boxes, one or more radio buttons, one or more pull-down menus, one or more icons, and/or one or more other visual objects to facilitate collaboration. Those of ordinary skill in the art will understand that the illustrative displays are to be interpreted in an exemplary manner and that displays different than those shown and described herein can be used within the scope of the present disclosure. For example, features of the illustrative displays can be combined, separated, interchanged, and/or rearranged to generate other displays.

The illustrative displays can be provided by a server, a client, or a combination thereof (e.g., resident collaboration software application implemented on a client) The illustrative displays are described in the context of interactions (e.g., requests and responses) between client 120 and server 140 in system 100.

Figure 3A:
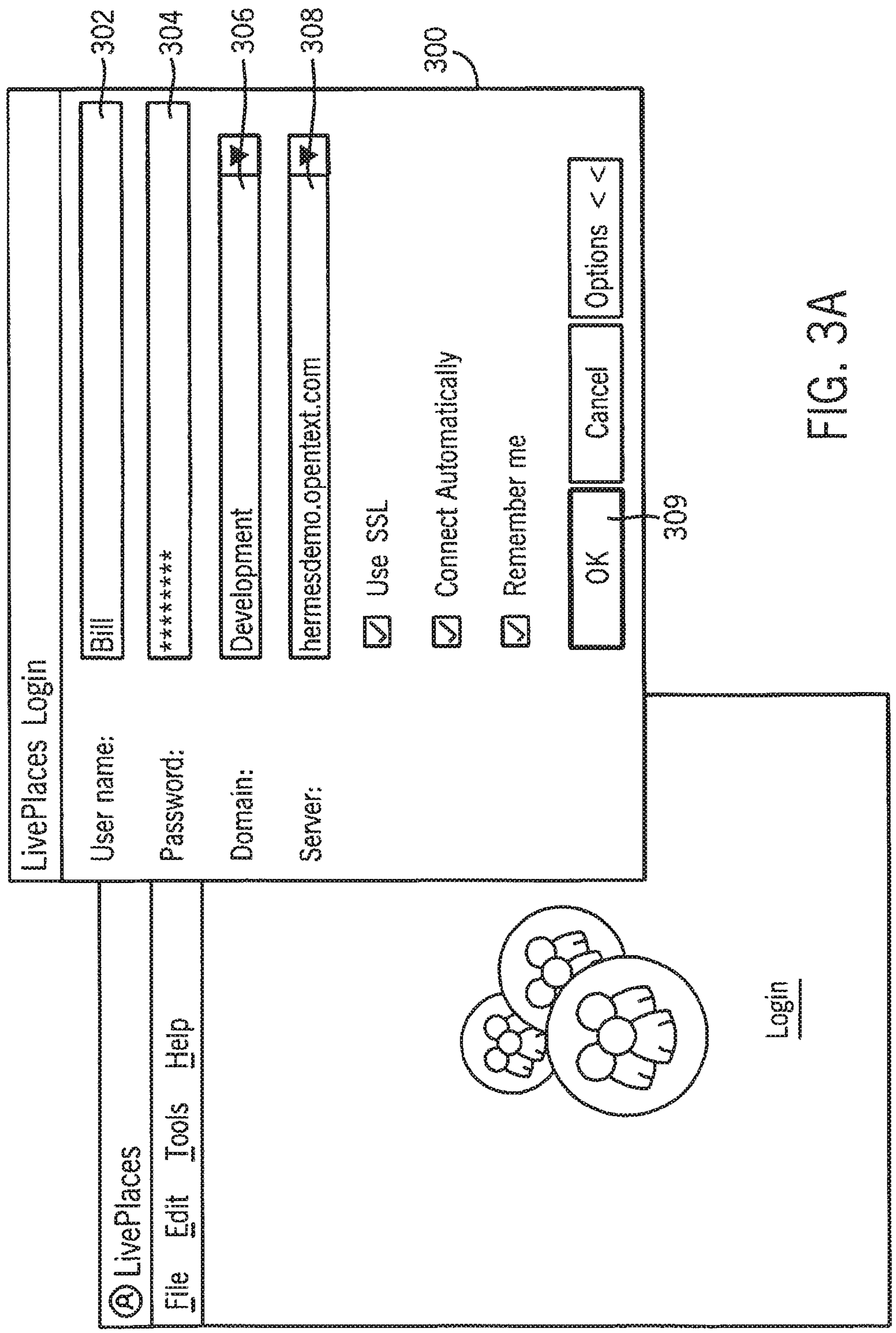
FIGS. 3A-3G schematically illustrate exemplary displays of a collaboration tool in accordance with one embodiment of the present invention.

FIG. 3A shows an exemplary login window 300 that provides access to system 100. As shown in FIG. 3A, the login window 300 includes query box 302 for providing a username and query boxes 304-308 for providing authorization information (e.g., password, domain name, and server name) for accessing system 100. The login window 300 also includes data entry button 309 for submitting the username and authorization information to server 140.

Figure 3B:
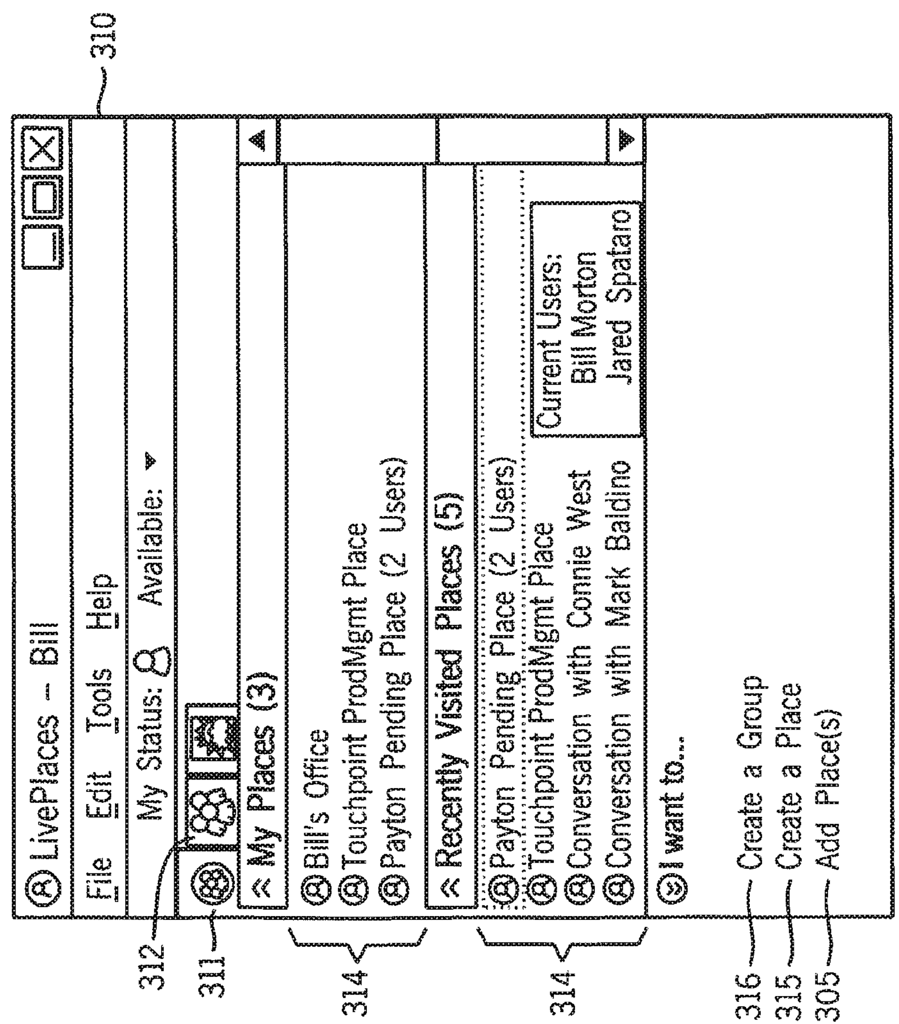
Figure 3C:
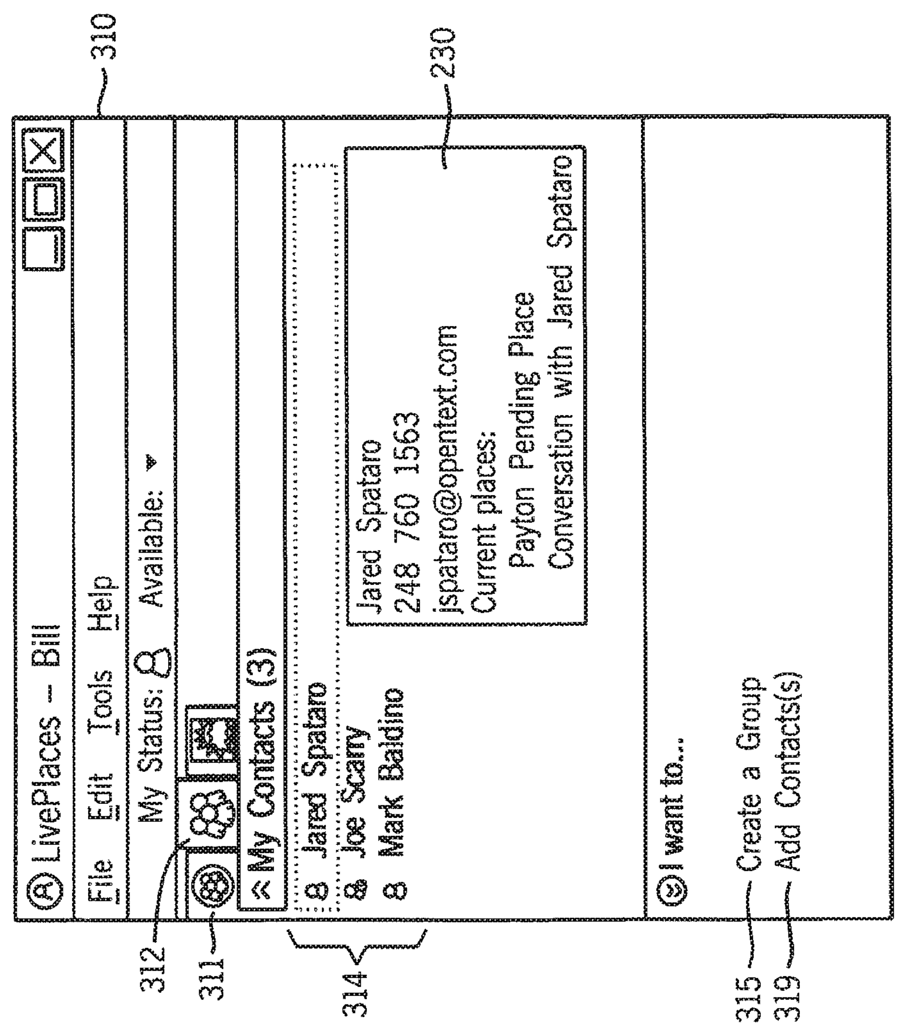
Figure 3D:
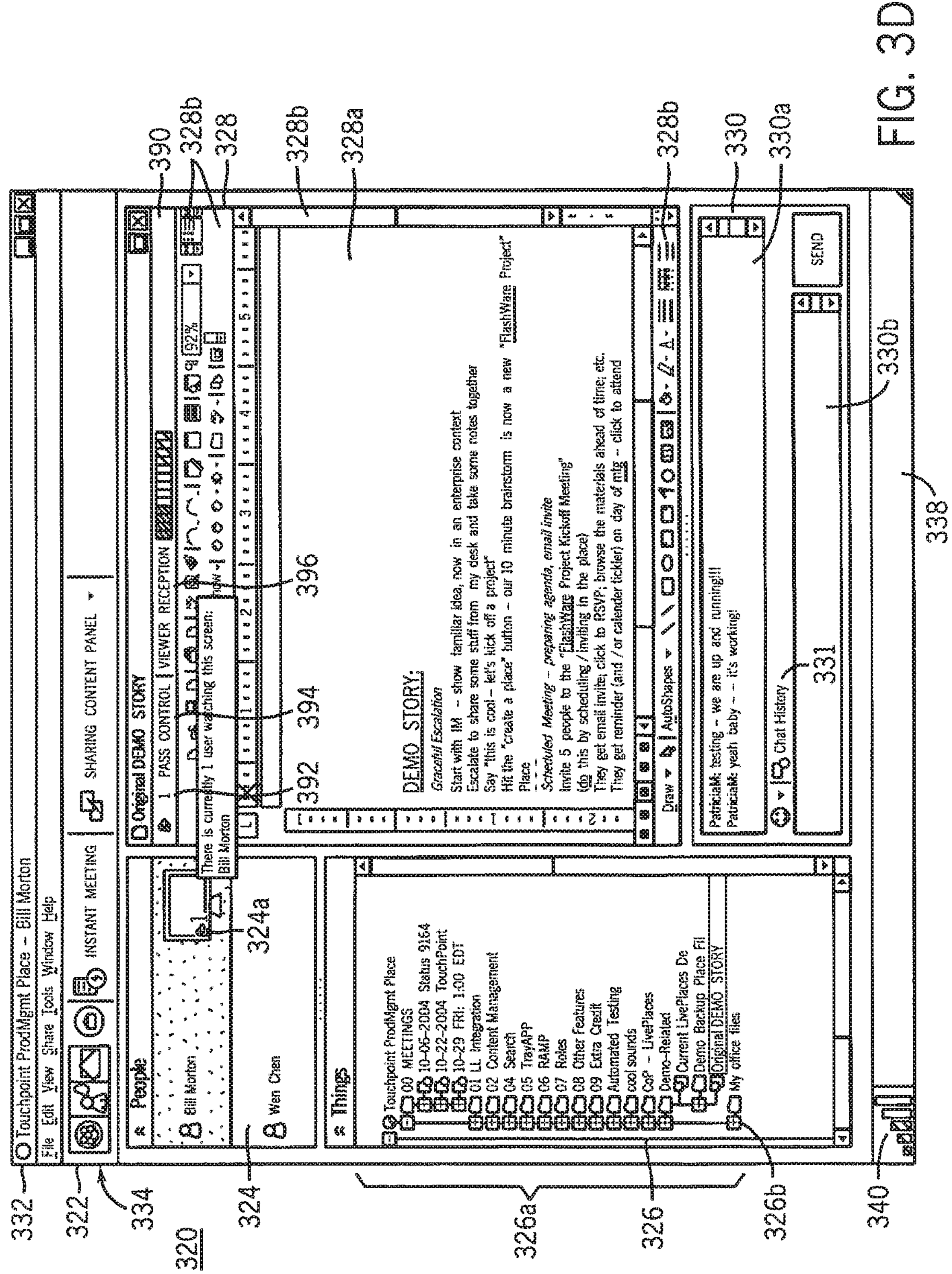

FIGS. 3B and 3C show an exemplary welcome window 310 that provides access to places and friends. As shown in FIGS. 3B and 3C, the welcome window 310 includes place icon 311 and friend icon 312. As shown in FIG. 3B, based on a selection of the place icon 311, the welcome window 310 provides icons 314 for selecting among one or more pre-existing places. The places 314 can be organized into categories, e.g., the categories all places, my places, recently visited places, and new places. As shown in FIG. 3C, based on a selection of the friend icon 312, the welcome window provides icons 317 for establishing chat sessions with friends. In some embodiments, selecting and/or otherwise designating friend icon 317 can produce a display of at least some of the on-line status data 230 associated with the corresponding friend. As shown in FIGS. 3B and 3C, the welcome window 310 can also include icons 315, 316, 319 and 305 for establishing a new place, establishing a new user group, adding a friend, and adding to user data.

FIG. 3D shows an exemplary place interface for a user of system 100. As shown in FIG. 3D, the interface 320 includes primary window 322, several sub-windows 324-330, pull-down menus 332, icons 334, and a tray 338. Sub-window 324 (otherwise referred to herein as the people window 324) is configured for displaying data identifying the participants in an active place. For example, people window 324 shows a list of participant user names. In some embodiments, such as the embodiment shown in FIG. 3D, people window 324 is configured for displaying miniature screen shots or "thumbnails" 324*a* of the place interfaces (and/or portions thereof and/or other displays) or other local content of a client (e.g., active window or desktop application). Sub-window 326 (otherwise referred to herein as the things window 326) is configured for displaying data identifying the place data files 260 that are associated with the place as well as the user data files 248 that are associated with a user. For example, things window 326 displays a data file directory including public portion 326*a* and private portion 326*b*. Selecting a data file in things window 326 (by, e.g., double-clicking on the file with a mouse) causes the data file to be presented in sub-window 328 (otherwise referred to herein as content window 328). The content window 328 can present content 328*a*, toolbars 328*b* for modifying the content, and scrollbars 328*c* for navigating the content. Sub-window 330 (otherwise referred to herein as the chat window 330) includes portions 330*a* and 330*b*. Portion 330*a* is configured for displaying a chat transcript, and portion 330*b* is configured for receiving chat messages for transmission, e.g., to friends and/or to other users in a place. Chat window 330 also includes an icon 331 for displaying prior chat transcripts, e.g., chat transcripts generated during previous visits to a place.

With continuing reference to FIG. 3D, a control panel 390 can be displayed in adjacent or contiguous relationship with the content window 328 based on receiving a request from a user to share content with other users. As shown in FIG. 3D, the control panel 390 can include a visual object 392 identifying a quantity of users sharing (i.e., observing) the content presented in the content window 328, a control icon 394 for passing and/or requesting control of (e.g., permission to edit and/or otherwise write to) the shared content, and a viewer reception status bar 396 representing the quality of the connection between the users sharing content.

With continuing reference to FIG. 3D, the pull-down menus 332 (labeled "File, Edit, View, Share, Tools, Window, Help") allow a participant of a place to access, view, and otherwise manipulate data files. The icons 334 allow a participant of a place to select among the people, things, content, and chat windows 324, 326, 328, and 330 for display within the primary window 322. For example, based on a selection of one of the icons, the sub-window corresponding only to that icon is displayed. Also for example, based on a consecutive selection of multiple icons, the display of the place interface can be "gracefully" (i.e., gradually) escalated, e.g., from a single sub-window to two or more sub-windows, facilitating synchronous and/or asynchronous interactions among users in a place. As shown in FIG. 3D, the tray 338 includes connection status indicator 340 that provides data representative of the connection between client 120 and server 140. The connection status indicator 340 can include a bar graph or other type of statistical indicator that indicates one or more of a ping time, a back channel response time, a connection quality and/or other connection statistics. In some embodiments, tray 338 can include icons or other visual objects for loading or otherwise accessing applications (e.g., icons for accessing a word processing application, a spreadsheet application, etc.) in a place.

If desired, window 328 can be configured to also provide personal organization tools that display information supporting the current place. For example, as show in FIG. 3F, a list of documents to be reviewed can be displayed, a list of upcoming meetings and/or help tools can be displayed. This functionality can for example be displayed when window 328 is not being used for content sharing.

A meeting window displayed in the exemplary place interface 320 of FIG. 3D can display a meeting name identifier, meeting status indicator that represents the current status of the meeting (e.g., just started, paused, ending in five minutes, etc.), a meeting icon for controlling the status of the meeting (e.g., starting, pausing, resuming, and/or ending the meeting), a presenter identifier that identifies the user identifier of the meeting presenter, and a podium that includes a miniature screen shot or "thumbnail" of the content being shared by the meeting presenter.

Figure 3E:
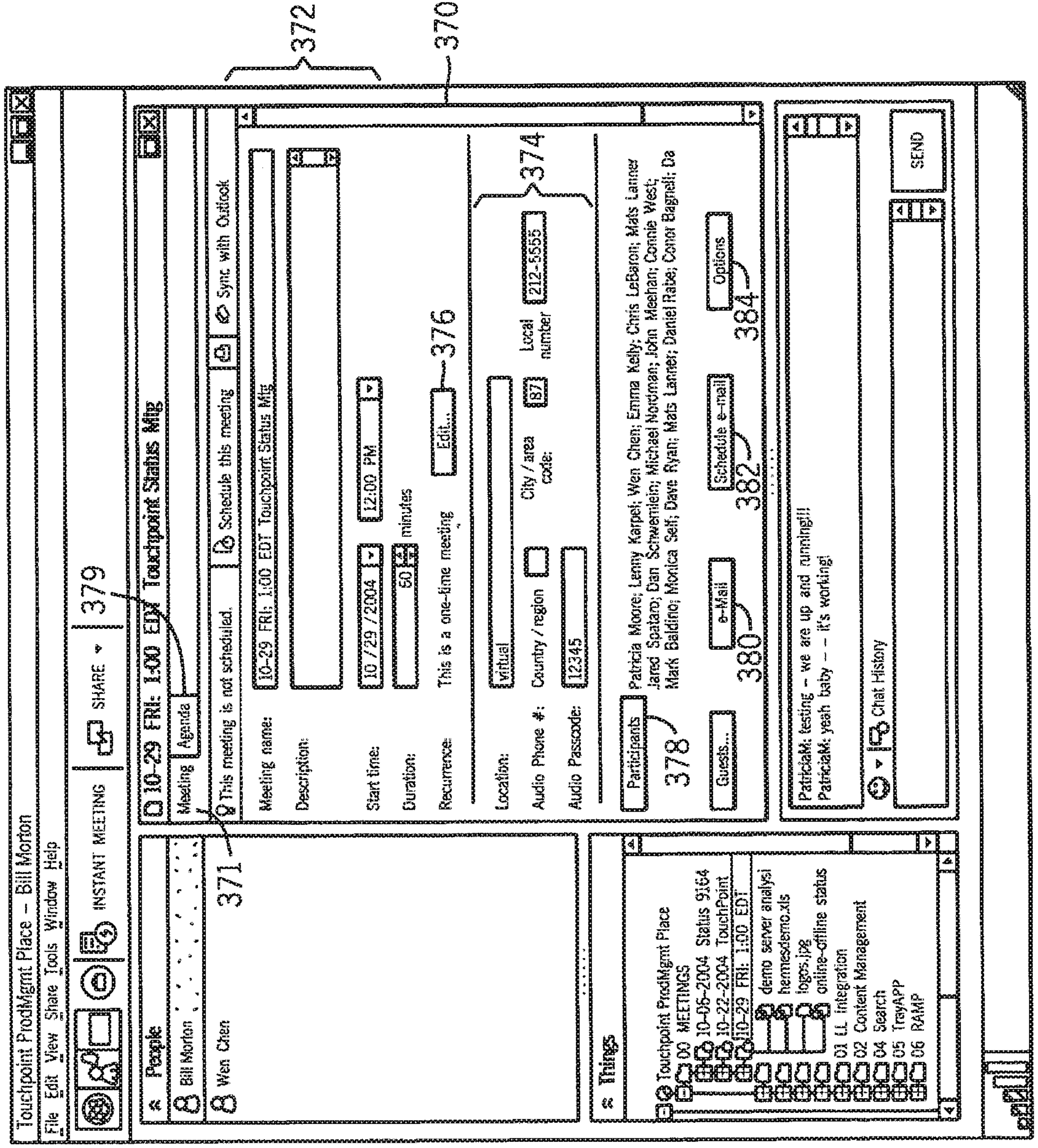
Figure 3F:
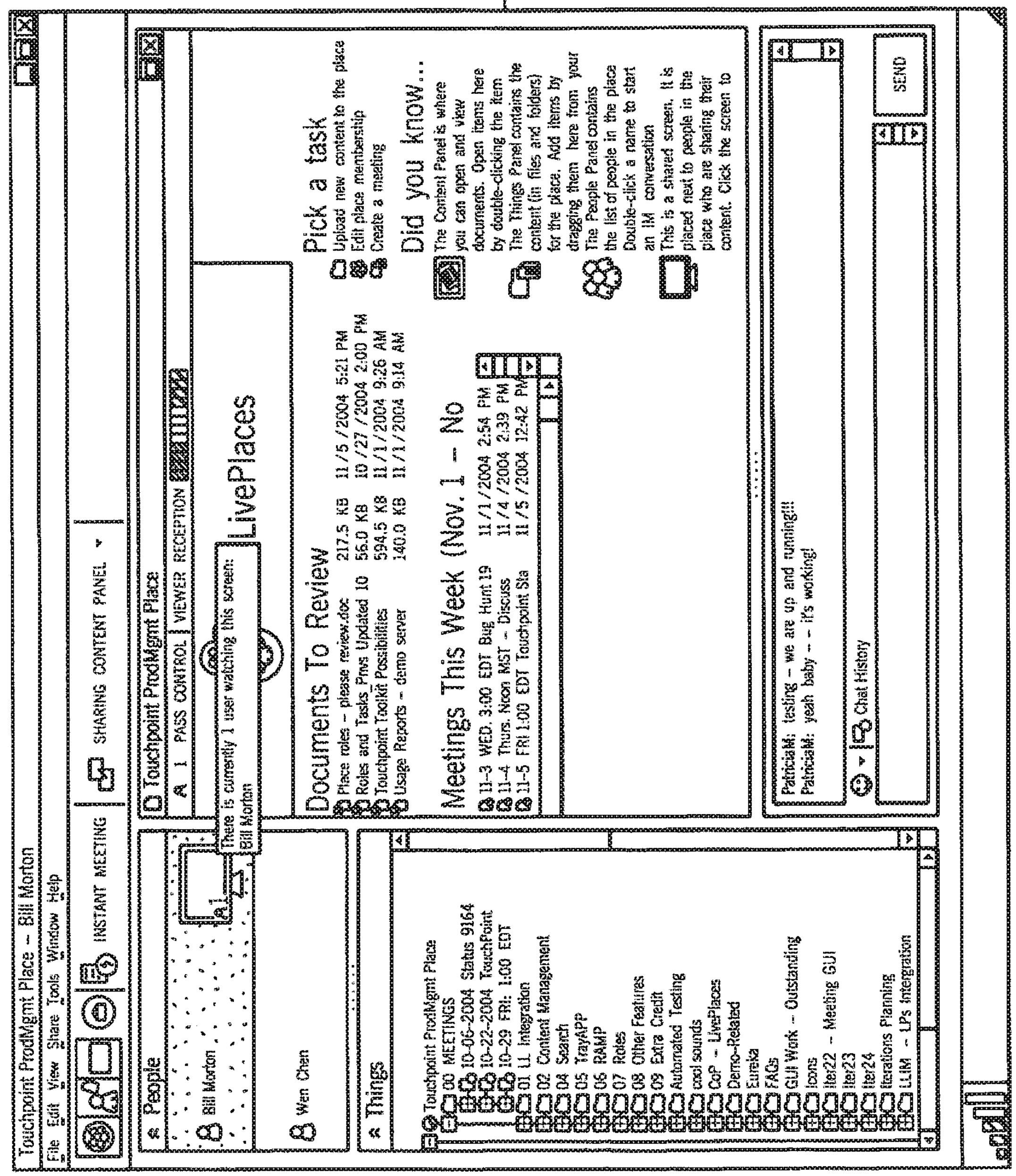
Figure 3G:
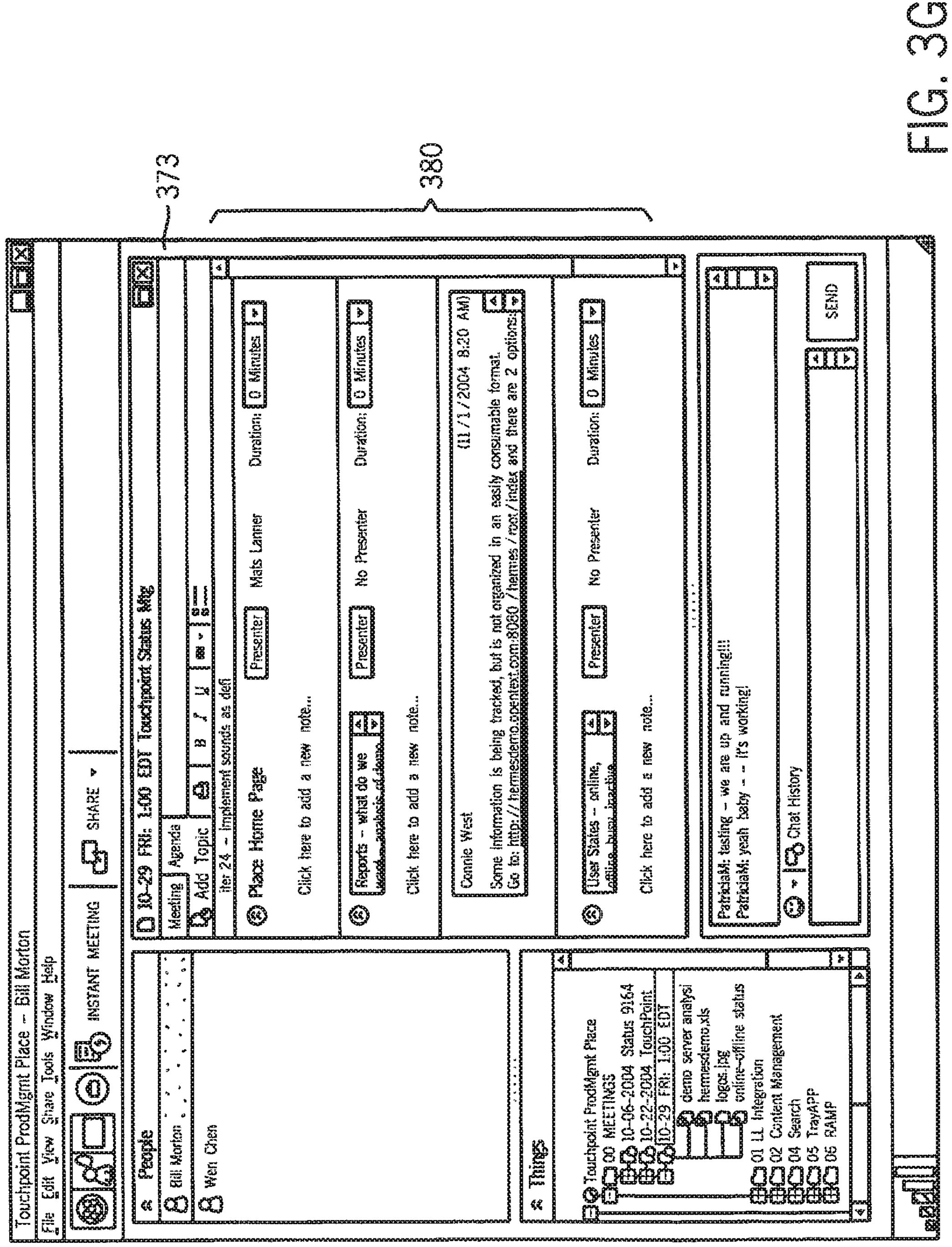

FIG. 3E shows an exemplary meeting invitation window 370 for display in the exemplary place interface 320 of FIG. 3D. As shown in FIG. 3E, the exemplary meeting invitation window 370 includes meeting icon 371 and an agenda icon 374. Based on a selection of the meeting icon 371, the invitation window 370 provides one or more visual objects for scheduling a meeting in a place among users of system 100. For example, the meeting invitation window 370 includes response boxes 372 for providing a name, a description, a start time, and a duration of a meeting to be scheduled, response boxes 374 for providing data related to an accompanying telephone conference call (e.g., a telephone number of the conference call and a password or passcode for accessing the conference call, etc.), a recurrence icon 376 for establishing the recurrence of the meeting (e.g., one time, daily, weekly, etc.), participant and guest icons 378 for identifying the users of system 100 to be invited to the meeting, an email icon 380 for transmitting email invitations to the invited users, a scheduling icon 382 for scheduling the transmission of the email invitations, and an options icon 384 for selecting one or more additional meeting options (e.g., options for archiving the meeting, emailing a meeting summary to the invited users, etc.).

By selecting agenda 379, further options or features related the meeting can be configured. For example, with reference to FIG. 3G, Agenda window 373 is displayed. Window 373 provides a list of Agenda items 380 for the meeting. Each item 380 provides a title of the agenda item, a presenter, a duration, and a notes section. Agenda items 380 are user-configurable (e.g., to select a presenter for an agenda item).

In one illustrative operation and with reference to FIG. 1A, the software application program executing within memory 118 of the client 120 can detect a request 138 to access a place from the user 102 by, for example, receiving an indication from the I/O subsystem 124 that detected a mouse click, a keyboard entry, and/or another input event initiated by the user 102 (e.g., an entry received with respect to the login window 300 of FIG. 3A). In reply to the request 138, the software application program 104 instructs the graphics subsystem 122, via the processor 114, to display one or more options for selection by the user 102 and/or one or more requests for information from the user 102. The user 102 can then initiate another input event corresponding to, for example, an entry or selection of a place identifier (e.g., a selection received with respect to welcome window 310 of FIG. 3B). Similar sequences of input events and detections by the software application program 104 can enable the user 102 to specify one or more additional parameters that define the request 138. The request 138 (and, more generally, other requests generated by client 120) and its associated parameters selected by the user 102 can be maintained in the memory 118 of the client 120 prior to transmission to the server 140 via the network 110. The software application program 104 can apply one or more rules to the request 138 to reduce the occurrence of erroneous requests. One or more of these rules can be contained in memory 118. Alternatively and/or in combination, the software application program 104 can access one of more of these rules from the databases 150 via the network 110. Software application program 104 can apply one or more data validation rules to the request 138 to determine the validity of the parameters associated with the request and notify the user 102 of errors.

With continuing reference to FIG. 1A, the software application program 104 can instruct the network connection process 130 of the client 120 to transmit the parameters associated with the request 138 selected by the user 102 to a calculation process or another software process associated with the software application program 108 executing on the server 140 by, for example, encoding, encrypting, and/or compressing the selected request 138 into a stream of data packets that can be transmitted between the networking subsystems 128 of the digital data processing devices 120 and 140. The network connection process 132 executing on the server 140 can receive, decompress, decrypt, and/or decode the information contained in the data packets and can store such elements in a memory accessible to the software application program 108. The software application program 108 can process the request 138 by, for example, applying one or more place rules 148 to the request 138.

Figure 4:
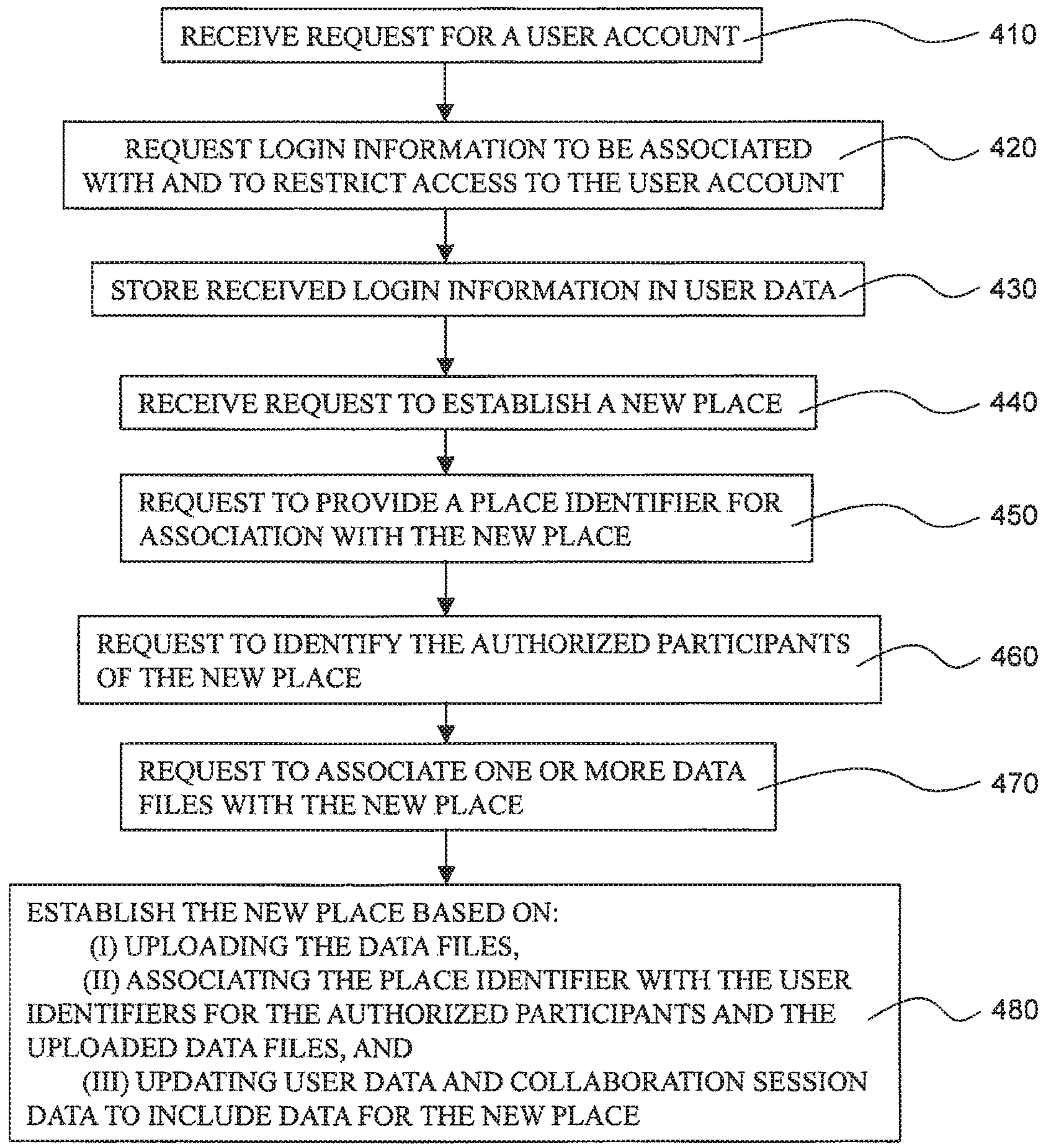
FIG. 4 schematically illustrates an embodiment of a method for establishing a new place in accordance with one embodiment of the present invention.

FIG. 4 schematically illustrates an example of steps involved in an embodiment of a method for establishing a new place.

As for example shown in FIG. 4, a request from a user (e.g., user 102 in communication with client 120) for a user account is received at a server (e.g., server 140) in system 100 (410 in FIG. 4). Based on receiving the request, server 140 (e.g., a software application program residing on server 140) prompts, queries, and/or otherwise requests client 120 to provide the login information (e.g., the user identifier and authorization information) to be associated with the user account and used to restrict subsequent access to the account (420 in FIG. 4). Usually, based on receiving the request, the server 140 establishes a secure connection (e.g., a virtual private network (VPN) connection and/or another type of secure connection known to those of ordinary skill in the art) with the client 120 to inhibit and/or prevent interception of the login information by third parties. In some embodiments, server 140 prompts, queries, and/or otherwise requests client 120 to provide additional information for association with the user account, e.g., the contact information described with respect to user data 210 in FIG. 2.

With continuing reference to FIG. 4, server 140 receives the login information and, in some embodiments, the contact information, and stores that information in user data 210 (430 in FIG. 4). Based on receiving a request for establishing a new place (440 in FIG. 4), server 140 queries, prompts, and/or otherwise requests client 120 to provide a place identifier for and, in some embodiments, a description of the new collaboration place (450 in FIG. 4). For example, server 140 can prompt client 120 based on instructing the graphics subsystem 122 of client 120 to present the welcome window 310 of FIG. 3B on display device 126. Server 140 can then request that client 120 identify the authorized participants of the new place (460 in FIG. 4). Usually, server 140 provides the user identifiers 215 for the users of system 100 to client 120, and requests that client 120 select and/or otherwise designate one or more of those user identifiers to authorize access to the new place. Additionally, in some embodiments, server 140 requests client 120 to associate one or more data files with the place (e.g., one or more data files residing on local memory) (470 in FIG. 4). As described herein, in some embodiments, such data files can be associated with the place based on the dragging-and-dropping those data files (or representations thereof, such as icons) into the place interface by client 120. Server 140 establishes the new place based on (i) uploading the data files to be associated with the new place, (ii) associating the place identifier of the new place with the description, the selected and/or otherwise designated user identifiers of the authorized participants, and the uploaded data files, and (iii) updating user data 210 and place data 250 to include data for the new place (480 in FIG. 4).

As previously indicated, in some embodiments, the originator of a place, such as client 120 in the context of FIG. 4, can select and/or otherwise determine the default features of the place interface. For example, in one such embodiment, server 140 can query, prompt, and/or otherwise request client 120 to select one or more default features. Alternatively and/or in combination, in some embodiments, server 140 can provide one or more groupings of default features to client 120 for selection. Each grouping can be associated with a field of use (e.g., business, engineering, humanities, legal, medical, scientific, etc.) and a tray including one or more pre-determined applications that are relevant to that field of use (e.g., a spreadsheet application for the business field of use, a whiteboard application for the engineering field of use, etc.). Based on receiving a selection of a grouping, server 140 can provide a corresponding place interface to client 120.

Figure 5A:
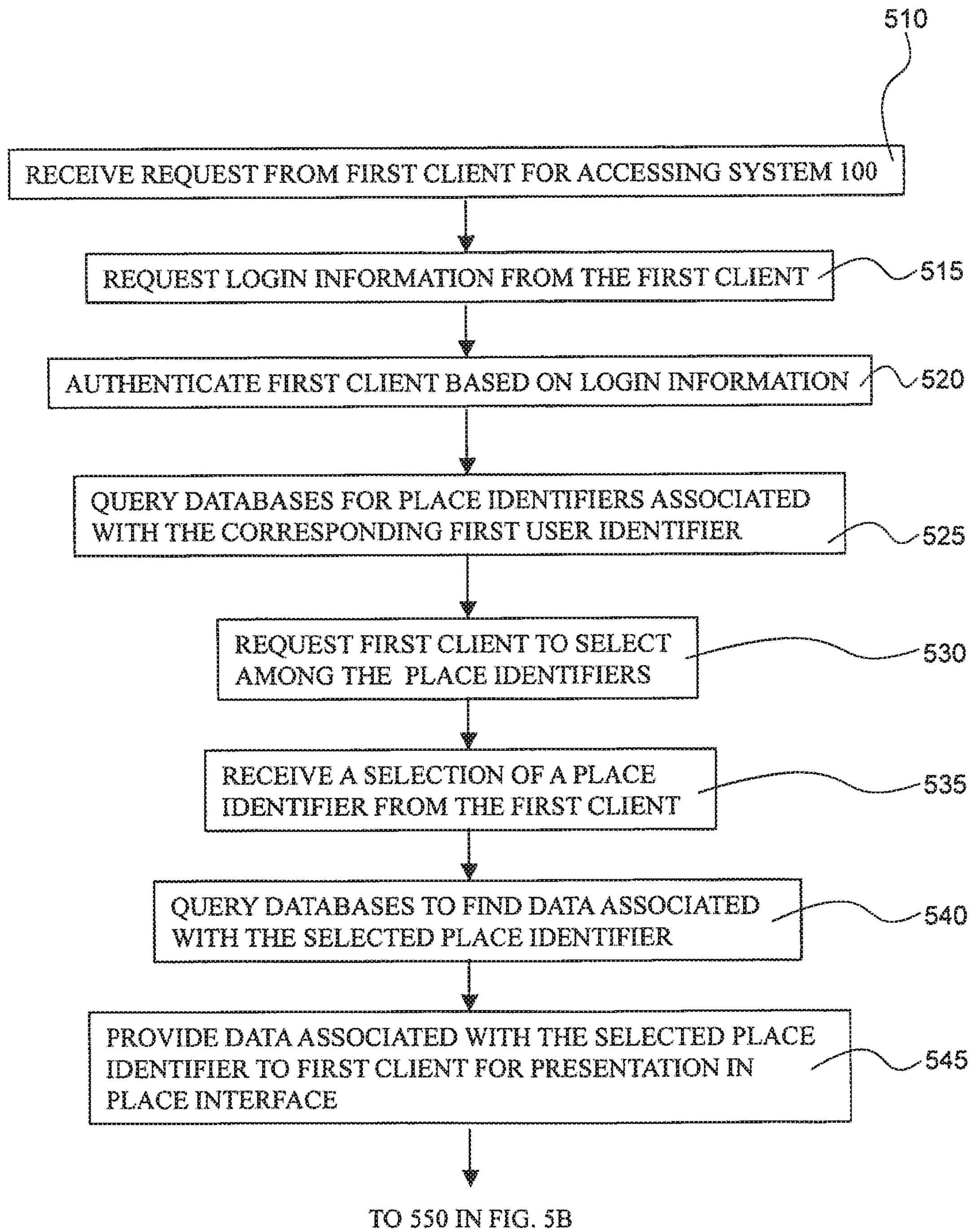
FIGS. 5A-5C schematically illustrate an embodiment of a method for providing access to a previously established place in accordance with one embodiment of the present invention.
Figure 5B:
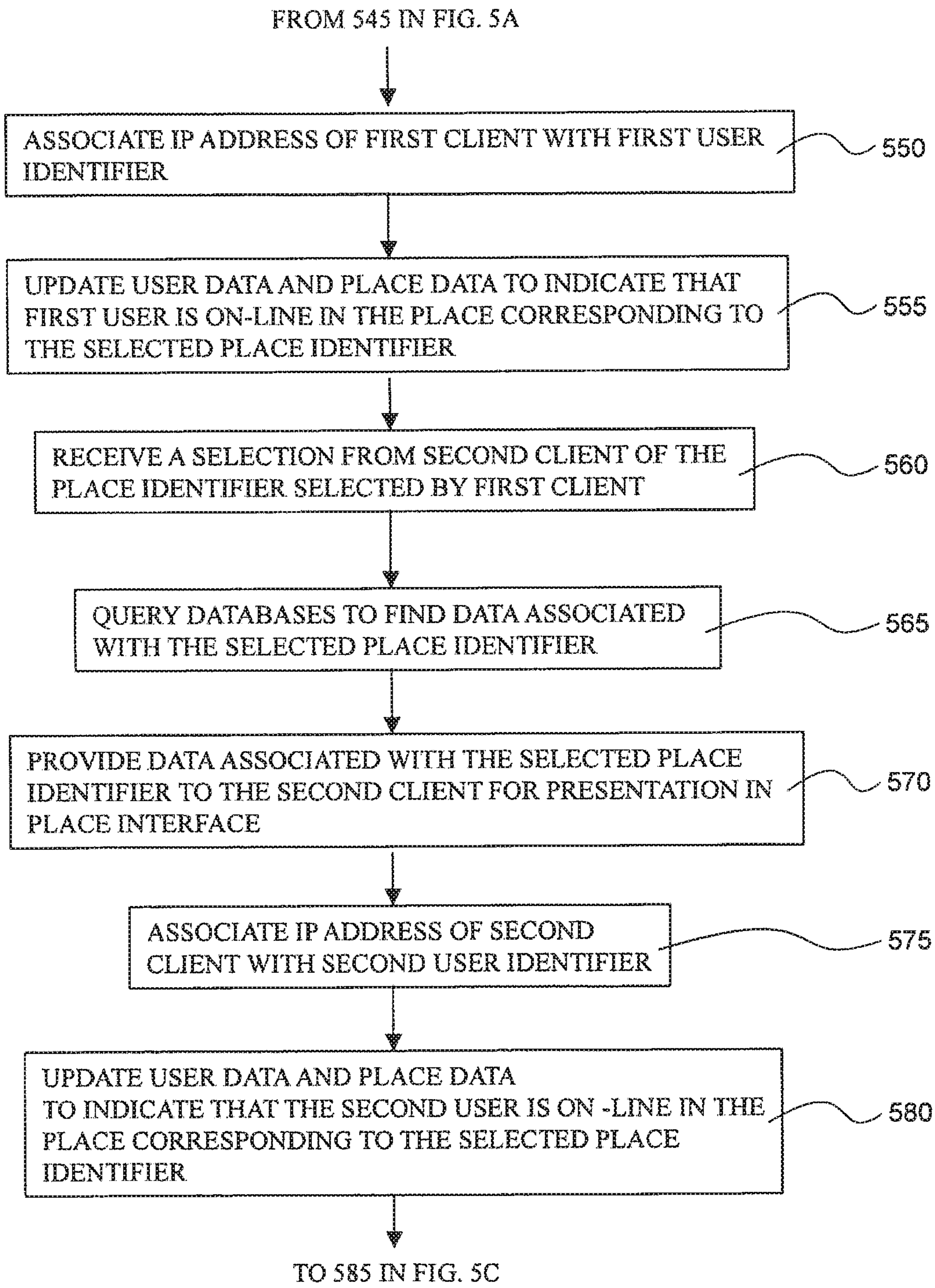
Figure 5C:
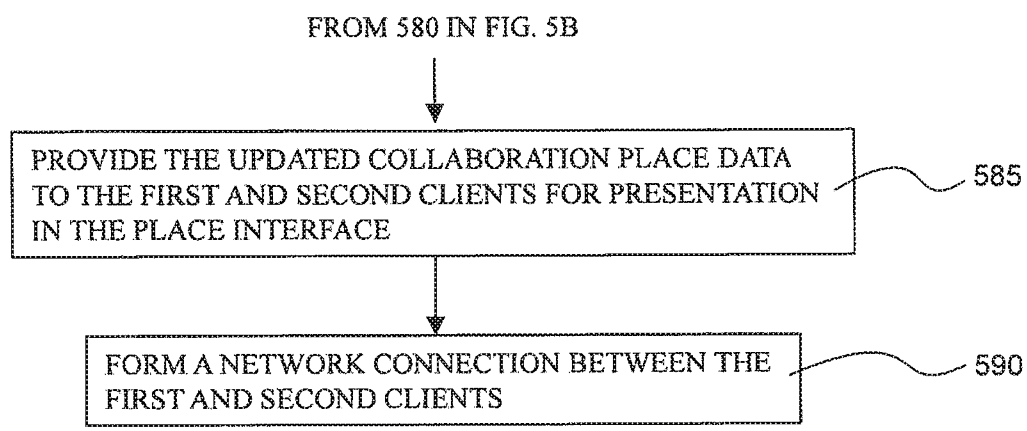

FIGS. 5A-5C schematically illustrate an example of steps involved in an embodiment of a method for providing access to a previously established place.

As shown in FIG. 5A, a request from user 102$_1$ interacting with client 120(1) for accessing system 100 is received at server 140 in system 100 (510 in FIG. 5A). Based on receiving the request, server 140 prompts, queries, and/or otherwise requests client 120(1) to provide login information associated with a user account (515 in FIG. 5A). For example, server 140 can prompt client 120(1) for the login information based on providing the login window 300 shown in FIG. 3A for presentation on the display device 126 of the client 120. Usually, based on receiving the request, the server 140 establishes a secure connection with the client 120(1) to inhibit and/or prevent interception by third parties of the login information and/or other data transmitted between client 120(1) and server 140, such as, but not limited to, data exchanged therebetween while the user is logged into a place.

With continuing reference to FIG. 5A, server 140 authenticates client 120(1) based on receiving the login information (520 in FIG. 5A). Usually, server 140 authenticates client 120(1) based on querying the one or more databases 150, e.g., user data 210, to determine whether they include data corresponding to the login information. Based on not finding data corresponding to the login information, server 140 denies access to client 120(1) and, in some embodiments, provides an error message to client 120(1) and/or returns to 515 in FIG. 5A.

Based on finding data corresponding to the login information, server 140 authenticates user 102$_1$ (i.e., client 120 (1)) and queries databases 150, e.g., user place data 220, to find user place identifiers 225 associated with the user identifier 215 of user 102$_1$ (525 in FIG. 5A). In some embodiments, server 140 queries databases 150 to find other data associated with the user identifier 215, such as friend identifiers in user friend data 245. Subsequently, server 140 prompts, queries, and/or otherwise requests client 120(1) to select among the user place identifiers 225 associated with the user identifier 215 (530 in FIG. 5A). For example, in one embodiment, server 140 provides the user place identifiers 225 for selection based on instructing the graphics subsystem 122 of client 120(1) to present the welcome window 310 on display device 126. Subsequently, server 140 receives a selection of place identifier 225 from client 120(1) (535 in FIG. 5A) and queries databases 150, e.g., place data 250, to find data associated with the selected place identifier 225, e.g., to find place data files 260, place interface data files 265, place log files 275, and place participant identifiers 270 associated with the selected place identifier 225 (540 in FIG. 5A).

Generally, client 120(1) and or server 140 can execute one or more software application programs 104 and/or 108 that provide the functionality of a place interface. In some embodiments, the place interface programs reside exclusively on server 140 and are accessed remotely by client 120(1), and server 140 can customize the place interface for client 120(1) based on user skin data 235. Preferably, however, client 120(1) downloads the interface programs (e.g., based on an initial access to a place) and caches and/or otherwise stores the place interface programs in local memory. Client 120(1) can customize one or more features of the interface (e.g., the features previously described herein with respect to user skin data 235) and can cache or otherwise store data based on the customized features in local memory. For clarity, the place identifier 225 selected by user 102$_1$ at 535 in FIG. 5A is hereinafter referred to as the user 102$_1$ place identifier.

Regardless of whether the place interface programs reside on client 120(1) and/or server 140, server 140 provides the data associated with the user 102$_1$ place identifier (e.g., the data identified at 540 in FIG. 5A) to client 120(1) for presentation in the corresponding place interface (545 in FIG. 5A). In some embodiments, the data associated with the user 102$_1$ place identifier are displayed in place interfaces similar to the exemplary place interface 320 shown in FIG. 3D. Usually, server 140 provides the data to client 120(1), and client 120(1) (e.g., place interface program(s) 104 executing thereon) formats the received data and presents the formatted data in the displays and sub-displays of the place interface. In some embodiments, however, server 140 (e.g., place interface program(s) 108 executing thereon) formats the data and provides to client 120 the formatted data and instructions for displaying the formatted data in displays and sub-displays of the place.

Subsequently, server 140 associates the IP or other network address of client 120(1) with the user identifier 215 of user $\mathbf{102}_1$ (550 in FIG. 5B) and updates user data 210 and place data 250 (e.g., on-line status data 230 and place participant identifiers 270) to indicate that user $\mathbf{102}_1$ is on-line in the place corresponding to the user $\mathbf{102}_1$ place identifier (555 in FIG. 5B). As further described herein, such an association facilitates administration of the place. Of course, based on receiving an indication that the connection with client 120(1) is terminated (e.g., based on receiving an indication that client 120(1) has logged out of the place and/or system 100), server 140 updates on-line status data 230 and place participant identifiers 270 to indicate that user $\mathbf{102}_1$ is not on-line in the place corresponding to the user $\mathbf{102}_1$ place identifier.

One or more additional participants can enter the place corresponding to the user $\mathbf{102}_1$ place identifier based on features similar to those previously described herein with respect to 510-535 in FIG. 5A. For example, based on receiving a selection of the user $\mathbf{102}_1$ place identifier from another user (i.e., another user authorized to access the place associated with that place identifier), e.g., user $\mathbf{102}_M$ interacting with a client 120(M) (560 in FIG. 5B), server 140 queries databases 150, e.g., place data 250, to find place data files 260, place interface data files 265, place log files 275, and place participant identifiers 270 associated with the user $\mathbf{102}_1$ place identifier (565 in FIG. 5B), at least some of which data may have been updated after the entrance of user $\mathbf{102}_1$ into the place (e.g., circa 555 in FIG. 5B). Server 140 then provides the place data 250 associated with the user $\mathbf{102}_1$ place identifier to client 120(M) for presentation in the corresponding place interface (570 in FIG. 5B), associates the IP or other network address of client 120(M) with the user identifier of user $\mathbf{102}_M$ (575 in FIG. 5B), and updates user data 210 and place data 250, e.g., on-line status data 230 and place participant identifiers 270, to indicate that user $\mathbf{102}_M$ is on-line in the place (580 in FIG. 5B).

With reference to FIG. 5C, server 140 also provides the thusly updated place data 250, e.g., the updated place participant identifiers 270, to client 120(1) and 120(M) for presentation in the place interface, thereby notifying user $\mathbf{102}_1$ that user $\mathbf{102}_M$ is on-line in the place (585 in FIG. 5C). Alternatively and/or in combination, in some embodiments, server 140 pushes to and/or client 120(1) generates a user login notification message for presentation in the place interface of client 120(1). The message can be presented in a temporary display or window that is superimposed over a portion of the place interface and/or an active window of client 120(1). In some of such embodiments, server 140 pushes to and/or client 120(1) generates such a message based on detecting a login of a friend in friend data 245, regardless of whether the friend has entered an active place. Additionally, server 140 forms a network connection between clients 120(1) and 120(M), thereby providing clients 120(1) and 120(M) with access to the place corresponding to the user $\mathbf{102}_1$ place identifier (590 in FIG. 5C). Preferably, server 140 forms the network connection through itself, so that server 140 can mediate data exchange between and respond to requests from clients 120(1) and 120(M).

As previously indicated, the client-server infrastructure of the disclosed systems and methods supports a variety of asynchronous and synchronous collaboration activities in a place. Preferably, in the disclosed client-server architecture, each client can open at least two sockets to one or more servers administering the place. These sockets are referred to herein as the front channel and the back channel. The front channel supports request- and response-type interactions, e.g., interactions in which a client transmits a request to a server, and the server transmits a response to the client in reply thereto. In contrast, the back channel supports push-type interactions, e.g., interactions in which a server pushes or otherwise transmits unsolicited data to a client. Communications on the front and back channels can be implemented using protocols known to those of ordinary skill in the art, such as, but not limited to, simple object access protocol (SOAP) or SOAP-like protocols.

Figure 6:
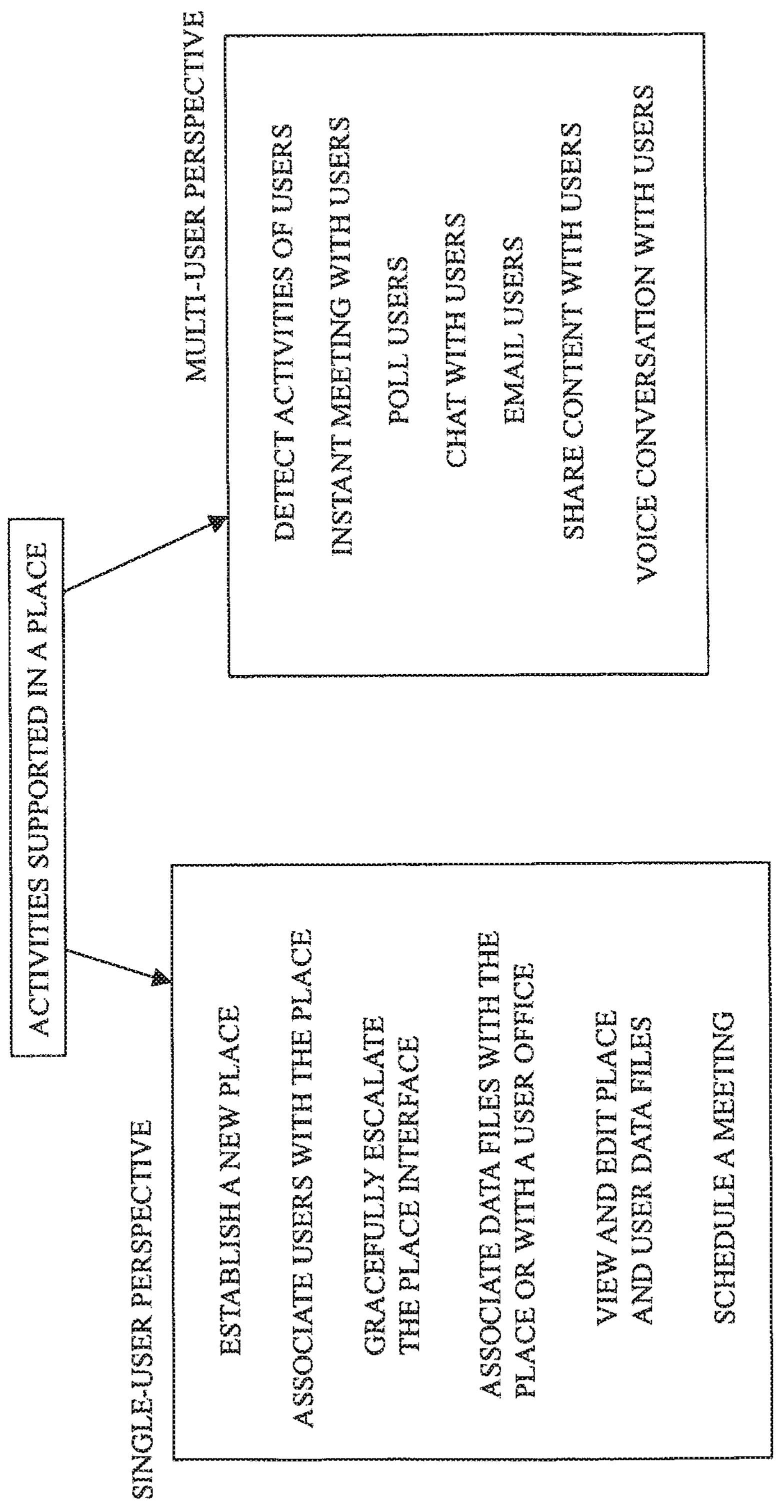
FIG. 6 schematically illustrates exemplary collaboration activities that can be performed in a place in accordance with one embodiment of the present invention.

FIG. 6 schematically illustrates exemplary collaboration activities that can be performed in a place. As will be understood by those of ordinary skill in the art, the disclosed systems and methods are not limited to the types and/or the organization of collaboration activities shown in FIG. 6 and can be implemented to support additional and/or different types and/or organizations of collaboration activities than those shown in FIG. 6.

As shown in FIG. 6, the exemplary collaboration activities include one or more single-user perspective activities and one or more multi-user perspective activities. Single-user perspective activities include activities that can be performed by any user in a place, regardless of whether one or more other users are in the place. Some single-user perspective activities include establishing a new place, associating one or more additional users with the place, gracefully escalating the place interface, associating one or more data files with the place and/or with a user office, viewing and/or editing place data files and/or user data files, and scheduling a meeting among users of system 100. Multi-user perspective activities include activities that are useful for collaboration between two or more users in a place. Some multi-user perspective activities include detecting activities of other users in the place, instantly meeting with other users in the place, polling other users in a place, chatting with other users in the place, emailing other users in the place, sharing content with other users in the place, and establishing a voice conversation with other users in the place. Advantageously, the disclosed client-server infrastructure supports seamless navigation among these different types of asynchronous and synchronous activities in the place. Features of some of these activities will now be described.

In the following description, users and/or clients are said to be "in a place." Such terminology should be understood as a shorthand for references to users and/or clients who are logged into and/or otherwise accessing a place.

A user in a place can establish a new place based on the schemes previously described herein, e.g., features 440-480 of FIG. 4.

The originator of a place (e.g., client 120 in the context of FIG. 4) can identify and/or otherwise designate those users authorized to access the place. Additionally, in some embodiments, those users authorized to access the place can themselves authorize other users to access the place. In some of such embodiments, an authorized user of a place can associate the user identifiers and/or other indicia of additional users with the place via the place interface. For example, in one such embodiment, the user can select and/or otherwise designate those user identifiers based on selections from one or more of the pull-down menus 332 in the exemplary place interface 320 shown in FIG. 3D. In some embodiments, based on receiving a selection of the user identifier, server 140 determines whether the corresponding user is on-line (e.g., based on querying on-line status data 230), transmits an invitation to enter the place to the client 120 of the on-line user, and forms a connection to the client 120 based on receiving an acceptance of the invitation, thereby providing access to the place to the invited user.

In some embodiments, the disclosed systems and methods provide for different categories of user membership in a place. Usually, the originator and/or an authorized user of a place will grant so-called full membership in the place to other users. The originator and/or the authorized user can, however, grant limited memberships to other users, such as, but not limited to, time- or event-limited memberships.

In some of such embodiments, different types of membership can be granted to users who are members of a firm based on their positions and/or responsibilities within the firm. For example, members who are responsible for ensuring compliance with statutory and/or regulatory schemes can be granted a first type of membership, while members who are not so responsible can be granted a second type of membership. Additional features of ensuring compliance with statutory and/or regulatory schemes are described in U.S. patent application Ser. No. 09/590,099, now U.S. Pat. No. 6,917,962, the contents of which application are expressly incorporated by reference herein in their entirety.

A limited membership in a place can be understood to be a "guest pass" to the place. In some embodiments, one or more privileges within a place are restricted to users based on their corresponding membership categories. For example, privileges to edit one or more of the data files 260 of the place can be restricted to users having full membership, while privileges to view one or more of those data files can be available to all users, regardless of their membership categories. Also for example, the features of the place interface provided to users can be dependent on the corresponding levels of user membership. For example, place interfaces supporting all types of interactions can be provided to users with full membership, while place interfaces that support a subset of interactions can be provided to users with limited membership. Also for example, a server in system 100 can support a website (e.g., an Internet website) that can be accessed by guests to a place, so that guests interacting on clients 120 without software application programs 104 configured for supporting the place interface can experience at least some features of the place (e.g., instant meetings). Generally, server 140 can administer and/or otherwise restrict user access to and user privileges within places based on corresponding membership categories based on schemes known to those of ordinary skill in the art.

One feature that enhances the synchronous-asynchronous collaboration systems and methods involves techniques for graceful escalation within a collaborative object with which users interacting as part of their collaboration. The main user-interface window of a client is for example divided into a number of sections including, for example, a chat panel, content area, people panel, and things panel. The content area contains a list of collaboration objects, artifacts from previous collaboration sessions, documents, folders, etc. These object or artifacts can be the artifacts or objects remaining from previous instantiations of a collaboration place as well as the new objects or artifacts that are introduced in the current instantiation of the collaboration place. As used herein, the term artifacts can be understood to include information that results from one or more user activities in a collaboration place and that can be stored for later retrieval.

One of the ways in which a collaboration place can be initiated is based on Instant Messaging (IM). When an IM session is initiated, just the chat panel is shown on the initiating client. Once a message is entered, the message is sent to the server and passed on to the receiving client. The receiving client pops up a normal-looking IM window, displays the message, and then the two participants can talk back and forth normally.

At any point, if either of the participants adds a new content item to the collaboration object, that fact will be shown to the other client by revealing that panel and dynamically resizing the controls in the screen to display it. It can also highlight any newly revealed areas by flashing the area, tray notification, sounds, etc. Either participant can now easily use tools provided by the client to select and view the content item.

At any point, if either of the participants initiates screen sharing, the thumbnail image of the screen share is displayed next to their name in the other client. If the client selects the thumbnail, their window will again be dynamically reconfigured to show the shared screen in their content area. They can be simultaneously chatting away, uploading content, and sharing their screens.

If they invite other users to access the collaboration object, the people tab is automatically revealed and the window is reconfigured to display that panel as well.

The client implements these features by maintaining the state of any conversation window internally and dynamically revealing additional sections of the window as required. Each time one of these new sections is revealed, the window is reconfigured so they are all visible.

Thus, through the provision of views, users can experience, via the computer system, all the same things they would experience in a real-life conference or meeting room. For instance, contemporaneous discussion threads are analogous to side discussions in a real-life meeting. Attachments (documents etc.) can be brought to the "meeting", or taken "home" from the meeting. Such a real life experience can be provided through providing a conference chat, screen sharing of applications or documents, the ability to pass control of a document or application during collaboration (e.g., click access to a shared screen to drive applications remotely such as by one user clicking to take control of a shared document in an application to indicate his or her revisions remotely during collaboration), tracking of synchronous and asynchronous activity, the presentation of state information about participants (e.g., variations in the color of an icon of a user to show a current characteristic of the user), "hot" areas such as the user's icon that automatically display information about the user such as how long idle, current activity, etc.

An important aspect of synchronous-asynchronous collaboration systems and methods and related functionality in accordance with embodiments of the present invention is the storage (e.g., persistent storage) of artifacts from all collaboration both synchronous and asynchronous and for example the implementation of a designated container class as the basis of the object model for incorporating those artifacts.

Also, in order to facilitate a graceful blend of synchronous and asynchronous collaboration, communications are structured and organized in such a way that they can be accessed through either synchronous or asynchronous activity. This ability can provide synchronous communications with a location where they take place so that participants might find the artifacts by accessing that location after the a synchronous communications session has taken place.

Typically, in known conventional technology, synchronous collaboration (e.g. IM) does not make any attempt to preserve artifacts. In other words, such known techniques do not recognize that there is an asynchronous aspect (an "afterlife") of even the most immediate of synchronous objects. In addition, most IM clients can store a log of message locally on a client machine, but they provide no capabilities for centralized store of that data or storage of any of the other artifacts—documents, voice, video, screen shares, etc. The fact that IM typically does not provide persistent storage reflects the fact that it is a significant task to do so and that the value of doing so is not widely recognized.

In addition, in known conventional systems, IM is inherently peer-to-peer and provides no context other than the individual users and their presence indication within the system. A drawback of such systems is that the initiation of a collaborative session, therefore, must begin with explanation of the context of the collaboration, may involve manipulation of objects that reside in another system, and must end with mutual agreement on how to preserve the result of the collaboration.

In one example of an object-based implementation of the systems and methods of the present invention, the object model relies upon a top-level container class, and every object has a "collaboration designation." The "collaboration designation" is inherited by all artifacts of any collaboration activity, whether synchronous or asynchronous, and makes it possible, for example, to return to any of them for further collaboration and continued activity. This technique has several implications for the object model for implementing the collaboration software. One implication is that not just obvious meeting artifacts (for example, meeting minutes) but, in fact, the full range of all possible objects (including, for instance, all kinds of ordinary documents) are recognized as being characterized by a "collaboration designation."

Such an architecture can provide an extensible framework that makes it easy to build applications that support multiple, simultaneous participants manipulating a variety of different object types. The framework also supports retrofitting existing applications (e.g., email and transaction-based business applications) that may initiate a business process involving synchronous and asynchronous collaboration (together or separately) or that may be used to manipulate the objects of collaboration (e.g., through the use of locks).

Element objects have certain properties, inherited by the next level of object sub-classes. As indicated above, these properties include at least a name or "collaboration designation". Depending on the embodiment, the designation may relate to a specific project, a specific deliverable, other actions or people related to a team, meetings, meeting-related activity, etc., or some combination of these, or none of them. Further, within this illustrative structure, for example, the application can be implemented such that the "collaboration designation" could be said to relate to a "theme," "topic," "project," etc. However, it is not a prerequisite for the operability of the system that any theme, topic, project, etc., be identified; the system can be functional just as long as a unique "collaboration designation" exists. Virtually any naming convention that is suggestive of uniquely identifiable objects suffices.

Instances of the container class can be implemented to provide visual cues that enable participants to understand the context of the collaborative business process as well as the participants—including those participants currently engaged in a collaboration place as well as those who may be invited to join a collaboration place in order to facilitate the business process that is the subject of the place.

The name and other possible properties are inherited by a child class of content objects, such as meeting invitations
- agendas
- notes
- attachments
- minutes, including:
  - written
  - audio
  - video
  - contemporaneous discussion threads The properties of the content objects may be further inherited by their own child classes.

Permissions can be a configurable characteristic that can be important in certain applications. Permissions can for example be attributes of the top-level container object or of individual components.

When using object based implementations, all GUI initiated interactions can for example be managed by methods of the objects. Of particular interest can be the methods that allow for the display and editing of different types of content objects simultaneously by multiple users.

While the typical paradigm of the IM systems in conventional systems is presence indicator of the individuals on your contacts or friends list; a novel paradigm in accordance with some embodiments of the present invention is presence indicators in the collaboration container (e.g. "place awareness"). Therefore, while existing technology can allow a user to initiate an IM chat session with another individual, the present exemplary technique allows a user to initiate a collaborative business process within the context of a collaborative container involving zero or more participants who may already be in a synchronous collaboration session. In addition, the simple fact that a user entered the collaboration container may trigger other individuals who subscribe to a "buddy list" including that container to join the user—through direct inspection of the space, "peripheral" vision sensing a change to the space, or event-based notification of an invitation to join the space. The artifacts that the user leaves behind in the collaboration space, can be immediately available to other current and future participants, assuming that the user granted appropriate access to those participants either individually or based on their roles.

Further examples and illustrations that primarily relate to the graceful escalation aspect of the systems and methods of embodiments of the present invention are provided herein as follows. These examples and illustrations should be understood to be implemented in accordance with the above discussion as appropriate.

As discussed above, collaboration can be enhanced through a software application and related data that provide integrated tools for live collaboration. The software application can be configured to augment a window or collaboration space of network users on a gradual basis. These escalating enhancements in functionality can be initiated in a number of different ways. One way is to allow a user to drag and drop desired content into a current user space to automatically "escalate" the space to an enhanced state. If desired, the enhancement can be configured automatically to match the current state of collaboration such as by matching the enhancements to the type of document that triggered the "escalation."

The initial nucleus of collaboration can be a functional item, application, or other software item that is available to a user. For example, the nucleus can be a network collaboration tray, a desktop application, an icon (e.g., in the task bar), or other software point where a user can, for example, drag in a co-worker, a document, an application, or other collaboration related item into the starting point or other designated point to escalate that space into a needed state of collaboration. The shape and display of the initial space and subsequent spaces can automatically change or increase in size and content in synchronization with the escalation. An important feature is that the user is provided with the ability to seamlessly move from working on a project individually or working on a project collaboratively in a synchronous object to an enhanced collaboration object. This can eliminate procedural hurdles and steps that can exist in conventional technology.

Escalation may include a repository, document editors, document viewers or players, time and schedule management, network resources, enterprise resources, e-mail, browsers, conferencing, desktop applications, office tools, or other applications. Participants may be users of an enterprise platform, an Internet platform, or other network platform.

Escalation can be trigged by allowing a user to drag and drop an item into a particular space to commence collaboration or to enhance an existing collaboration space. Other techniques may include a menu option that a user can select to identify collaboration targets.

Automatically triggered escalation may be based on the attributes of collaboration participants or other attributes such as the time, the attributes of a current document, a task assignment, a link within a current document to a particular application, etc.

In one embodiment, a resident application is implemented on a client computer platform that is configured to integrate a plurality of different collaboration tools (e.g., synchronous, asynchronous) wherein the tools can be available to user on demand during collaboration using one of the tools to provide related collaboration on the same subjects or objects (e.g., seamless integration). If desired, layers of tools are always available but only triggered in response to a natural action of a user indicating collaboration (e.g., options from layers are not merely visible, but are automatically available when the interaction focuses on a different type of interaction).

Figure 12A:
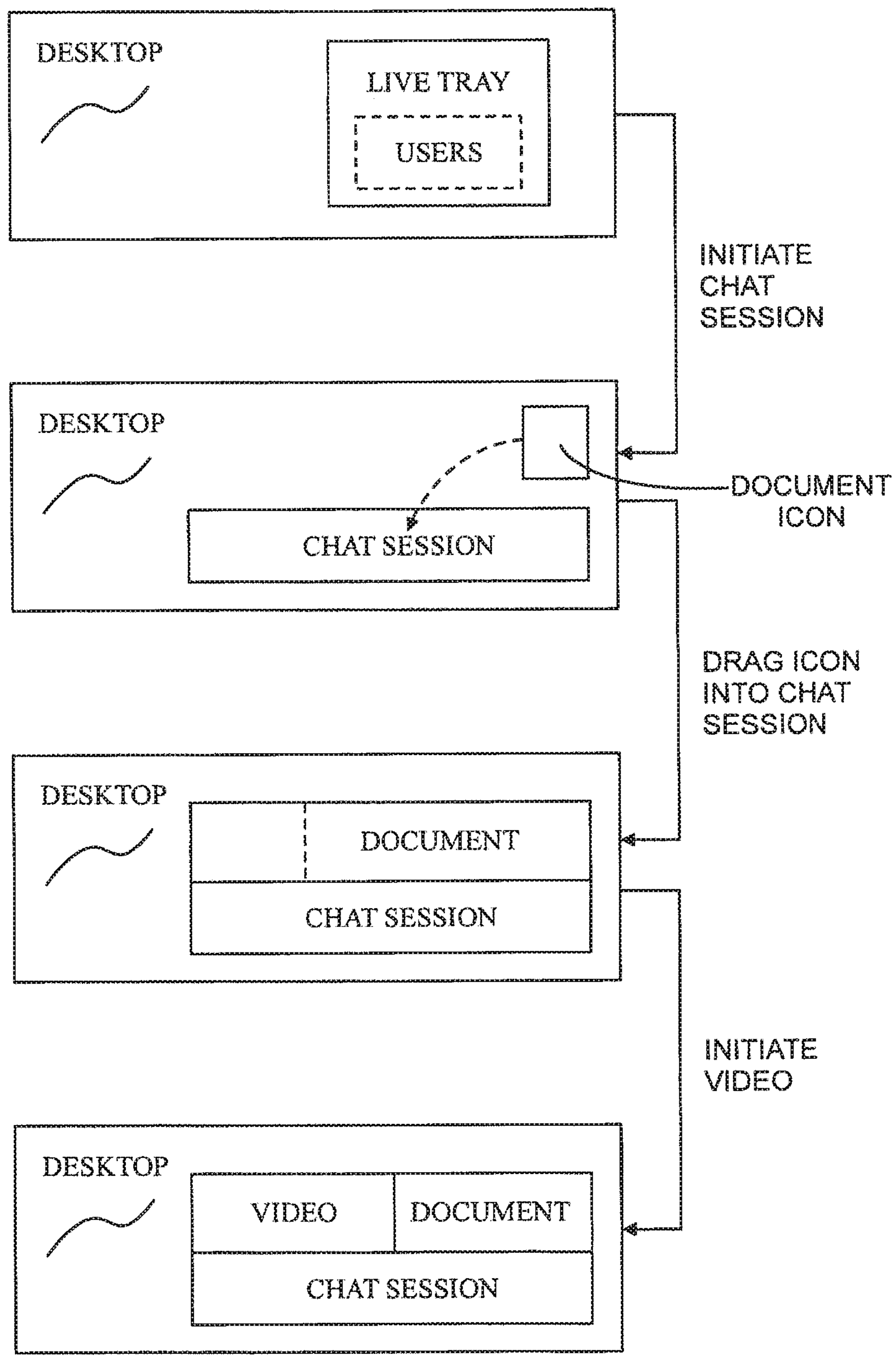
FIGS. 12A-12E provide illustrative examples of embodiments of the present invention in accordance with one embodiment of the present invention.

FIG. 12A shows an illustrative sequence of gradual collaboration activity. A network-connected user can have access to a "live tray" on their desktop. The tray can be a portal to live or asynchronous collaborative features. In this example, the tray includes a list of users such as a list of registered users of the collaborative software.

A network user can initiate a chat session with one of the users listed in the tray (e.g., by clicking on that user). During the initiated chat session, one of the participants can drag a document from their desktop into the chat session. In response, the collaboration object is enhanced to include a view of the document and related options. Chat participants may desire to add video to the real-time collaborative object to further enhance their collaboration activities. Subsequently, a videoconference or other video may be added.

Figure 12B:
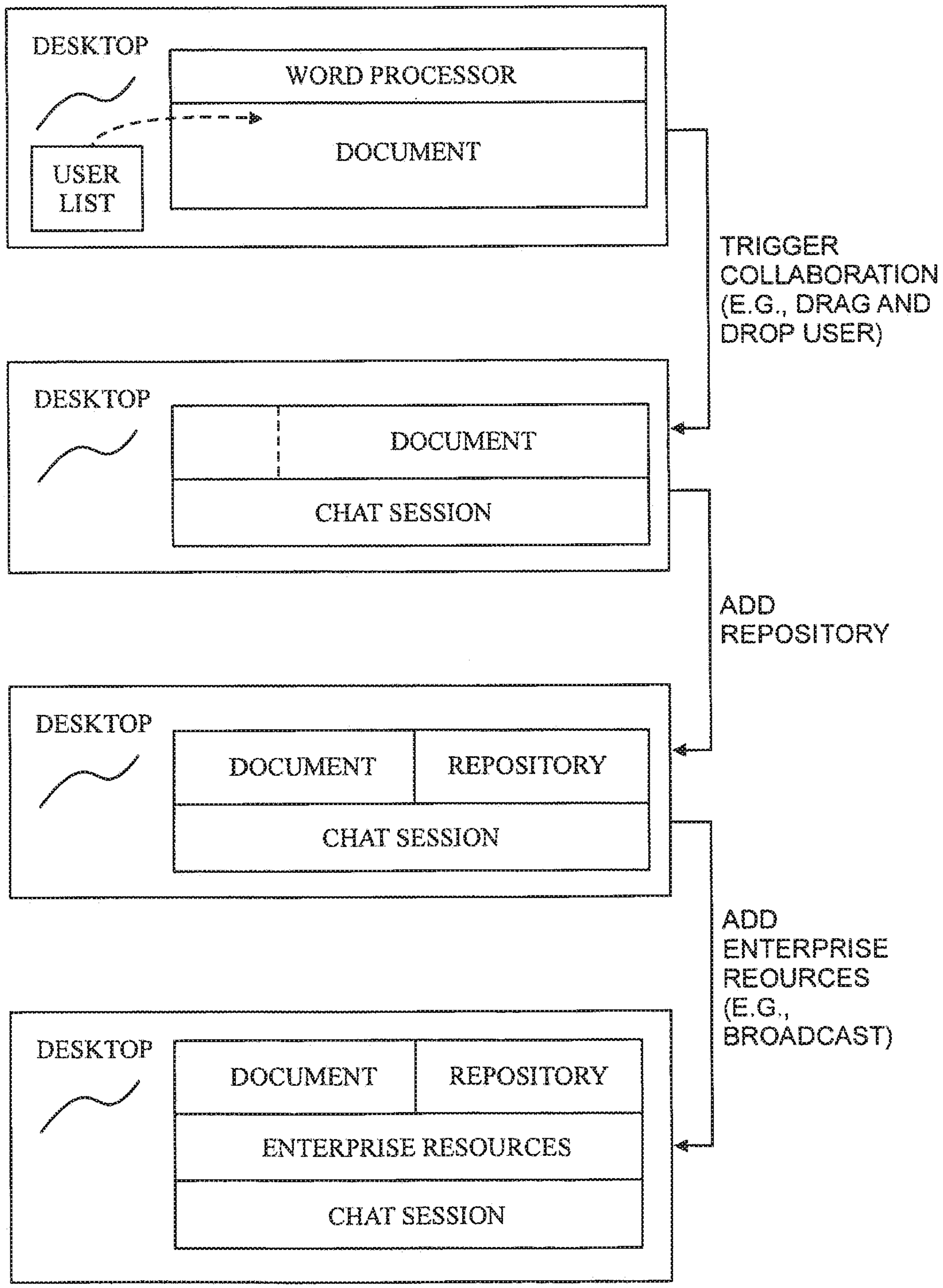

FIG. 12B shows an illustrative sequence of gradual collaboration activity involving a different starting point for the collaboration activity. In this case, the starting point of the collaboration space is a user's word processor application. To initiate collaboration, the user drags an icon or other identifier for an individual into the application space of the word processor. In response, a collaborative space for live collaboration is created that includes a chat session and a view of a document in the word processor application. A further level of escalation can be to provide a repository for the collaborative space that is triggered automatically or manually by the participants of the collaborative space. An even further level of escalation is to add a section for enterprise resources in the collaborative space. The enterprise resources can for example allow the users to set the parameters for the broadcast of a document in the collaborative space.

Figure 12C:
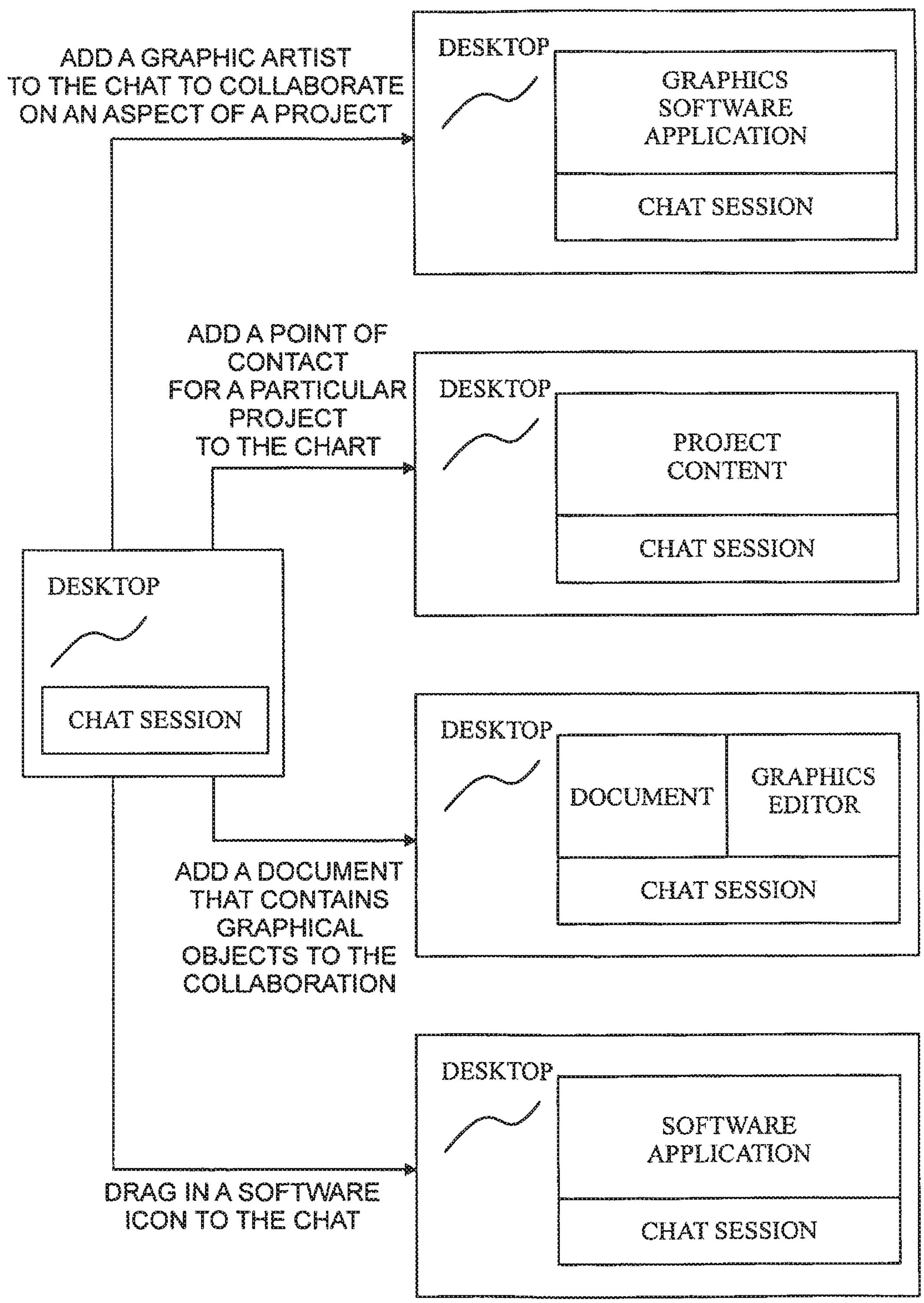

FIG. 12C shows illustrative examples of different escalation techniques. For example, a chat session may be enhanced to include a graphics software application or a graphics document when the participants of the chat session invite a graphic artist to join the chat session. In another example, a chat session may be enhanced to include project content (e.g., a presentation) in a window when the participants of the chat session invite a point of contact for that project to join the chat session. In a further example, a graphics editor may be automatically added to a collaborative space when the participants of a chat session select to add a word processing document that includes a graphical object to their collaborative space. In another example, chat participants may "drag-in" a software application into the collaborative space (e.g., a document editor) to initiate collaborative work in that application.

Figure 12D:
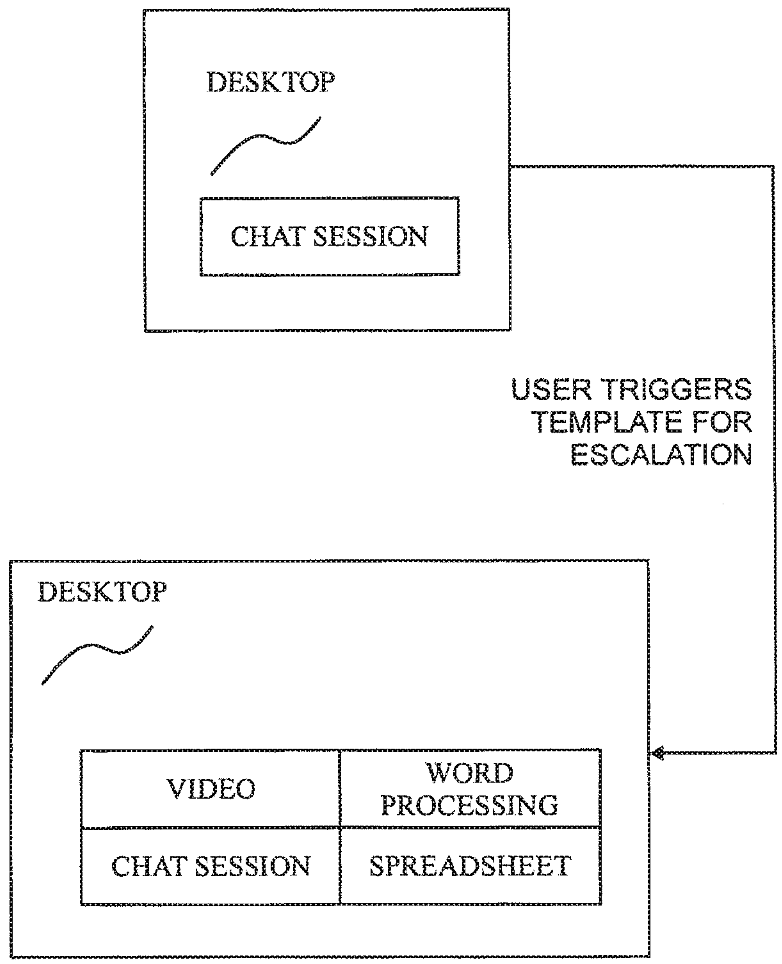

FIG. 12D shows a sequence involving template-based escalation. In this case, templates that for example are geared to specific tasks or industries may be available for use by the participants of a chat session. The templates allow users to move more quickly through the intermediate escalation steps. Templates may also be cumulatively linked (e.g., two saved templates can be linked to provide a cumulative template combining the features of the two saved templates).

Figure 12E:
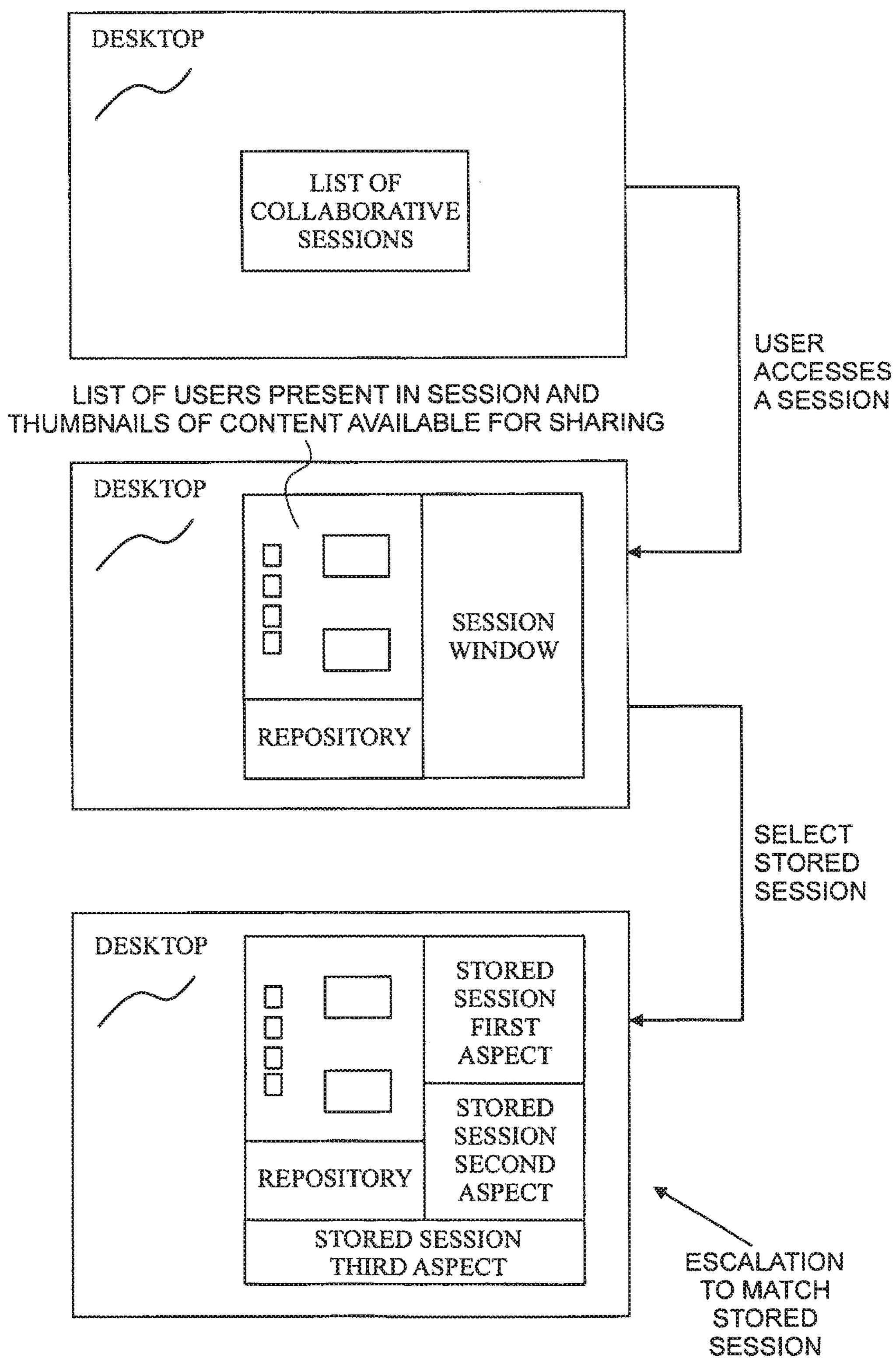

FIG. 12E shows an illustrative sequence of gradual collaboration activity that is based on stored sessions. A list of stored collaboration sessions may be made available to a network user. The user may be allowed to select one of the sessions. In response, a session window may be displayed that includes a repository of session content. The repository can include stored session content or other content (e.g., documents, images, web pages, images, etc.) that were stored to be part of that session and visible to clients in that session. When a stored session's content is selected, the collaborative space can be automatically recreated to include different aspects that existed in that collaboration (e.g., windows for video, chat, documents, etc.). Escalation in this case is provided so that collaborative space that is recreated automatically matches the stored session content. Other features shown in FIG. 12E include an area that identifies the list of clients (users) currently present in the session (e.g., using name identifiers and icons) and includes thumbnails of applications or content next to clients that is available for sharing by those present. By clicking on a thumbnail, the contents of the thumbnail is shared with the client that clicked on that thumbnail.

Two examples of applications of features of the systems and method of the present invention are provided herein as follows.

During a chat or instant message session, the participants decide to establish a "meeting" or "collaboration"—to which additional participants can be invited. A meeting scheduler can be added to accommodate the planning and scheduling of the meeting.

A user involved in entering invoices into a system may find that he or she is faced with a question that requires collaboration with someone else. Instead of exiting the application and using a separate application (e.g. IM, email, etc.) to commence collaboration, they can begin collaboration directly from the interface they were using and then that application and its underlying information will be available to the other user in the course of the problem-solving session. In this case, the initiating user makes his screen available to the other person for viewing—"over his shoulder." If desired, the initiating user may pass control of his screen (e.g., via a mouse, keyboard, etc.) to the other person. In another embodiment, the initiating user may allow co-operation of the application (e.g., co-editing).

In another illustrative embodiment, the current desktop document or activity of a network user may be visible (e.g., a thumbnail view next to a user icon) to other network users. With this information, a network user can choose to join another user to participate in their work. As a result, a collaborative space for their joint work based on the document or desktop of the users may be created.

FIG. 12F is illustrative of the range of escalation that can be available to users. FIG. 12F shows an illustrative chart that contain examples of type of nodes or activates from which escalation or de-escalation can be implemented to occur. An objective would be to provide a seamless transition for users to match their current collaboration needs as the substances of their collaboration whether synchronous or asynchronous evolves from beginning to end. In the chart of FIG. 12F, such mobility is exemplified. In the figure, private refers to a collaboration place where two people chat and/or share content. "Public" refers to a collaboration place where three or more people chat and/or share content. "Outsider" refers to an external user, such as one who does not have a login or identity within the collaboration system. The transition can for example be triggered manually, but is preferably implemented automatically in response to an action by a user related to a type of collaboration that automatically implements or withdraws accessibility to a new display interface for that particular type of collaboration.

As such an aspect of some embodiments of a collaboration place and related features can include implementing an executable software on client computers that displays an interface for a first collaboration tool that is network-accessed by others to provide the desired type of collaboration. The executable software includes a plurality of collaboration tools that are integrated together. The software preferably makes the other collaboration tools available through sensing the type of collaboration activity sought by the users of a currently displayed collaboration tool. As such, a number of different tools can be available for use but are triggered to be displayed based for example on a user taking an action or contributing an object that concerns one of the other collaboration tools to types of collaboration not yet displayed. If desired, such functionality can be implemented in a different ways by for example, using separate executable for each tool.

A place interface usually includes a primary display and one or more secondary or sub-displays within the primary display, in which each sub-display supports a different type of collaboration activity or a different feature of a place. In some embodiments, an end user 102 can gracefully escalate the primary display of the place interface so as to include a single sub-display, two sub-displays, or more than two sub-displays, i.e., so as to support one type of collaboration activity or place feature, or two or more types of collaboration activities or place features. For example, in one such embodiment, the icons 334 in the exemplary place interface 320 shown in FIG. 3D allow a user to select among the people, things, content, and chat windows 324, 326, 328, and 330 for display within the primary window 322. Based on a selection of one of the icons, the sub-window corresponding only to that icon is displayed; based on a consecutive selection of multiple icons, the display of the place interface can be gradually escalated, e.g., from a single sub-window to two or more sub-windows. Additional features of graceful escalation schemes are disclosed in U.S. Patent Application No. 60/607,388, the contents of which application are expressly incorporated by reference herein in their entirety.

One or more data files can be associated with a place (or, more specifically, a place identifier 255). Generally, data files are associated with the place based on receiving requests from one or more clients 120 logged into the place. For example, a request from a client 120 for transmitting a data file from a local memory into a place is received at server 140. Such a request can be generated during an initial establishment of the place (e.g., at 470 in FIG. 4) and/or at a later time (e.g., during an initial or subsequent visit to the place). In some embodiments, the request can be generated based on a selection from a pull-down menu 332 in the exemplary place interface 320 of FIG. 3D. Based on receiving the request, server 140 uploads the data file from the local memory of the client 120 based on file transfer protocol (FTP) and/or other data file transmission protocols known to those of ordinary skill in the art, updates the place data files 260 associated with the place identifier 255 for the place to include the uploaded data file, and provides the updated place data files 260 to client 120 and other clients 120 in the place for presentation in the corresponding place interfaces (e.g., for presentation in the data file directory in things window 326 of FIG. 3D).

Preferably, data files can also be associated with the place based on detecting dragging-and-dropping actions of the clients 120 in the place. In some embodiments, client 120 and/or server 140 can detect a dragging-and-dropping of an icon for a data file (e.g., by an input device of client 120, such as a mouse) from outside and into the place interface for a place (e.g., from a desktop of client 120 and/or from an interface for a different place). Based on detecting the dragging and dropping of the icon, server 140 uploads the data file associated with the icon from the local memory of the client 120, updates the place data files 260, and provides the updated place data files 260 to clients 120 for presentation in the corresponding place interfaces.

In some embodiments, client 120 and/or server 140 are configured for identifying the display (e.g., the secondary or sub-display) of the place interface into which a dragged icon is dropped. For example, in one such embodiment, client 120 and/or server 140 can determine whether the icon is dropped into the chat window 330, the content window 328, the people window 324, or the things window 326 of the exemplary place interface 320 shown in FIG. 3D. In some of such embodiments, the window into which the icon was dropped can be used to determine the presentation of the data file in the place interface after uploading. For example, in one such embodiment, based on determining that an icon was dropped in the content window 328, server 140 can provide the corresponding uploaded data file for presentation in the content window 328 and the updated place data files 260 for presentation in the things window 326. Also, based on determining that an icon was dropped in the content window 328, server 140 can add the content of the uploaded data file to a place data file 260 that is currently being viewed in the content window 328. For example, server 140 can paste the content as a bitmap at the icon drop location. Also for example, in one such embodiment, based on determining that an icon was dropped in a chat window 330, server 140 can provide (i) the updated place data files 260 for presentation in the things window 326 and (ii) a link to the corresponding uploaded data file in place data files 260 for presentation in the chat window 330. The disclosed systems and methods thus support dragging-and-dropping of data files from local memory into a chat utility.

One or more data files can be associated with a user office and stored in user data files 248. In most embodiments, data files are associated with a user office based on detecting a dragging-and-dropping of an icon for the data file from outside and into the office utility of a place interface, e.g., from local memory on client 120 and/or the public portion of thing window 326 into the private portion 326*b* of thing window 326. In some embodiments, data files are associated with a user based on receiving a selection from a pull-down menu 332 in the exemplary place interface 320 shown in FIG. 3D. The data files 248 that are associated with a user office are accessible to the user in each place which the user visits via the office utility in the corresponding place interfaces. Since the user data files 248 are stored on databases 150, they can be provided to the user regardless of the client 120 with which the user 102 interacts. Advantageously, therefore, the data files can "follow" the user from client 120 to client 120 in network 110.

The previously described schemes for uploading data files into a place and/or a user office from client 120 can be suitably modified based on schemes known to those of ordinary skill in the art for downloading data files from the place and/or the user office to client 120.

In some embodiments, the disclosed systems and methods provide an interaction log utility that allows users to associate a data file with two or more places. Such linking can reduce data storage constraints on system 100. For example, in some of such embodiments, a user who desires to access a data file in two different places can upload the data file to one of the places, and then the uploaded data file can be associated with the other of the places via the interaction log utility. The interaction log utility can be accessed based on a request from client 120, e.g., based on a selection from a pull-down menu 332 in the exemplary place interface 320 of FIG. 3D.

In some embodiments, a user in a place can view and/or edit one or more of the place data files 260 and or the user data files 248 via a data file utility that is provided in the place interface. An exemplary embodiment of a data file utility will now be described with respect to the content window 328 of the exemplary place interface 320 shown in FIG. 3D. The exemplary data file utility will be described with respect to viewing and editing a place data file 260.

As shown in FIG. 3D, the exemplary data file utility or content window 328 is configured for presenting the content of one or more of the place data files 260. User 102 interacting with client 120 and desiring to view place data file 260 can request to view the data file by selecting the icon for the data file that appears in things window 326. In some embodiments, based on receiving the request from client 120, server 140 transmits the place data file 260 to client 120, and client 120 temporarily stores and/or otherwise caches the place data file 260 in a local memory. The software application program(s) 104 configured for manipulating the data type of the place data file 260 and the place interface program(s) 104, 108 residing on client 120 and/or server 140 cooperatively present the content 328*a* of the place data file 260, toolbars 328*b* for modifying the content, and scrollbars 328*c* for navigating the content in content window 328.

As will be understood by those of ordinary skill in the art, client 120 may not necessarily include software application program 104 configured for manipulating the data type of the place data file 260 desired to be viewed. As such, in some embodiments, based on receiving a request from client 120, server 140 identifies and/or otherwise determines the data type of the place data file 260 desired to be viewed and then prompts, queries, and/or otherwise requests client 120 to indicate whether client 120 includes software application program(s) 104 that are configured for manipulating the identified data type. Based on receiving an affirmative response from client 120, server 140 transmits the place data file 260 to the client 120, and the place data file 260 is presented in content viewer 328 based on the previously described schemes. Based on receiving a negative response from client 120, server 140 executes software application program(s) 108 configured for manipulating the identified data type, formats the place data file 260 for presentation, and transmits the formatted data file to client 120 with instructions for presenting the data file in content viewer 328.

Generally, client 120 can edit and/or otherwise modify the content 328*a* of a data file that is presented in content viewer 328 based on manipulating toolbars 328*b* and/or scrollbars 328*c* and/or based on other functionality supported by the software application program(s) 104 and/or 108 that are configured for manipulating the data file (e.g., based on input device functionality, such as keyboard or mouse functionality, supported by the program(s) 104 and/or 108). Usually, server 140 detects changes to the content of a place data file 260 being modified via content viewer 328 and updates place data files 260 to include the changes based on schemes described herein and/or based on schemes known to those of ordinary skill in the art.

In some embodiments, a user can schedule a meeting in a place with other users of system 100 via a meeting invitation utility provided in the place interface. An exemplary embodiment of a meeting invitation utility will now be described with respect to the meeting invitation window 370 shown in FIG. 3E.

User 1021 interacting with client 120(1) can schedule a meeting at a pre-determined time with other users 102M in a place via the meeting invitation utility. In some embodiments, user 1021 can activate the meeting invitation utility based on a selection from a pull-down menu 332 in the exemplary place interface 320 shown in FIG. 3D. Based on receiving the selection, server 140 can provide the meeting invitation window 370 to client 120(1) for display in the corresponding place interface 320. User 1021 can enter and/or otherwise provide meeting data (e.g., meeting name, meeting start time, etc.) in the meeting invitation window 370 and upload the meeting data to server 140. At or about the meeting start time, server 140 performs feature 730 of FIG. 7 and otherwise administers the meeting based on performing features 740-780 of FIG. 7, which features are further described herein with respect to FIG. 7. Server 140 continues to administer the meeting until a request to terminate the meeting is received (e.g., from one or more of the users 102) and/or the meeting end time is reached.

In some embodiments, the disclosed systems and methods can be integrated with conventional calendar and/or e-mail personal applications (such as Microsoft Outlook®) so that users can synchronize and/or otherwise update their personal calendars with scheduled meetings.

In some embodiments, the users in a place can detect the type and/or degree of activity of other users in the place based on one or more so-called peripheral vision schemes.

For example, in one such scheme, a user can detect the activity of other users based on the user login notification messages described herein with respect to FIGS. 1B and 5A-5C. Also, a user can detect the activity of other users based on miniature screen shots or "thumbnails" of the place interfaces or display screens (or portions thereof) of the other users described herein with respect to FIGS. 8A and 8B. (In some embodiments, a thumbnail can also indicate the number of users currently viewing the shared display represented by the thumbnail and, based on a selection of the thumbnail by a user input device (e.g., a mouse), the identities of the users.) Further, a user can detect the activity of other users based on the activity indicators previously described herein with respect to FIG. 1B.

In some embodiments, a first user desiring to learn the activity status of a second user in a place can select and/or otherwise designate the user identifier for the second user in the place interface, e.g., welcome window 310 and/or people window 324. Based on receiving the selection, server 140 can provide the activity indicator (e.g., the previously described simple and/or the complex activity indicator) associated with the second user for presentation in the place interface of the first user. In some of such embodiments, a user in a place can manually set one or more features of and/or otherwise disable the activity indicator. For example, a user can set the simple and/or complex activity indicator to "busy" so as to discourage chat messages from other users and/or can disable the simple or complex activity indicator to enhance privacy.

In some embodiments, the disclosed systems and methods can provide additional information to the first user. For example, in some of such embodiments, the disclosed systems and methods can provide one or more of the following to the first user: data identifying all of the data files currently being viewed by each user in a place; data identifying all of the data files that have been viewed during a time period by one or more users in a place; data identifying all of the users who have accessed one or more data files during a time period; and data identifying data files accessed and edited by one or more users during a time period. In some embodiments, the provided data can include one or more thumbnails (e.g., thumbnails of the data files currently being viewed by users in a place) and/or one or more other types of real-time views.

Figure 7:
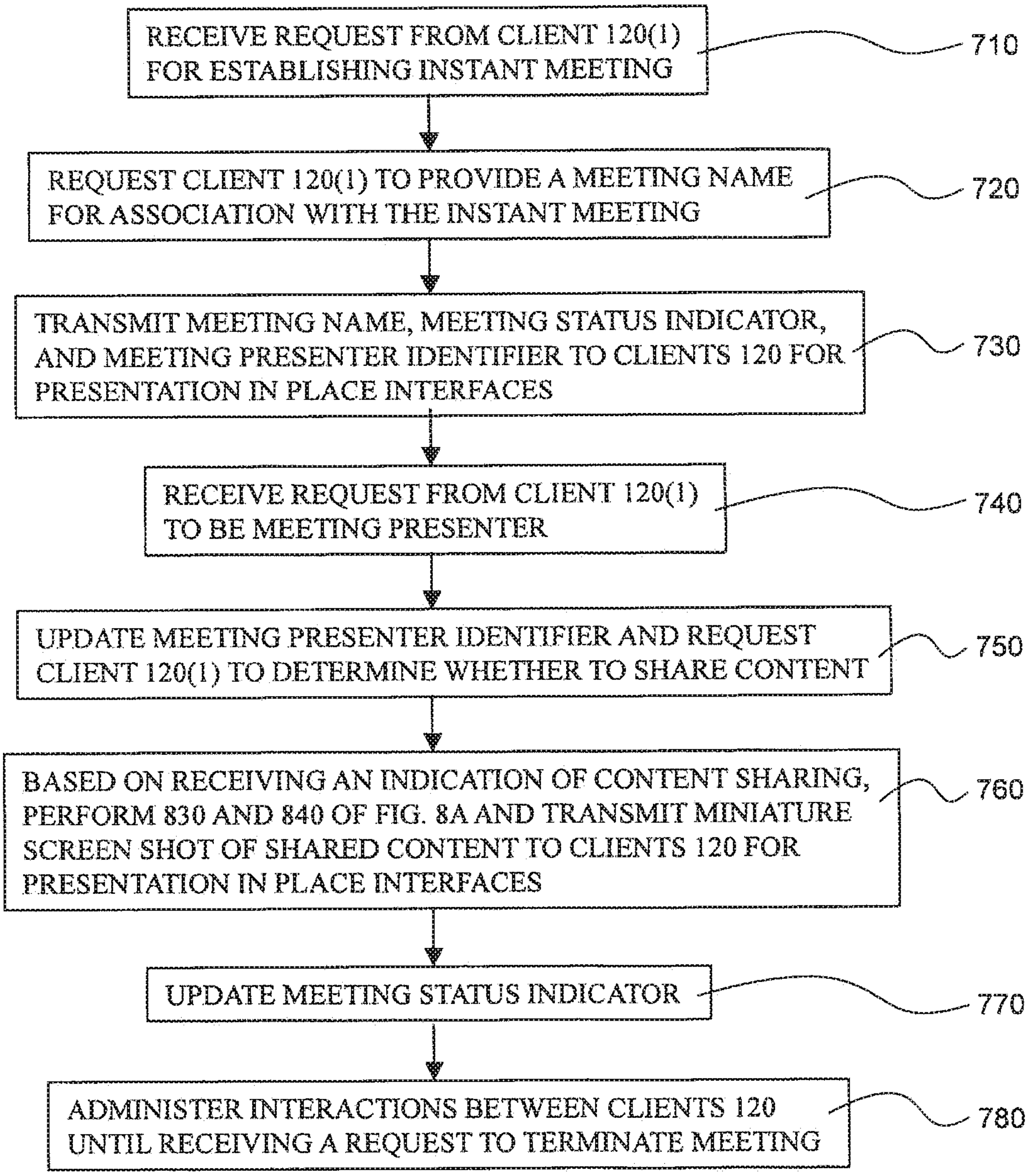
FIG. 7 schematically illustrates an embodiment of a method for generating an instant meeting in a place in accordance with one embodiment of the present invention.

In some embodiments, a user can initiate an instant meeting with other users in a place via an instant meeting utility provided in the place. FIG. 7 schematically illustrates an example of steps involved in an embodiment of a method for establishing an instant meeting in a place.

As shown in FIG. 7, a request from a user 1021 interacting with client 120(1) and desiring to establish an instant meeting in a place is received at server 140 in system 100 (710 in FIG. 1). In some embodiments, the request can be generated based on a selection from a pull-down menu 332 in the exemplary place interface 320 shown in FIG. 3D. For example, the request can be generated based on a selection of the "Instant Meeting" icon in the pull-down menu 332. Based on receiving the request, server 140 prompts, queries, and/or otherwise requests client 120(1) to provide a meeting name for association with the instant meeting (720 in FIG. 7). Based on receiving a meeting name, server 140 transmits at least the meeting name and, preferably, a meeting status indicator and a meeting presenter identifier to clients 120(1) and 120(M) (i.e., all clients 120 currently entered and/or otherwise logged into the place) for display in the corresponding place interfaces (e.g., meeting windows 350 in exemplary place interfaces 320) (730 in FIG. 7).

Usually, clients 120(1) and 120(M) participate in an instant meeting in a place via the place interface for the place. Alternatively, in some embodiments, based on receiving a request for an instant meeting from client 120(1), server 140 can provide one or more groupings of default meeting features of the place interface for the instant meeting to client 120(1) for selection. In some of such embodiments, each grouping is associated with a field of use (e.g., business, engineering, humanities, legal, medical, scientific, etc.) and one or more displays and/or one or more trays that are relevant to that field of use, such as trays that include one or more pertinent applications (e.g., a spreadsheet application for the business field of use, a whiteboard application for the engineering field of use, etc.). In some of such embodiments, each grouping is associated with a type of meeting (e.g., reporting meetings; interpersonal meetings; working meetings; sales meetings; informational meetings; training meetings, etc.) and can include one or more displays and/or one or more trays that are relevant to the meeting type. Additionally, one or more of groupings can be developed and/or otherwise customized by client 120(1). Based on receiving a selection of a grouping, server 140 can provide a corresponding place interface to clients 120(1) and 120(M) in the place.

Subsequently, user 1021 or another user 102M in the place can request to be the meeting presenter (colloquially referred to herein as "request the podium"). Based on receiving the request (740 in FIG. 7), server 140 updates the meeting presenter identifier to include the user identifier of user 1021 and prompts, queries, or otherwise requests client 120(1) to determine whether to share content (750 in FIG. 7). Based on receiving an indication of content sharing, server 140 performs features 830 and 840 of FIG. 8A further described herein and transmits the miniature screen shot or "thumbnail" of the shared content and the updated meeting presenter identifier to clients 120(1) and 120(M) for presentation in the corresponding place interfaces (760 in FIG. 7). Server 140 updates the meeting status indicator at intervals (e.g., to show elapsed meeting time) (770 in FIG. 7) and administers requests for the podium and other interactions between clients 120 based on the schemes described herein and schemes known to those of ordinary skill in the art until receiving a request to terminate the meeting (780 in FIG. 7).

In some embodiments, a user can initiate a poll of users in a place via a poll utility provided in the place interface. Such a poll can be used to evaluate and/or otherwise solicit user opinions. An exemplary embodiment of a method for establishing a poll in a place will now be described.

In the exemplary embodiment, a request from a user 1021 interacting with client 120(1) and desiring to take a poll of users in a place is received at server 140 in system 100. In some embodiments, the request can be generated based on a selection from a pull-down menu 332 in the exemplary place interface 320 shown in FIG. 3D. For example, the request can be generated based on a selection of a poll icon in the pull-down menu 332. Based on receiving the request, server 140 prompts, queries, or otherwise requests client 120(1) to provide poll data. Generally, poll data includes data representing a populace to be polled, a duration of the poll, a poll query, and, in some embodiments, a poll anonymity indicator.

The populace to be polled can include one or more users of the place (or, more generally, one or more users of system 100). For example, the populace to be polled can include all users authorized to access the place, all users currently logged into the place, and/or one or more other groupings of one or more users. Also, the populace to be polled can include one or more invitees to a meeting (e.g., a scheduled and/or an instant meeting). For example, the populace to be polled can include all invitees to a meeting, all invitees currently in a meeting, and/or one or more other groupings of invitees.

The poll duration indicates either the time period over which responses to the poll can be cast by the poll populace or the time at which the poll will be closed and/or responses tallied. As such, the poll duration can be described in terms of a pre-determined quantity of time (e.g., ten minutes) and/or a pre-determined future time (e.g., Monday at 9 AM). In some embodiments, the poll duration can be unspecified (e.g., at your convenience). In some of such embodiments, server 140 can query client 120(1) at intervals (e.g., at periodic intervals and/or other types of intervals determined by client 120(1)) whether to close and/or otherwise tally the poll.

The poll anonymity indicator represents the default degree of anonymity to be associated with poll responses from the poll populace. Usually, the poll anonymity indicator includes an anonymity type (e.g., anonymous or non-anonymous) and a fixed or variable setting. A fixed setting indicates that the anonymity type cannot be changed by poll respondents, while a variable setting indicates that the anonymity type can be changed as desired by poll respondents. Some possible poll anonymity indicators include fixed anonymous, variable anonymous, variable non-anonymous, and fixed non-anonymous. Other poll anonymity indicators will be apparent to those of ordinary skill in the art.

Based on receiving poll data, server 140 transmits the poll query and duration to the poll populace (e.g., clients 120(1) and 120(M)) for presentation in the corresponding place interfaces. In most embodiments, the poll question is accompanied by response icons (e.g., yes/no/maybe icons) and/or response boxes (e.g., for providing user comments).

Based on receiving a response to the poll query from a respondent, server 140 determines whether the anonymity indicator setting can be changed. Based on so determining, server 140 queries, prompts, and/or otherwise requests the respondent to determine the desired setting.

Server 140 stores responses to the poll from the poll populace in place log files 275 and transmits data based on the responses (e.g., a tally of yes/no/maybe responses and/or a summary of comments) to the initiator of the poll, i.e., client 120(1), based on detecting the poll duration.

Of course, if desired by the poll initiator, server 140 can transmit that data to the entire poll populace. Server 140 transmits the data based on the responses consistent with the anonymity specified by the poll anonymity indicator.

In some embodiments, the users in a place can exchange chat messages with each other via a chat utility that is provided in the place interfaces. An exemplary embodiment of a chat utility will now be described with respect to the chat window 330 of the exemplary place interface 320 shown in FIG. 3D.

As shown in FIG. 3D, the exemplary chat utility or window 330 includes portions 330*a* and 330*b*. For purposes of clarity, portions 330*a* and 330*b* are referred to herein as the history and live components of the chat window, respectively. The live component 330*b* is configured for receiving chat messages for transmission, and the history component 330*a* is configured for providing and/or otherwise presenting chat messages that are exchanged during a visit to a place (e.g., in the form of a chronological log file or transcript). For example, a user 1021 interacting with client 120(1) and desiring to exchange a chat message with another user 102M interacting with client 120(M) of a place can enter and/or otherwise provide the message into the live component 330*b* of the chat window 330 via an input device (e.g., a keyboard, a stylus, a mouse, etc.) of the client 120(1). Based on detecting the entry of the message in live component 330*b*, client 120(1) presents the message in history component 330*a* and transmits the message to server 140 for further transmission. Based on receiving the message from client 120(1), server 140 transmits the message to client 120(M) based on the IP address of client 120(M) stored in on-line status data 230 for presentation in the history component 330*a* of the corresponding chat utility 330.

Usually, chat messages that are entered and/or otherwise provided into a live component 330*b* of a chat window 320 are considered public messages. As such, server 140 transmits chat messages that are received from a client 120 via a live component 330*b* to all other clients 120 in a place. The chat facility 330 is, therefore, a public chat facility that allows all users in a place to chat with each other.

Alternatively and/or in combination, in some embodiments, the users in a place can exchange private chat messages with each other based on generating a private place. In one such embodiment, a user 1021 desiring to exchange a private chat message with another user 102M can select the user 102M identifier (or other user 102M indicia) in (i) the people sub-window 324 of the exemplary place interface 320 shown in FIG. 3D for the place or (ii) if user 102M has been designated as a friend by user 1021, the exemplary welcome window 310 shown in FIG. 3C. Based on receiving the selection, server 140 establishes a new place for users 1021 and 102M (and only users 1021 and 102M) based on the schemes previously described herein. Users 1021 and 102M can then exchange private chat messages with each other based on entering those messages into the live component 330*b* of the chat utility 330 of the place interface 320 for the new place. As further described herein, the new place can be administered in parallel to, and independently of, the pre-existing place.

In some embodiments, the disclosed systems and methods provide email accounts for a place and/or a group of users, e.g., users authorized to access the place. Email exchanges between users in a place can be implemented based on the chat schemes described herein and schemes known to those of ordinary skill in the art. In some embodiments, the place interface can include an email window similar to the chat window 330 of the exemplary place interface 320 shown in FIG. 3D. Email account data can be stored in place data 250, e.g., place log files 275, so that emails exchanged in a place can be accessed by all users. Storing exchanged chat messages and email messages provides convenient access to such messages to future users of a place (e.g., to users who were not present in the place and/or were not authorized to access the place during the exchanges).

In some embodiments, the users in a place can share content with each other via the place interface. Such content can include applications, data files, displays, and/or other types of content. Content sharing can be understood to include the "pushing" of content (e.g., by server 140 in system 100) "into view" (e.g., to clients 120 for presentation in corresponding place interfaces). Some types of supported content sharing include, but are not limited to, the sharing of pixels in a presented data file (e.g., the sharing of pixels in content window 328), the sharing of pixels from a display screen (e.g., the sharing of the pixels on a display screen of a user of system 100), and the sharing of pixels in an application (e.g., an application executing on a client).

Figure 8A:
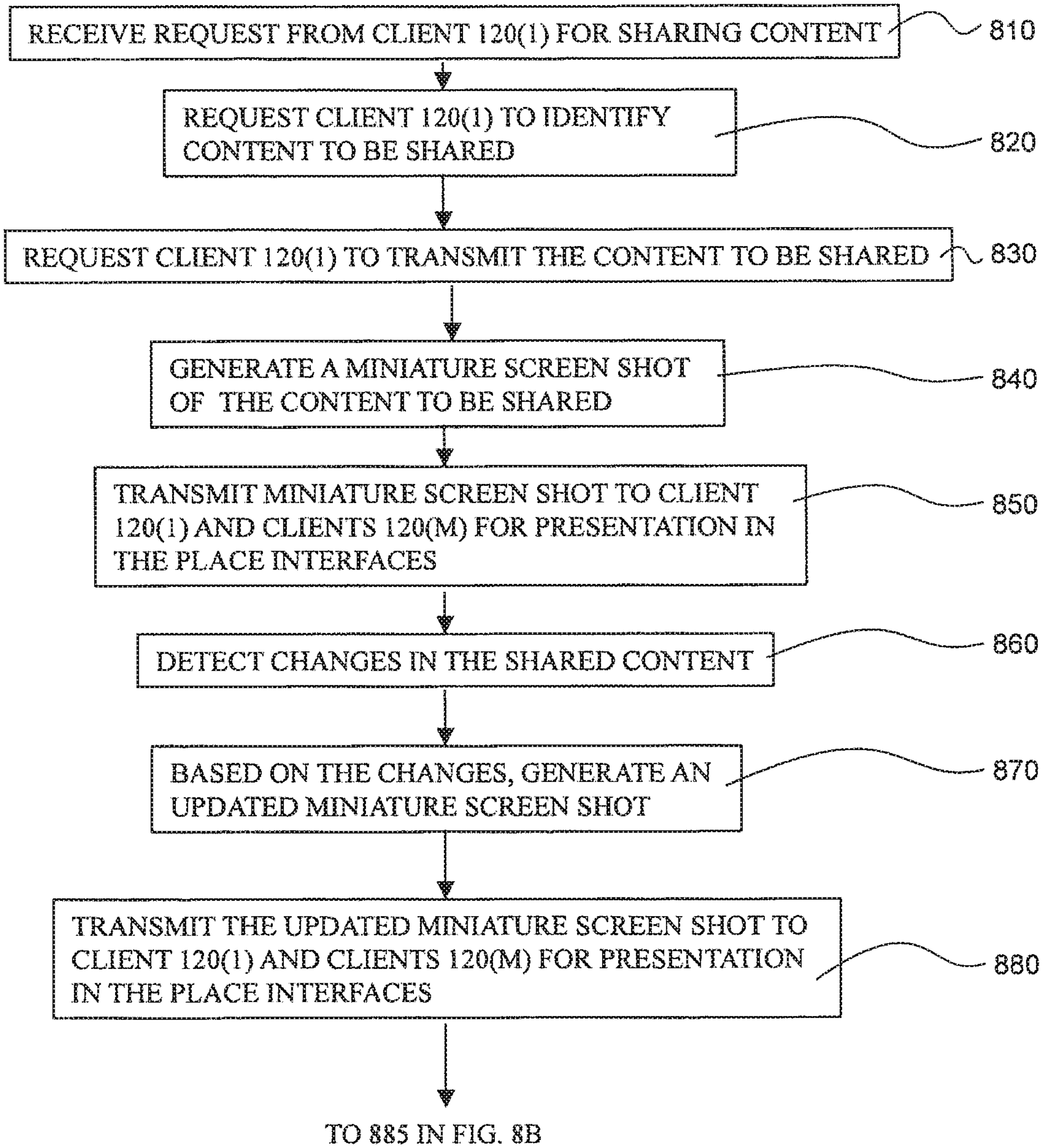
FIGS. 8A and 8B schematically illustrate an embodiment of a method for administering content sharing in a place in accordance with one embodiment of the present invention.
Figure 8B:
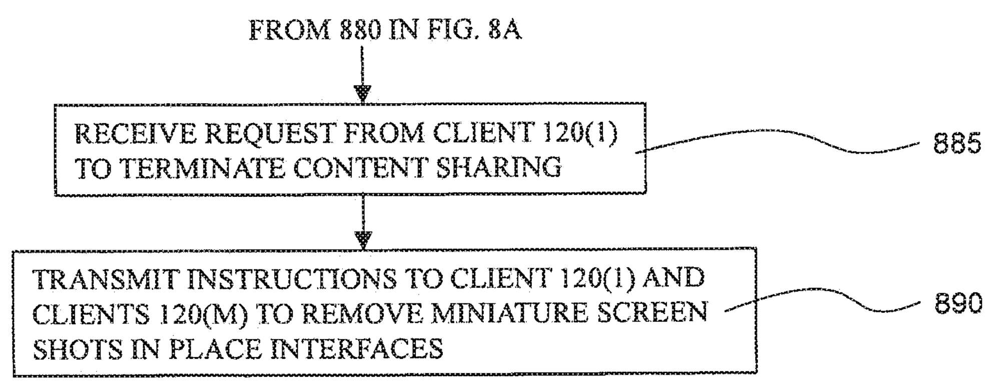

FIGS. 8A and 8B schematically illustrate an example of steps involved in an embodiment of a method for administering content sharing in a place. The embodiment is described with respect content window 328 in the exemplary place interface 320 of FIG. 3D.

As shown in FIG. 8A, a request from a user 1021 interacting with client 120(1) for sharing content in a place is received at server 140 in system 100 (810 in FIG. 8A). In some embodiments, the request can be generated based on a selection from a pull-down menu 332 in the exemplary place interface 320 shown in FIG. 3D. Based on receiving the request, server 140 queries, prompts, or otherwise requests client 120 to identify the content to be shared (820 in FIG. 8A). In most embodiments, server 140 requests client 120 to select the content from among default types of content. For example, in one such embodiment, the default types of content include (i) the content displayed in the content window 328 of the exemplary place interface 320 shown in FIG. 3D (e.g., the content of a place data file 260 or user data file 248), (ii) the content displayed on the screen of display device 126 of client 120(1) (e.g., the place interface for client 120(1) and the desktop for client 120(1)), and (iii) the content displayed in an application currently executing on client 120(1) (e.g., a place interface for another place and/or an application executing on the desktop of client 120(1)). Based on receiving an identification of the content to be shared, server 140 prompts, queries, or otherwise requests client 120(1) to transmit the shared content (830 in FIG. 8A). Based on receiving the shared content, server 140 generates a miniature screen shot or "thumbnail" of the shared content based on schemes known to those of ordinary skill in the art (840 in FIG. 8A) and transmits the miniature screen shot of the shared content to client 120(1) and other client(s) 120(M) in the place for presentation in the corresponding place interfaces (850 in FIG. 8A). For example, in some embodiments, server 140 transmits the miniature screen shots to client(s) 120(1) and 120(M) for presentation in the thumbnails 324*a* of the people window 324 of the place interface 320 shown in FIG. 3D. Server 140 can transmit the shared content to clients 120(1) and 120(M) based on the IP addresses for those clients stored in on-line status data 230.

Client 120(M) can view the shared content in thumbnail 324*a* based on activating and/or otherwise selecting the thumbnail 324*a*. For example, client 120(M) can click on or otherwise designate the thumbnail 324*a* with a mouse or other input device. Activation of thumbnail 324*a* causes place interface program(s) 104 and/or 108 to present the shared content in content window 328. Preferably, shared content is accompanied by toolbars 328*b* and scrollbars 328*c* to facilitate editing and navigation of the shared content.

During content sharing, client 120(1) and/or server 140 can detect changes in the shared content based on schemes known to those of ordinary skill in the art (860 in FIG. 8A). Based on those changes, server 140 can generate an updated miniature screen shot (870 in FIG. 8A), and transmit the updated miniature screen shot to client 120(1) and other clients 120(M) for presentation in the corresponding place interfaces (880 in FIG. 8A). Also, clients 120(1) and 120(M) and/or server 140 can update the content window 328 to include the changes.

With reference to FIG. 8B, client 120(1) can terminate content sharing as desired. For example, in one embodiment, client 120(1) can terminate content sharing based on a selection of an option from a pull-down menu 332 in the exemplary place interface 320 of FIG. 3D. Based on receiving a request to terminate content sharing from client 120(1) (885 in FIG. 8B), server 140 transmits instructions that cause clients 120(1) and 120(M) to remove thumbnails 324*a* in people window 324 (890 in FIG. 8B).

Figure 9A:
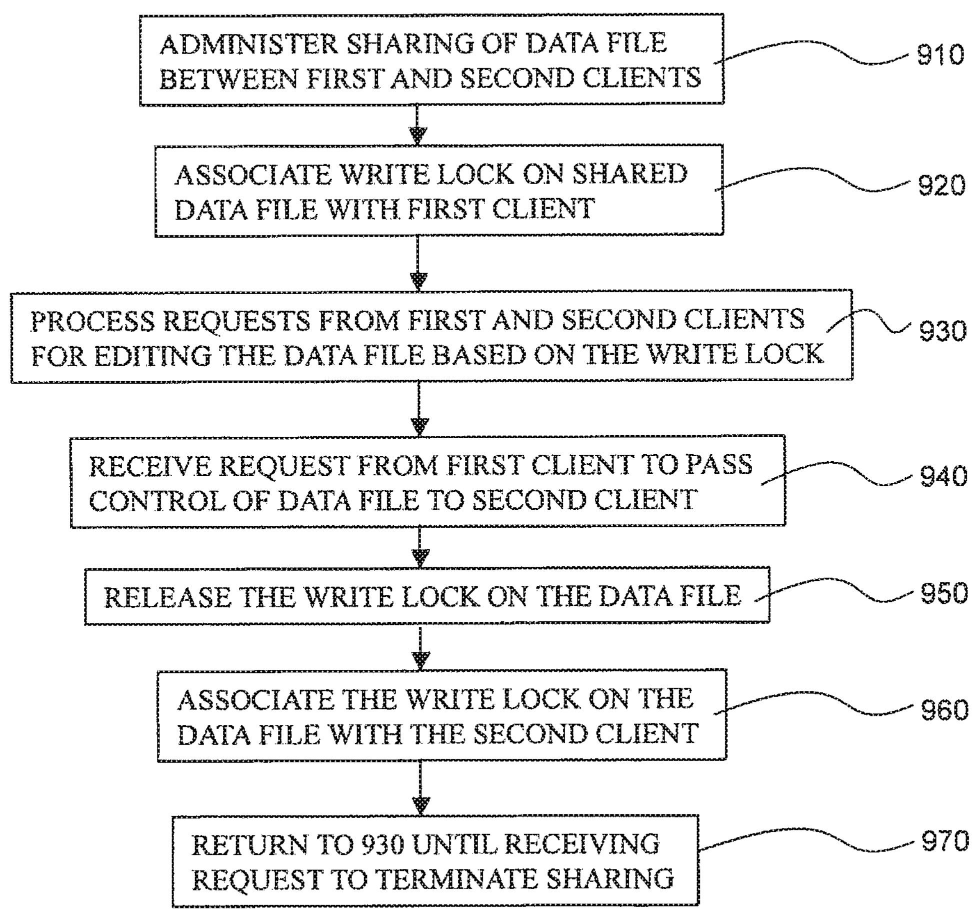
FIG. 9A schematically illustrates an embodiment of a method for administering consecutive content editing in a place in accordance with one embodiment of the present invention.

In some embodiments, the users in a place can consecutively edit (e.g., write to) content being shared with each other (e.g., a data file) via the place interface. Such consecutive editing involves control of content (e.g., a data file), rather than control of a collaboration place (e.g., server 140 and/or another component of system 100). FIG. 9A schematically illustrates an embodiment of a method for administering consecutive content editing in a place. The embodiment is described with respect to content window 328 and the control panel 390 in the exemplary place interface 320 of FIG. 3D. As will be understood by those of ordinary skill in the art, the disclosed systems and methods are not limited to the embodiment shown in FIG. 9A and can administer consecutive content editing in a place based on features that are different than and/or additional to the features shown in FIG. 9A.

As shown in FIG. 9A, server 140 administers the sharing of a data file between user $\mathbf{102}_1$ interacting with client 120(1) and user $\mathbf{102}_M$ interacting with client 120(M) based on the schemes previously described herein (910 in FIG. 9A). Server 140 associates a write lock on the data file with an identifier for user $\mathbf{102}_1$ and/or client 120(1), i.e., the user/client who initiated the content sharing, so that only user $\mathbf{102}_1$/client 120(1) can edit and/or otherwise write to the data file (920 in FIG. 9A). Server 140 processes requests from the clients 120(1) and 120(M) for editing the data file based on the write lock, e.g., based on determining whether the identifier of the requesting client is associated with the write lock for the data file (930 in FIG. 9A). Server 140 denies editing requests from client 120(2) until user $\mathbf{102}_1$/client 120(1) passes control of the data file. (Usually, a denial of a request to control a data file is experienced by a user as an inability to highlight, grab, or otherwise select a visible portion of the shared data file presented in the content window 328.)

With continuing reference to FIG. 9A, a request from client 120(1) to pass control (e.g., write permission) of the data file to client 120(2) is received at server 140 (940 in FIG. 9A). In some embodiments, client 120(1) can generate a request to pass control based on activating the control icon 394 in the control panel 390 of the content window 328 shown in the exemplary place interface 320 of FIG. 3D. Client 120(1) can pass control to client 120(2) voluntarily or in reply to a request from client 120(2) for the control. Such a request can be generated based on an activation of control icon 394 by client 120(2) and can be pushed by server 140 to client 120(1) for presentation in the place interface. Based on receiving the request, server 140 releases the write lock for the data file from its association with the user $\mathbf{102}_1$/client 120(1) identifier (950 in FIG. 9A) and associates the write lock for the data file with the user $\mathbf{102}_2$/client 120(2) identifier (960 in FIG. 9A). Server 140 then returns to processing requests for control (930 in FIG. 9A) until receiving a request to terminate sharing (970 in FIG. 9A).

In some embodiments, the users in a place can concurrently edit (e.g., write to) content being shared with each other via the place interface. This so-called "co-editing" feature of the disclosed systems and methods allows clients to simultaneously modify different fields of a data file in a place. For example, in some of such embodiments, each client can concurrently modify a field of a spreadsheet (e.g., a cell, a row, or a column) or a document (e.g., a word, a sentence, or a paragraph).

Usually, the co-editing feature is supported by client-side and server-side software. On the client side, each client includes at least two types of software applications executing thereon. The first type of software applications includes applications that are configured for modifying and otherwise interacting with data files. The second type of software applications includes applications for interfacing the first type of software applications to the server. The second type of software applications can include so-called "software development kits" (SDKs) that are known by those of ordinary skill to facilitate the client-side development of plug-ins for the first type of software applications. Utilizing SDKs to interface client-side software with the server obviates the necessity of exposing server-side software to the clients, thereby enhancing the integrity of the server. On the server side, the server includes software for supporting the co-editing feature, i.e., software for administering independent data streams from independent clients. The server-side co-editing software is configured for monitoring, tracking and/or otherwise detecting interactions between the clients, monitoring, tracking, and/or otherwise detecting changes to shared content, and advising the clients of and/or otherwise transmitting to the clients the detected changes. The server-side co-editing software is further configured for detecting and avoiding co-editing collisions. Such collision detection and avoidance is facilitated by software for administering data ranges within objects and permissions or locks associated with those ranges.

Generally, each data file in the disclosed systems and methods includes a lock scheme that determines the extent to which the data file can be simultaneously edited by clients. The lock scheme separates the data file into one or more parts or sub-parts and associates a lock with each of those parts. For example, the lock scheme for a word processing document can include a lock for each word, sentence, or paragraph within the document. As described herein, a lock scheme that associates locks with different parts of an object allows different clients to simultaneously edit, i.e., co-edit, those parts.

As will be understood by those of ordinary skill in the art, a lock scheme can associate a single lock with an entire object. While such lock schemes do not permit co-editing because the lock can be associated with only a single client, they do permit consecutive editing and global control of a data file. Such global control can be useful in scenarios in which one client desires to edit or otherwise modify a place data file without interference from other clients.

Usually, based upon interfacing of a client to a server, a client-side plug-in for a software application on the client identifies its lock scheme to the server (i.e., identifies the type and number of locks associated with the object managed by the plug-in) and requests that the server administer that lock scheme. For example, a plug-in for a simple chessboard application can indicate to the server that two static locks and one dynamic lock are to be managed, in which the static locks are associated with the two clients who are "playing" the white and black pieces, and the dynamic lock is associated with the one of the two clients who has the turn or opportunity to move a piece.

An illustrative example of the co-editing feature will now be provided. In the illustrative example, first and second clients are sharing a data file in a place. Those of ordinary skill in the art will understand that the disclosed systems and methods are not limited to the example and can implement co-editing based on features different than and/or additional to those described in the example.

Based on interfacing to a server, a first client identifies a lock scheme for a data file to the server, in which each field of the data file is associated with a lock. Subsequently, the first client requests permission to edit a field of the data file. In reply, the server determines whether the field is locked or otherwise unavailable to the first client. Based on determining that the field is not locked, the server grants permission to the first client and updates a database of locks for the data file to represent the association of a lock on the field with the first client. Thereafter, the second client requests permission to edit the same field of the data file. Since the lock on that field is associated with the first client, the server denies permission to the second client. Denial of permission to edit a field can manifest itself to the second client as an inability to highlight, grab, or otherwise "touch" the designated field with a user input device. Sometime later, the first client requests permission to edit another field. Once again, the server determines whether that other field is locked and, as appropriate, grants permission to the first client and updates the database of locks for the data file to reflect the lock on that other field. Additionally, the server releases the lock on the field originally edited by the first client, thereby allowing the second client to edit that field.

In some embodiments, the server modifies one or more portions of the collaboration place interfaces of the first and second clients so as to denote, indicate, and/or otherwise illustrate features of the lock scheme. For example, in some of such embodiments, the server modifies the display of the data file being co-edited in the content window of the collaboration place interfaces to indicate fields that are locked (e.g., by other users). Such a display scheme can reduce user confusion and/or frustration when requests to edit otherwise locked fields are denied and/or otherwise unsuccessful.

Figure 9B:
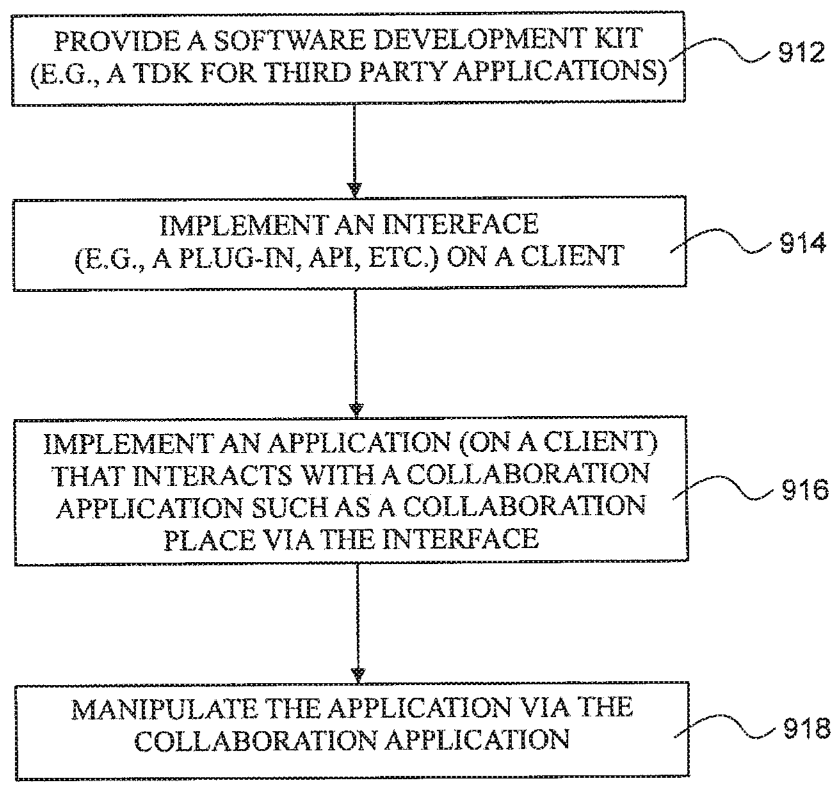
FIG. 9B schematically illustrates an embodiment of a method for extending a collaboration application in accordance with one embodiment of the present invention.

As mentioned above, a software development kit may be provided in connection with a virtual collaboration environment to facilitate an open architecture so that, for example, companies who develop their own software products can layer and combine their software functionality with a collaboration place and extend the range of their abilities. For example, illustrative steps involved in implementing such an architecture or functionality are shown in FIG. 9B. At step 912, a software development kit such as software development kit for third party applications may be distributed in association with a collaboration application such as an application for providing a collaboration place. At step 914, a software data interface such as an application program interface or a plug-in is implemented that is adapted to interact with software developed by the software development kit and provide a communications interface with the collaboration application. At step 916, an application is implemented on a client that interacts with the collaboration application via the interface. The application may be an application that is developed and implemented privately by a customer of the collaboration software who, for example, intends to maintain the software internal to the company. At step 918, the software collaboration application interacts with the application to augment the functionality of the application. For example, the application may be manipulated to control user or computer interactions, to centrally store information on interactions, to maintain a related database, etc.

Figure 9C:
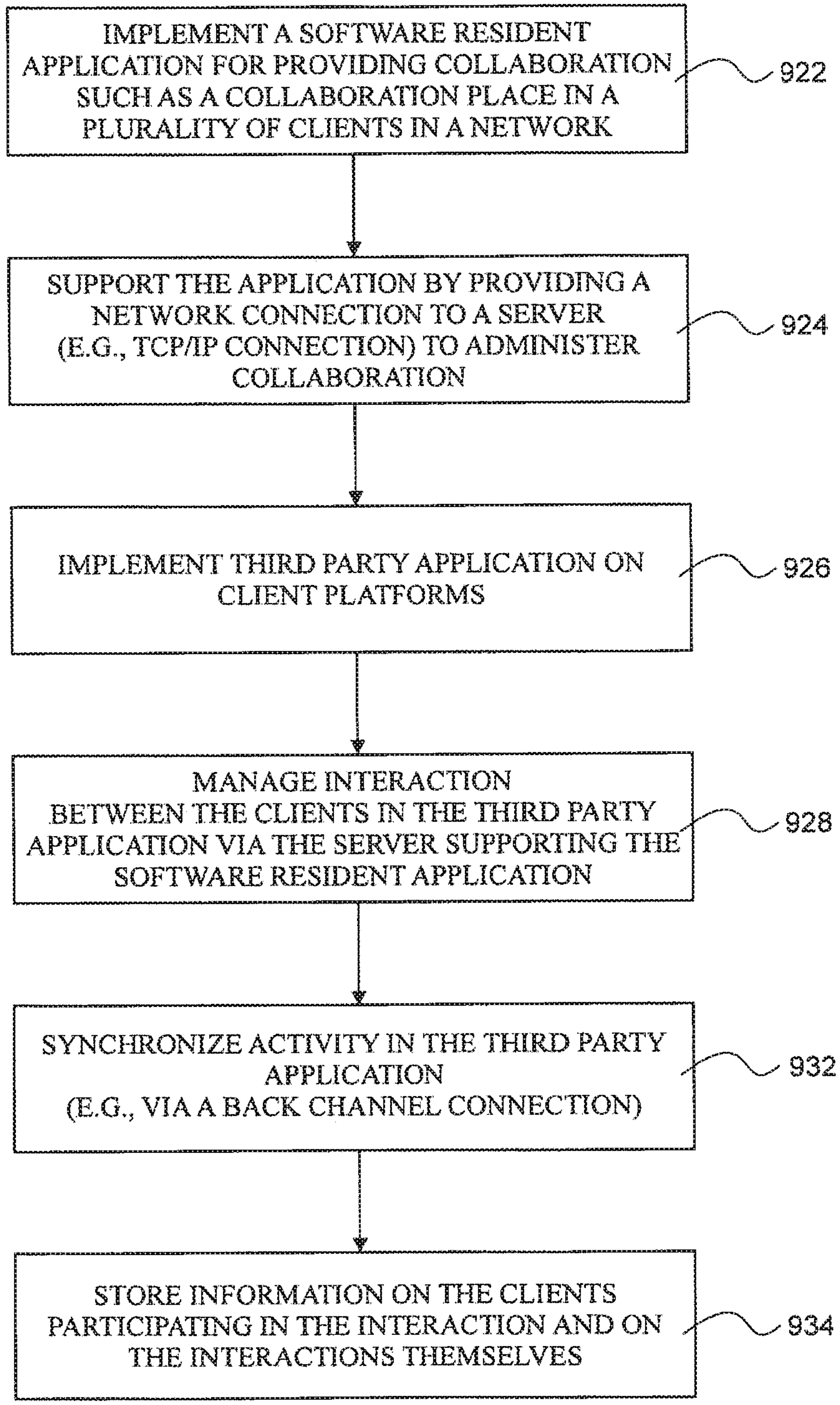
FIG. 9C schematically illustrates an embodiment of a method for administering collaboration in an application through an Internet connected server for a collaboration application in accordance with one embodiment of the present invention.

In one embodiment, a user desktop application can benefit from the collaborative infrastructure. For example, with reference to FIG. 9C, at step 922, a software resident application implemented on a user computer to provide collaboration tools such as a collaboration place can be implemented for a plurality of users. At step 924, the collaboration application may be supported by implementing a network (e.g., Internet) connection (e.g., using TCP/IP) with a server that is configured to interact with the software resident collaboration application for providing collaboration among the users. At step 926, a third party application (e.g., another software resident application) is implemented on user platforms (e.g., to coexist in executable form on the user computers). (As used herein, the term user platform can be understood to include computer software and/or hardware for accessing a collaboration place.) At step 928, interaction between the users in the third party application is managed via the server supporting the software resident application for collaboration. As such, the features of the collaboration application and supporting server can be extended to other desktop applications. By managing the other application, the user-interactions, software client to client interactions, or operation of the other applications can controlled or managed via communications (e.g., sending messages) between the other application and the server. In some respect, the server and the related collaboration software provide a framework for implementing and running the other application on user platforms. At step 932, activity in the third party application can be synchronized by the server (e.g., via a back channel connection) such as to provide live interaction within the third party application between users. Step 932 is directed to managing or updating the other application (e.g., managing or updating the displayed or accessible information in that application for the users) synchronously. Step may be, if desired, a component of step 928 (e.g., to implement synchronous feature). Thus, interactions can be viewed live by participants. At step 934, information on the users participating in the interaction (e.g., identity information such as authentication or tracking information) or information on the interactions themselves are stored (e.g., centrally stored). The information stored can be related to the activity on the server (e.g., can be information (e.g., files) that resulted from activity on the server to support the other application and is stored for later retrieval by the users who participated in the activity.

Figure 9D:
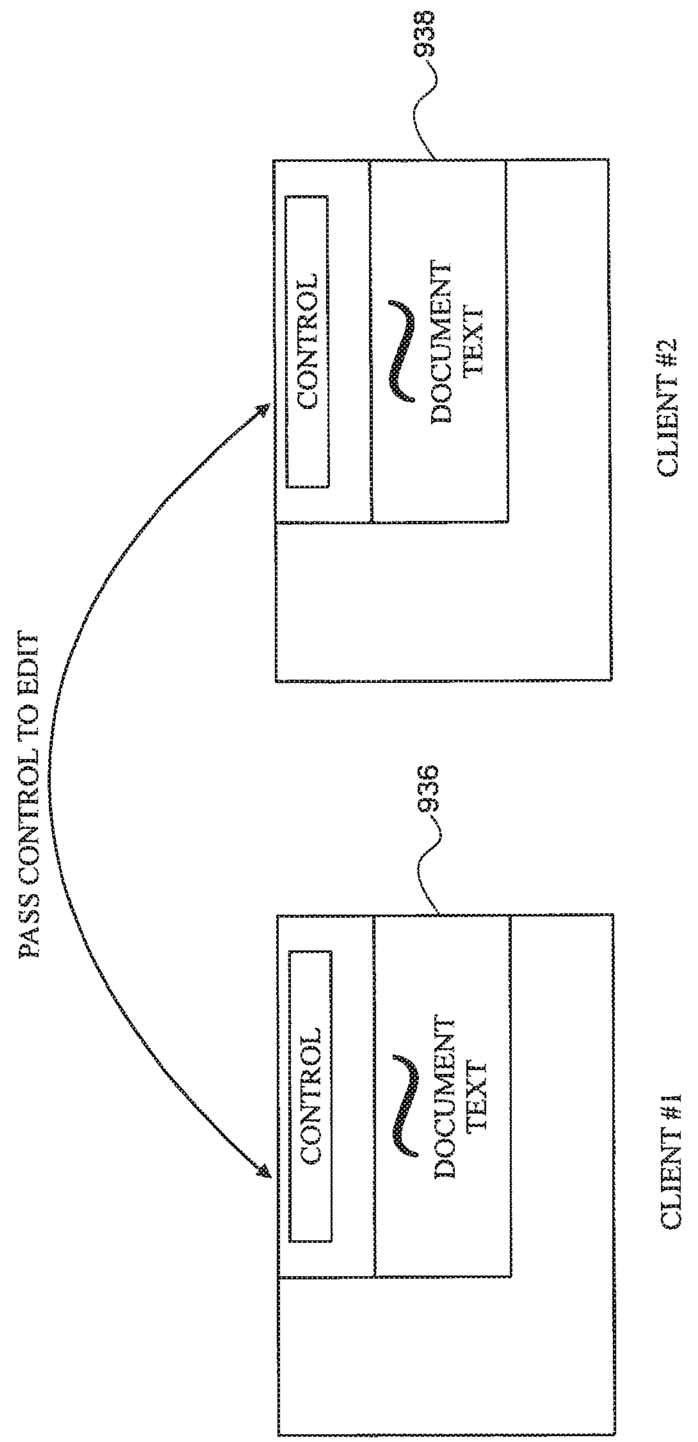
FIGS. 9D-9F schematically illustrate embodiments of screen shots and interactivity for implementing co-editing in accordance with one embodiment of the present invention.
Figure 9E:
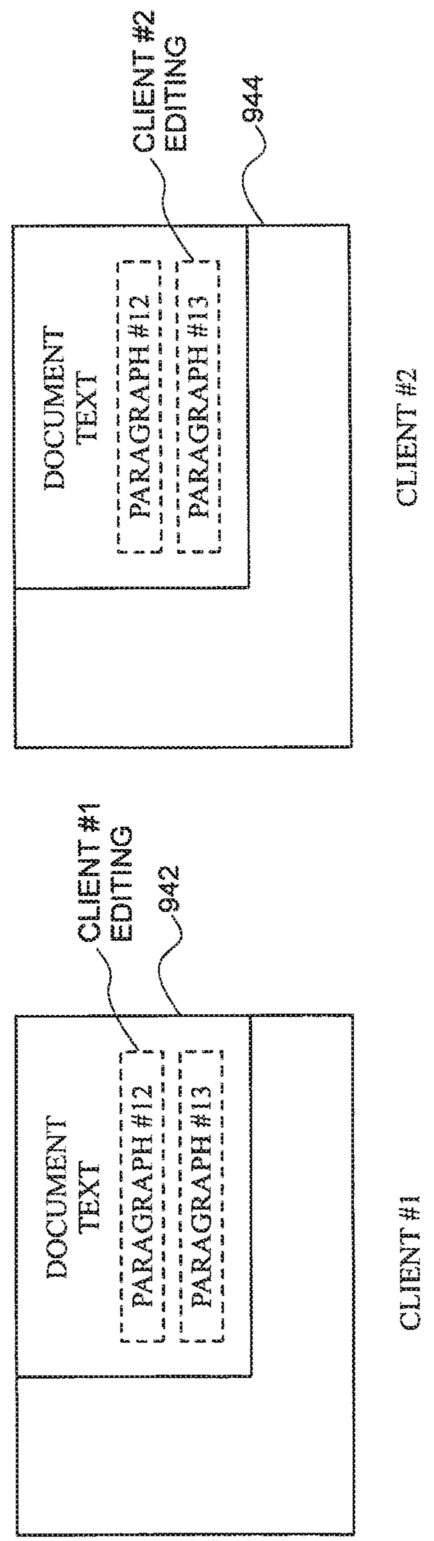
Figure 9F:
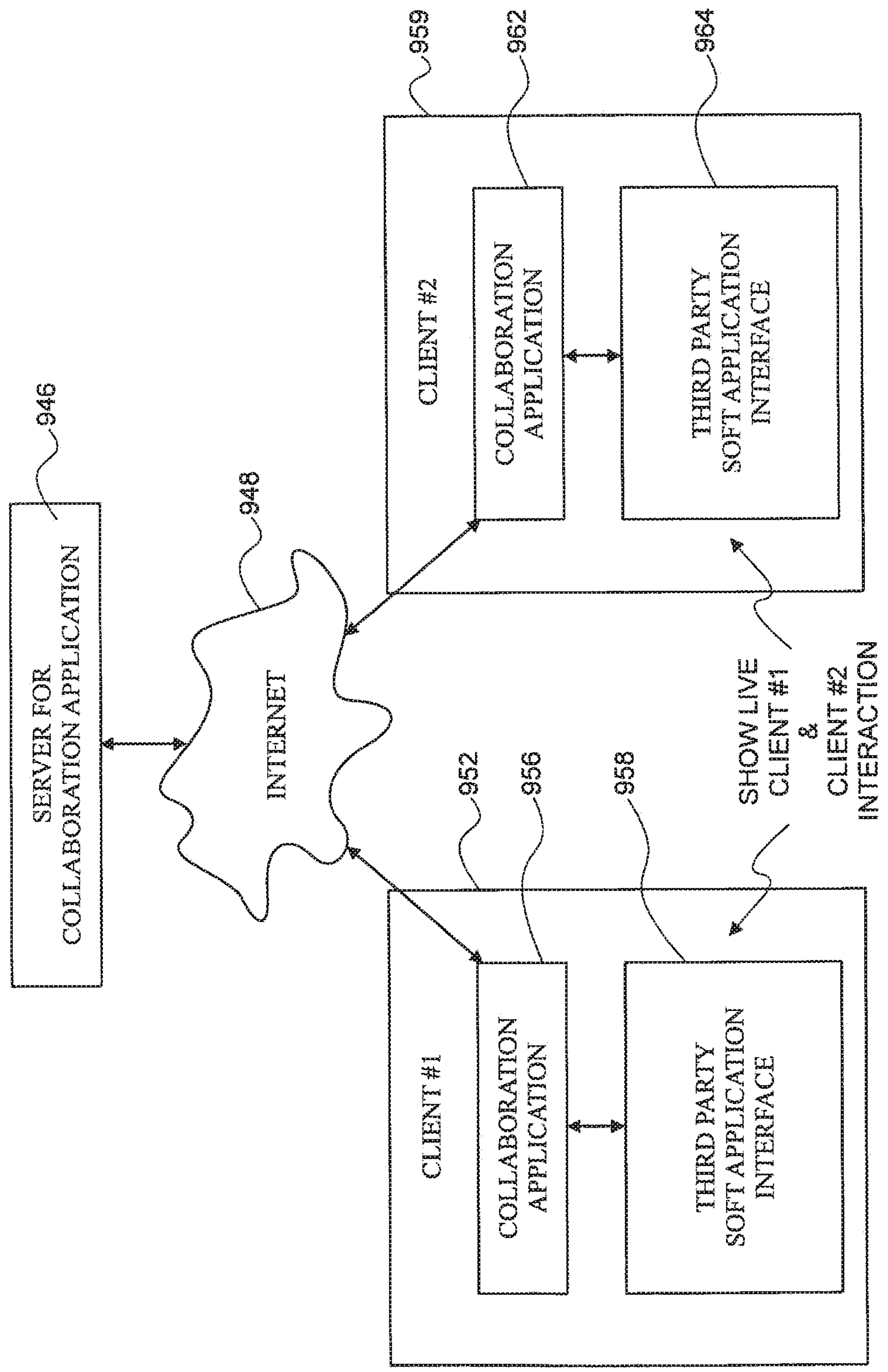

Illustrative examples of "co-editing" or partnered control over applications and documents are illustratively shown in FIGS. 9D-9F. In FIG. 9D, co-editing is enabled by implementing a control button that can be selected to take control over a document or application in a client's content window. As shown, client #1 and #2 are each in a collaboration place in which they are participating in a collaboration using content windows 936 and 938 to co-edit the same document. Content windows 936 and 938 may include the features and functionality of the collaboration interfaces illustratively described in connection with FIGS. 3A-3G. The application running in content windows 936 and 938 may be a text editor, word processor, or other application that is integrated with the collaboration place as part of the executable software of the place or may be a third party application that is adapted to allow such functionality. FIG. 9E is illustrative of simultaneous co-editing. In this case, client #1 and client #2 are provided with an opportunity to interface with the same document or application by controlling access to components of the document or application. As shown, client #1 is editing paragraph #12 of a document at the same time as client #2 is editing paragraph #13. FIG. 9F illustrates an infrastructure for providing live interaction. As shown, server 946, collaboration applications 952 implemented on the user platform of client #1 and collaboration application 962 implemented on user platform of client #2 are configured to communicate via Internet connections 948 to provide a collaboration system. Each client may further include a third party software application interface that is developed for example by a company with intranet clients #1 and #2. The third party software interface 958 and 964 are configured to interact with collaboration applications 956 and 962 to provide collaboration between client #1 and #2 in the third party application. The interaction may be displayed and update in real time (i.e., as events happen) in the interface via the collaboration infrastructure (e.g., using a back channel connection with the server to push event updates).

In another aspect, one of the users involved in co-editing of a document may be given the option to halt the work of another user in that document. This control may be attributed to a particular user based, for example, on identifying the user who contributed the document to the collaboration or who created the document. This type of control permits a user to maintain control over the consecutive or simultaneous co-editing of document by others.

Figure 10:
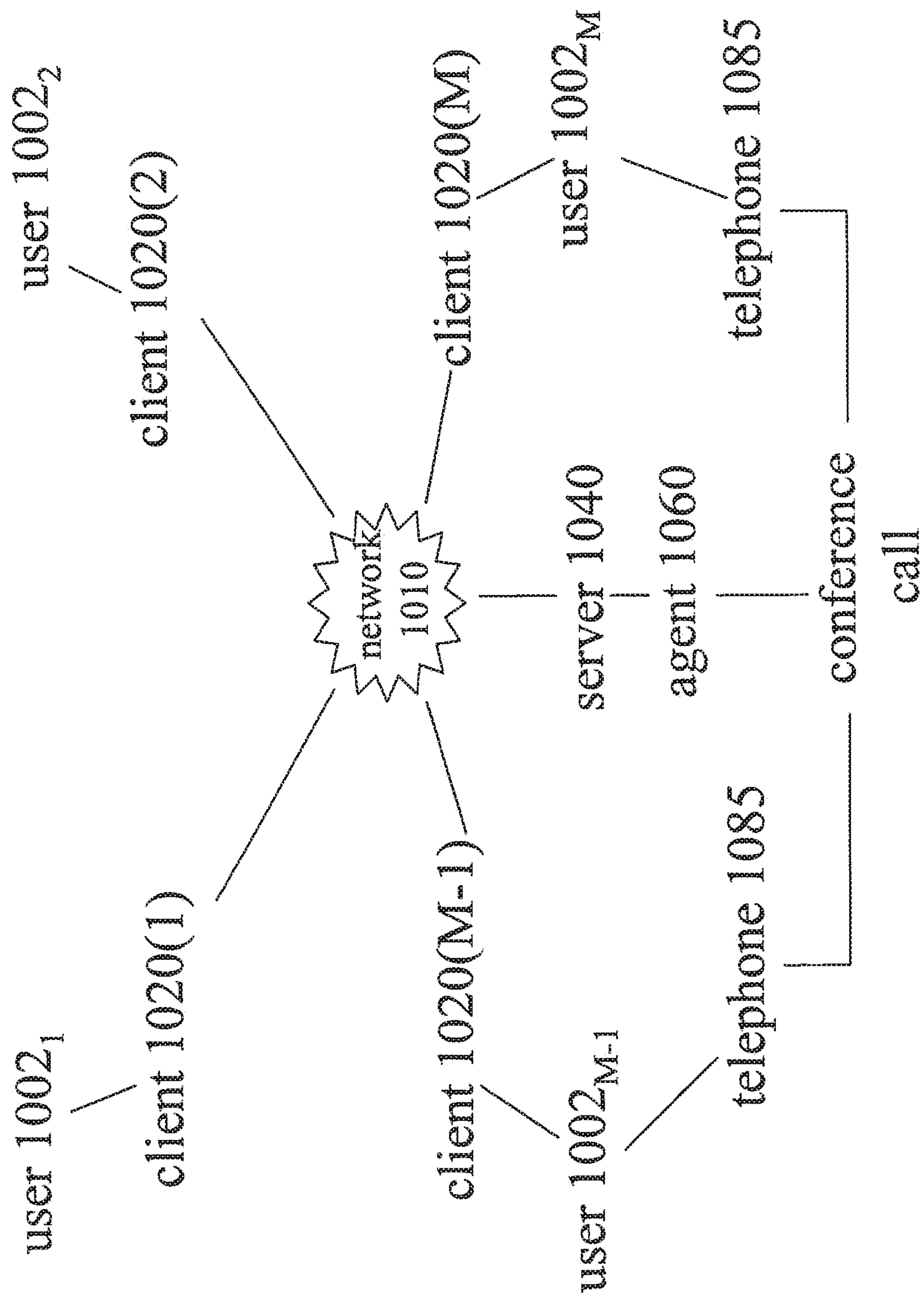
FIG. 10 schematically illustrates an exemplary system for supporting voice communications in a place in accordance with one embodiment of the present invention.

In some embodiments, the disclosed systems and methods support audio (e.g., voice) communications among users in a place. FIG. 10 schematically illustrates an exemplary system for supporting voice communications in a place. As shown in FIG. 10, users 1002, interacting with respective clients 1020(*i*) can access a place based on communicating with server 1040 over network 1010 based on schemes described herein. Clients 1020(1) and 1020(2) are voice-enabled clients, i.e., they are associated with peripheral devices for converting sound into electrical signals (e.g., microphones) and peripheral devices for converting electric signals into sound (e.g., speakers). Clients 1020(M−1) and 1020(M) are not voice-enabled clients, but respective users 1002(M−1) and 1002(M) can interact with conventional telephones 1085 (e.g., plain old telephone service (POTS) telephones, wireless telephones, etc.). At least three different types of voice conversations can be established in a place have voice-enabled and non-voice-enabled clients: (i) conversations between two or more voice-enabled clients, (ii) conversations between two or more non-voice-enabled clients, and (iii) conversations between one or more voice-enabled clients and one or more non-voice-enabled clients. Some exemplary schemes for establishing these types of voice conversations will now be described. As will be understood by those of ordinary skill in the art, the disclosed systems and methods are not limited to the exemplary schemes and can be implemented to support voice communications in a place based on schemes including different and/or additional features than those described herein.

Voice communications can be established in a place based on receiving a request from one or more users in the place. For example, in some embodiments, a request from a first user to establish a voice conversation with a second user can be received at server 1040. In one such embodiment, the request can be generated based on a selection from a pull-down menu 332 in the exemplary place interface 320 shown in FIG. 3D. Based on receiving the request, server 1040 determines whether the first and/or second users are interacting with voice-enabled clients based on schemes known to those of ordinary skill in the art. For example, in one embodiment, server 1040 can prompt, query, and/or otherwise request the respective first and second clients to identify and/or otherwise indicate their voice capabilities.

Based on determining that the first and second users are interacting with voice-enabled first and second clients (e.g., clients 1020(1) and 1020(2)), server 1040 establishes a voice connection between the clients based on Voice over Internet Protocol (VoIP) or another packet-switched protocol known by those of ordinary skill in the art to support voice communications. Server 1040 mediates the voice communications between the first and second users (e.g., to provide VoIP call-control functionality to the respective clients, such as call muting, call waiting, and call disconnecting), records the communications, and synchronizes the communications with interactions between the first and second users in the place so as to generate audio-synchronized place log files 275.

Based on determining that the first and second users are interacting with non-voice-enabled first and second clients (e.g., clients 1020(M−1) and 1020(M)), server 1040 selects a conference call line for association with the first and second users (e.g., selects a line from among one or more such lines associated with the place and/or with system 100), determines a password/passcode for the conference call line, transmits the password/passcode to the first and second users, and activates software agent 1060 to connect to the conference call line. Based on server 1040 and/or agent 1060 detecting the connection of the first and second users to the conference call line, agent 1060 records the communications between the first and second users. Server 1040 synchronizes the recorded communications with interactions between the first and second users in the place so as to generate audio-synchronized place log files 275.

Based on determining that the first and second users are interacting with a first voice-enabled client and a second non-voice enabled client, respectively, (e.g., clients 1020(1) and 1020(M−1)), server 1040 again selects a conference call line for association with the first and second users, determines a password/passcode for the conference call line, transmits the password/passcode to the second user, and activates software agent 1060 to connect to the conference call line. Also, server 1040 establishes and mediates a VoIP connection (or another type of connection for supporting voice communications) between the first client and the agent 1060. Based on server 1040 and/or agent 1060 detecting the connection of the second user to the conference call line, agent 1060 records the communications between the first and second users. Server 1040 synchronizes the recorded communications with interactions between the first and second users in the place so as to generate audio-synchronized place log files 275. Such a scheme allows voice-enabled clients and non-voice enabled clients to participate in a unified voice conversation.

Based on determining that the first user is interacting with a first voice-enabled client and the second user is interacting with a second partially voice-enabled client (e.g., a client having speakers, but not a microphone), server 1040 establishes a VoIP connection between the clients. Such a connection, which allows the second client to listen to voice communications from the first client, can be useful in a scenario in which the first user is giving a presentation to the second user in a place.

Voice communications can also be established in a place by default. For example, in some embodiments, a place can be said to be "wired for sound," e.g., the server administering the place can establish VoIP and/or other types of voice-supporting connections between voice-enabled clients based on detecting the entrance of those clients into the place.

Voice communications can also be established in a place retroactively. For example, in some embodiments, first and second users can establish a POTS conference call and then provide the conference call line and passcode/password to the server administering a place, so that the server can activate a software agent to record the communications.

As will be understood by those of ordinary skill in the art, voice and/or other types of audio communications can be selectively recorded. For example, in some embodiments, voice and/or audio recording can be selected by a user at one or more intervals, e.g., during a call set-up, during a meeting set-up, and/or during a meeting ("on-demand"). In some of such embodiments, based on receiving a selection of audio recording from a client participating in a conversation, server 1040 can alert and/or otherwise advise other clients in the conversation of the recording and/or provide options to the other clients for pausing and/or otherwise terminating the recording (e.g., to go "off the record").

In some embodiments, server 1040 can provide data identifying the participants in a voice conversation, data identifying the speaking participant(s), and other data describing the voice conversation to clients 1020(*i*) for presentation in the place interfaces based on schemes described herein and schemes known to those of ordinary skill in the art. For example, in some embodiments, server 1040 can determine the identity of a speaking user in a voice conversation based on comparing one or more voice communications received from the user with one or more stored voiceprints for users of system 100. Also for example, in some embodiments, server 1040 can instruct clients 1020 to activate one or more icons in respective place interfaces to designate a speaking user (e.g., flash, illuminate, and/or otherwise highlight one or more icons associated with the speaking user).

In some embodiments, server 1040 can recommend and/or otherwise suggest that users in a place establish a voice conversation with each other based on detecting one or more criteria. For example, in one such embodiment, based on comparing the frequency and/or duration of exchanged chat messages with a threshold, server 140 can query, prompt, and/or otherwise request the first and second users to establish a voice conversation. Of course, server 1040 can be configured to recommend and/or otherwise suggest a voice conversation based on different criteria, such as criteria indicative of whether the first and second users prefer to communicate via chat and/or other criteria that will be apparent to those of ordinary skill in the art.

Video can also be implemented, for example, in conjunction with audio to further enhance collaboration. Video may be live video of collaboration participant or of other content of interest to the current place. Video can implemented to be displayed in a collaboration place interface.

One or more of the collaboration activities previously described herein can be understood more generally in terms of a so-called "activity thread" that describes how users work together in a place. Some examples of activity threads include instant and scheduled meetings. Each activity thread is associated with an activity plan and an activity record. Some features of activity threads, activity plans, and activity records will now be described.

An activity plan includes data describing a type of an associated activity thread (e.g., a meeting), data identifying the name of the activity thread, and data identifying participants in the activity thread. The participants in the activity thread can be selected and/or otherwise determined based on the schemes described herein. For example, in some embodiments, identifiers for the participants can be selected from and/or searched for based on the identifiers and/or contact information for the members of a place, the members of system 100, and/or other contacts (e.g., contacts in an email application, such as Microsoft® Outlook®).

In some embodiments, an activity plan also includes data identifying one or more of the following features of an activity thread: description; start time; duration; end time; participant instructions (e.g., audio, video, and/or multimedia instructions); agenda; and/or one or more thread options (e.g., de-activating one or more single-user activities and determining one or more guest privileges). Usually, the agenda of an activity thread includes one or more agenda items for consideration and/or completion by the participants of the thread. For example, an agenda item can include a name, an objective, a duration, a status indicator (e.g., pending, completed, confirmed, cancelled), notes (e.g., notes associated with a time of entry and/or an identifier of an author), and/or other features (e.g., attached content (such as data files or other objects (e.g., Internet pages) or links thereto). In some embodiments, the agenda item can be associated with one or more presenters (e.g., one or more participants responsible for the agenda item) and, in some of such embodiments, only the one or more presenters can edit and/or otherwise modify an agenda item. In some embodiments, the agenda items are ordered based on importance and can be re-ordered by their respective presenters.

An activity record includes data based on the activity plan (e.g., a summary of the data included in the activity plan) and data based on interactions in the respective activity thread. Activity records are stored in place log files 275 for subsequent reference based on the schemes described herein. In some embodiments, an activity record can be generated based on detecting a termination of an activity plan. For example, in some of such embodiments, an activity record can be generated based on detecting a selection of an end activity icon from a pull-down menu 332 in the exemplary place interface 320 shown in FIG. 3D.

Activity threads can be automatically or selectively established. In some embodiments, activity threads are automatically established based on the entrance of a user into a place. Alternatively, in some embodiments, activity threads are established based on the generation of an activity plan by a user in a place. Regardless, each activity thread includes one or more displays (e.g., one or more of the windows in the exemplary place interface 320 shown in FIG. 3D) and, in some embodiments, an accompanying audio channel.

Some examples of activity threads will now be described. Those of ordinary skill in the art will recognize that the disclosed systems and methods are not limited to the examples of activity threads described herein and can be implemented to support additional and/or different types of activity threads than those described herein.

A first example of an activity thread is a presentation that includes one active user ("the presenter") and one or more passive users ("the listeners"). In the first example, the place interfaces of the listeners are configured by server 140 based on the activity plan to include a personal display (e.g., content window 328) and a presentation display (e.g., a podium display), each of which displays can be viewed and navigated by the listeners based on the schemes described herein. The presenter can disable the personal displays of the listeners as desired (e.g., to focus the attention of the listeners), can generate one or more additional presentation displays, and can select and/or otherwise determine the presentation screen being viewed by the listeners.

A second example of an activity thread is a spontaneous thread that includes two or more active users in a place. In the second example, the place interfaces of the users include the displays previously described herein (e.g., the displays in the exemplary place interface 320 of FIG. 3D) for supporting chat and/or other types of collaboration activities.

A third example of an activity thread includes a scheduled meeting that includes two or more active users in a place. In the third example, an agenda is generated and content is associated with the agenda (e.g., data files or objects or links thereto). Based on the activity plan, server 140 configures the place interfaces of the users to include a presentation display, an agenda display, and a personal display. In some embodiments, server 140 provides a time indicator for presenting a time allotted to and/or otherwise remaining for the agenda and/or an agenda item. Based on detecting a termination of the activity thread, server 140 generates a summary of the activity thread, transmits the summary to the users (e.g., via email), and stores the summary and data based on the activity plan in an activity record.

In some embodiments, the disclosed systems and methods support guided collaboration schemes that facilitate collaboration among users in a place. As known by those of ordinary skill in the art, guided collaboration schemes can blend relatively structured and unstructured environments together. For example, one type of guided collaboration scheme includes one or more separate phases and one or more tasks within each phase, in which the phases are managed in a relatively structured way and the tasks are managed in a relatively unstructured way.

In some embodiments, the disclosed systems and methods support guided collaboration schemes that include one or more workflows. A workflow can be established by a user in a place (e.g., a manager of other users) and can be associated with one or more projects for completion by other users (e.g., employees) in the place. Each project can be assigned to one or more of the users and can be associated with one or more tasks and one or more applications and/or one or more data files for completing the tasks. Usually, only the user who established the workflow can edit and/or otherwise modify the workflow. The tasks, data files, and applications associated with a project are presented to the employees in a place via respective place interfaces. Based on completion of a task, an employee can be presented with different applications and/or different data files in the respective place interface for completion of another task.

In some embodiments, the disclosed systems and methods support guided collaboration schemes that include one or more templates. For example, in one such embodiment, the disclosed systems and methods can present a "home page" for a place in a place interface based on detecting the entrance of a user into the place. Such a home page can include links and/or other shortcuts to data describing events in the place (e.g., links to what is new in the place and what other users have been doing in the place).

Figure 11:
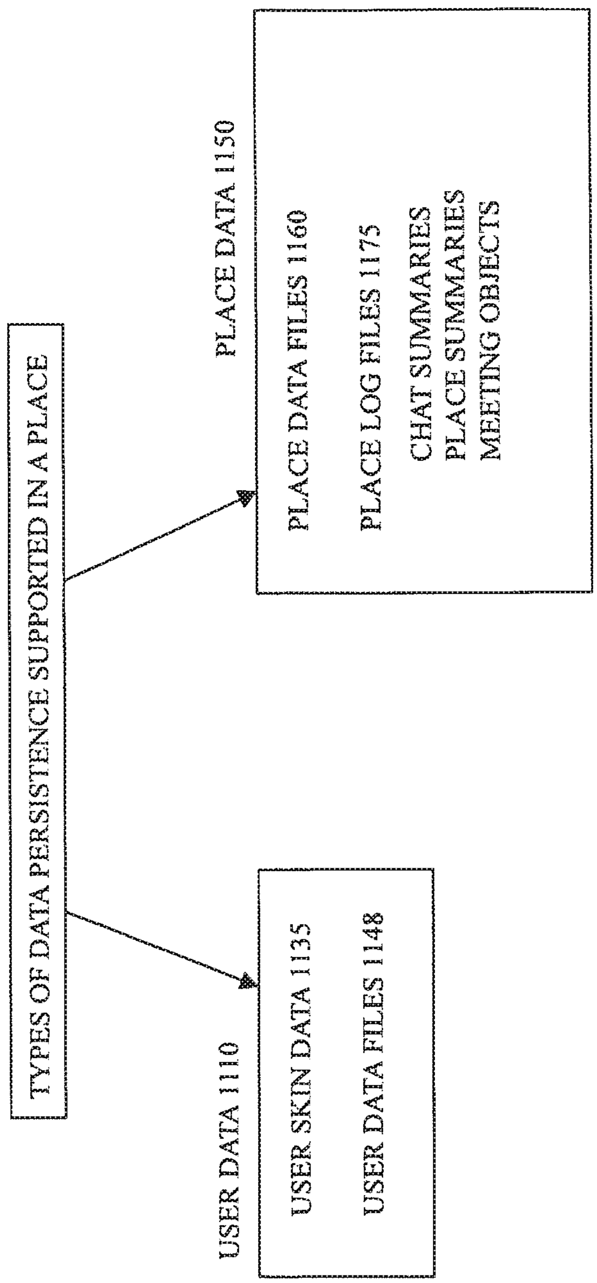
FIG. 11 schematically illustrates exemplary types of data persistence supported in a place in accordance with one embodiment of the present invention.

As previously indicated, the client-server infrastructure of the disclosed systems and methods supports data persistence in a place. FIG. 11 schematically illustrates exemplary types of data persistence in a place. As will be understood by those of ordinary skill in the art, the disclosed systems and methods are not limited to the types and/or the organizations of data persistence shown in FIG. 11 and can be implemented to support additional and/or different types and/or organizations of data persistence than those shown in FIG. 11.

As shown in FIG. 11, the exemplary types of data persistence include user-perspective data persistence and place-perspective data persistence. User-perspective data persistence refers to user-side data, such as user data 1110. Examples of user data 1110 include user skin data 1135 and user data files 1148. Place-perspective data persistence refers to place-side data, such as place data 1150. Examples of place data 1150 include place data files 1160 and place log files 1175. In some embodiments, place log files 1175 can include one or more of chat summaries, place summaries, and meeting objects. Features of place log files 1175 and their contents will now be described.

As previously described herein, place log files 1175 include data generated based on interactions between users in a place. Place log files 1175 can be generated based on the schemes described herein and the schemes described in U.S. patent application Ser. No. 09/942,161, now U.S. Pat. No. 7,627,810, the contents of which application are expressly incorporated by reference herein in their entirety.

As known by those of ordinary skill in the art, conventional data management systems that support versioning and audit trail functionality allow users to determine the state of one or more data files (or, more generally, objects, as that term is understood by those of ordinary skill in the art) at one or more prior times. Usually, such database management systems provide versioning and audit trail functionality based on an archive paradigm, in which versions of data files that are archived are divorced from their metadata (e.g., their time-sensitive context) so as to reduce data storage constraints.

In contrast to conventional data management systems, the disclosed systems and methods support metadata-rich storage schemes that allow users to access time-dependent views of a place. For example, in some embodiments, the log files 1175 for a place can be viewed by an authorized user via a log file interface. The log file interface can include a primary display and one or more secondary displays similar to those in the exemplary place interface 320 shown in FIG. 3D, one or more control icons for controlling the viewing of the log file (e.g., icons for rewinding, playing, pausing, and/or fast forwarding the log file), and a time or other status bar for denoting a relative time in the log file. In some embodiments, one or more of the control icons can be supplemented by and/or replaced with a slider on the time bar. In one such embodiment, based on receiving a selection of a time from a user, the disclosed systems and methods provide a view of the place in the log file interface that shows the state of all objects (including all data files and displays) in the place at the selected time based on the metadata associated with those objects. The time-dependent views of a place can be generated based on schemes known to those of ordinary skill in the art and the schemes described in U.S. patent application Ser. No. 09/942,161, now U.S. Pat. No. 7,627,810, the contents of which application are expressly incorporated by reference herein in their entirety.

In some embodiments, the log file interface can be used as a search utility to find and/or otherwise locate objects associated with a place. For example, a user desiring to find a data file that was associated with a place at a prior time can select the view of the place at that time in the respective place log files 1175 and then navigate that view (e.g., play or fast forward the view) to a later time (e.g., a present time) to determine the disposition of the object.

In some embodiments, server 140 stores chat messages that are exchanged by clients 120 in a place (e.g., via the live components 330*a* of the chat utilities 330 in the exemplary place interfaces 320) in a place log file 1175 to facilitate review of the chat messages. Server 140 associates the place log file 1175 with the place identifier for the place and stores the place log file 1175 in place data 1150. In some embodiments, server 140 stores the place log file 1175 based on detecting a termination event (e.g., based on detecting a logout of all of the participants from a place). Alternatively and/or in combination, in some embodiments, server 140 stores the place log file 1175 and updates the place log file 1175 at intervals (e.g., periodic intervals and/or intervals based on a quantity of data in the exchanged chat messages).

Storing chat messages in a place log file 1175 allows users to review the chat messages during subsequent visits to the place. For example, in some embodiments, based on receiving a selection of history icon 331 in the chat window 330 of the exemplary place interface 320 shown in FIG. 3D, server 140 can provide the place log file(s) 1175 for the place to client 120(1) for presentation in the place interface. In one such embodiment, the place log file(s) 1175 can be presented in the form of a directory or index of log files, in which each log file includes a chat summary or, alternatively, a chronological transcript generated during a visit to the place.

In some embodiments, server 140 can generate summaries of activity in a place. For example, server 140 can generate summaries including data based on one or more of the following based on schemes known to those of ordinary skill in the art: total size of data files uploaded to the place during a time interval, total size of data files downloaded from the place during a time interval, meetings in the place during a time period and features thereof (e.g., elapsed meeting minutes), chats in the place during a time period of features thereof (e.g., quantities of text bits exchanged in a place by individual users), conversations in the place during at time period and features thereof (e.g., elapsed voice minutes), and visits to the place (e.g., by users and/or guests). Such summaries can be provided to administrators of system 100 (e.g., managers of users of system 100) for evaluation.

In some embodiments, server 140 records data based on interactions between users in a meeting in a meeting object, associates the meeting object with a meeting name identifier and a place identifier, and stores the meeting object in place log files 1175. In some of such embodiments, each meeting object can be associated with one or more permissions for allowing participants in the meeting to access and/or otherwise view the meeting object (e.g., during the meeting and/or after the termination of the meeting). In one such embodiment, users in a place who are not invited to a meeting but who can otherwise detect the meeting (e.g., based on one or more of the peripheral vision schemes described herein) can request access to the meeting a meeting administrator and/or a meeting invitee via server 140.

As known by those of ordinary skill in the art, several separate classes of objects can be associated with a meeting (or, more generally, a collaboration activity): an invitation, an agenda, notes, attachments and/or handouts, and minutes (e.g., audio, textual, or video). The disclosed systems and methods support the collapse of these several classes into a single class. Some of the benefits of this collapse include enhanced accessibility, mutability, navigation, and searchability of meeting content, an ability to access contextually-related objects (e.g., to interpret interrelationships among objects), and an ability to access a convenient template for cloning a meeting (e.g., to obtain a starting point for a follow-up meeting).

In some embodiments, the disclosed systems and methods implement the linking of time-based objects described in U.S. patent application Ser. No. 09/942,161, now U.S. Pat. No. 7,627,810, the contents of which application are expressly incorporated by reference herein in their entirety. In some of such embodiments, navigation and searchability of meeting objects are further enhanced by the time-based object features.

In some embodiments, the disclosed systems and methods manage meeting objects based on the agendas associated therewith. For example, in one such embodiment, a user who initiates and/or otherwise establishes a meeting can identify agenda items for the meeting and associate one or more objectives with each of the agenda items. The objectives can include business or other types of objectives that are supported by the agenda items. Subsequently, the user can identify results related to the business objectives based on searching the meeting object and/or other related objects.

In some embodiments, the disclosed systems and methods support cloning of meetings (or, more generally, places). As known by those of ordinary skill in the art, several factors can be relevant to the efficiency of a meeting. Some of these factors include whether the parameters of the meeting (e.g., participants, agenda, duration, and recurrence) are suitable for satisfying meeting objectives, whether the meeting objectives are communicated to meeting participants, and whether the meeting participants have endorsed and/or otherwise determined that the selected parameters are suitable for satisfying the meeting objectives. The disclosed systems and methods fulfill each of these factors by storing meeting objects for prior meetings and enabling the cloning of prior meetings to generate new meetings. For example, in some embodiments, a meeting organizer can clone a prior successful meeting to establish a starting point for a later meeting. In some of such embodiments, the meeting organizer can modify one or more features of the cloned meeting based on feedback from participants in the prior meeting.

In some embodiments, the disclosed systems and methods allow one or more participants in a meeting to be "invisible" to (i.e., undetectable by) other participants in the meeting. As known by those of ordinary skill in the art, one or more meeting invitees may not be expected to participate in and/or otherwise review the results of the meeting. The disclosed systems and methods allow such invitees to observe the meeting invisibly based on the peripheral vision schemes described herein, join the meeting at a suitable juncture (e.g., when a topic of interest is presented), and review the results of the meeting in the meeting object.

In some embodiments, the disclosed systems and methods support the inclusion and annotation of notes in meeting objects to memorialize data describing a meeting (e.g., the agenda items considered and the progress made and/or decisions taken on those items during the meeting). For example, in some of such embodiments, the notes in a meeting object can be formatted into one or more tables or other similar data structures with columns for names of agenda items, descriptions of the agenda items, and decisions on the agenda items. Also for example, in some of such embodiments, different notes in a meeting object can be associated with each other (e.g., a note related to a first agenda item can be cross-referenced to a note related to a second agenda item). In one such embodiment, the associations can be selected and/or otherwise determined based on drag-and-drop functionality of one or more input devices of a client (e.g., a mouse).

In some embodiments, the disclosed systems and methods can provide different views of meeting objects (e.g., the notes included in the meeting objects) during a meeting to advise meeting participants of the status and progress of a meeting. For example, in some of such embodiments, detailed views showing all meeting notes and/or summary views showing abstracted meeting notes can be provided to meeting participants via respective place interfaces. Also for example, in some of such embodiments, the views can provide indications of one or more meeting features, e.g., whether the meeting is being recorded for later reference and whether a voice conversation is in progress.

The disclosed systems and methods can implement a variety of schemes to index and search for data files and other objects associated with a place, as the term objects is understood by those of ordinary skill in the art. Features of some of these schemes are now described.

In some embodiments, one or more software application programs 108 residing on server 140 are configured for identifying one or more indexable features of objects associated with a place. Alternatively, in some embodiments, the objects themselves can define their indexable features based on functionality provided by SDKs known to those of ordinary skill in the art. Server 140 can index and store the identified indexable features in one or more indices in place data 250.

In some embodiments, server 140 can provide structured and/or unstructured search capabilities for objects associated with a place. For example, in some of such embodiments, server 140 permits users to define and/or otherwise determine categories of searchability. Also for example, in some of such embodiments, server 140 interprets queries for objects in a place context, so that queries for objects received from a user in a place are interpreted to be queries for the objects in the place.

In some embodiments, server 140 can search one or more of the supported applications in a place for content, such as chat applications, email applications, content viewing and editing applications, and/or other applications. Additionally, in some of such embodiments, server 140 can alert and/or otherwise notify a user based on identifying desired content. For example, in one such embodiment, server 140 can search for references to a user identifier in an active chat and notify the user based on the detecting one or more references.

In some embodiments, server 140 can interpret queries based on chronological and/or other time-sensitive data included therein. For example, in one such embodiment, server 140 can search for meetings in a place in which picture data files were uploaded into the place within a time interval of a mention of the word "beautiful" in a chat application in the place.

In some embodiments, server 140 can interpret search criteria included in queries to detect acceptable or unacceptable content, such as content consistent or inconsistent with one or more statutory and/or regulatory schemes. Additional features of ensuring compliance with statutory and regulatory schemes are described in U.S. patent application Ser. No. 09/590,099, now U.S. Pat. No. 6,917,962, the contents of which application are expressly incorporated by reference herein in their entirety.

In some embodiments, the disclosed systems and methods provide one or more guides or tools to facilitate searching. For example, in some of such embodiments, the disclosed systems and methods can provide a publishing tool (e.g., via the exemplary place interface 320 shown in FIG. 3D) that allows a user of a place to generate a guide or index to the content in the place. Such a guide can include one or more links and/or shortcuts to data files and other objects, which links or shortcuts can be supplemented with annotations or other comments.

The disclosed systems and methods can implement a variety of security schemes to enhance user privacy in a place and/or to inhibit and/or prevent interception of data by unauthorized entities. Features of some of these schemes are now described.

As previously described herein, in some embodiments, server 140 updates user data 210 and place data 250 based on an entry (e.g., a login event) of a new user into a place and provides the updated place data to current users in the place. For example, in some of such embodiments, server 140 can provide updated place participant identifiers 270 to the current users, so as to alert and/or otherwise notify the current users of the entry of the new user. Alternatively, in some embodiments, server 140 provides updated place participant identifiers 270 only to those current users who are identified in the friend data 245 for the new user. As such, the new user can remain "invisible" to the other current users in the place, thereby enhancing the privacy of the new user.

In most embodiments, clients and servers in the disclosed client-server infrastructure can form secure connections with each other to inhibit interception of data exchanged therebetween by third parties. Such secure connections can include VPN connections and/or other types of secure connections known to those of ordinary skill in the art.

The disclosed systems and methods can concurrently administer a variety of different places. In some embodiments, the disclosed systems and methods can generate a so-called "worldview" of currently administered places. Such a worldview can present interrelationships between places based on common users in those places and detect migrations of users from place to place. For example, in some of such embodiments, the disclosed systems and methods can detect user visits to and activity in currently administered places during one or more time intervals. As such, the disclosed systems and methods can detect relatively hot or cold places, e.g., places having relatively high levels of immigration or emigration. In some embodiments, the worldview can be presented to administrators and/or other types of users of system 100 with zooming capabilities. For example, in some of such embodiments, the worldview can be zoomed from an outer level showing places and their interconnections to an inner level showing the features of a place.

Figure 13A:
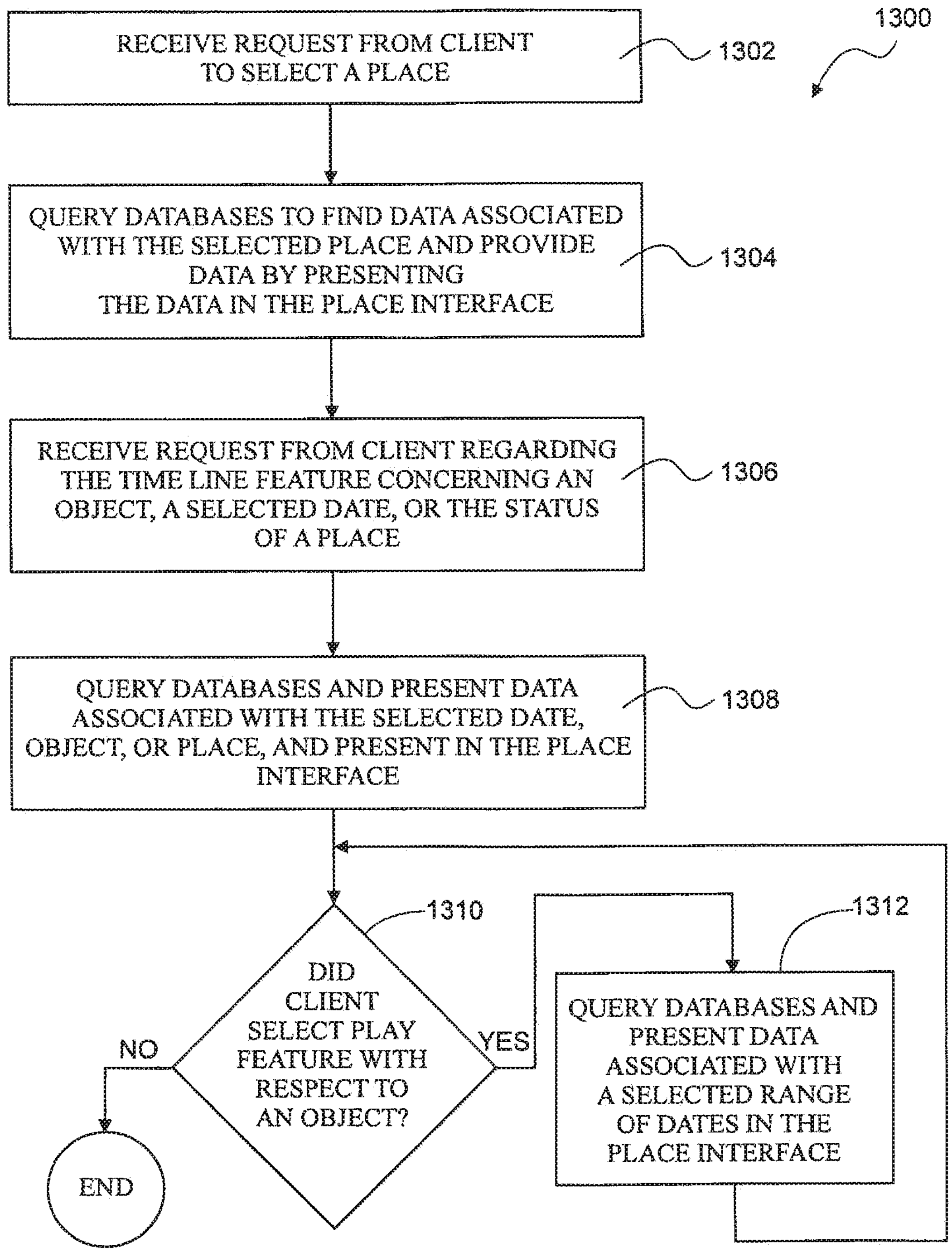
FIG. 13A schematically illustrates an embodiment of a method for a timeline view feature in accordance with one embodiment of the present invention.

FIG. 13A schematically illustrates an embodiment of a method for searching for and reviewing a selected object using a time line feature. As will be understood by those of ordinary skill in the art, the disclosed systems and methods are not limited to the embodiment shown in FIG. 13A pertaining to searching for and reviewing objects, and such searches and review can be based on features that are different and/or that are in addition to those depicted in FIG. 13A.

Referring to FIG. 13A, a request from a user 1302 interacting with a client is received by the system 100 to select a place. The system server queries databases 1304 for the data associated with the selected place, and presents the data to the user, for example, in the place interface 320 (see FIG. 3D). The system then receives a request from the client regarding the time line feature 1306 concerning an object, a selected date and/or the state of a collaboration place at a particular point in time in the past. The system queries databases and presents 1308 the data associated with the selected object, date, or state of collaboration and presents it in the place interface. The system then checks to see if the client selected a play feature 1310, and if so, queries the databases and presents 1312 all the data associated with a selected range of dates and the object in the place interface.

The time line feature can, for example, permit a user to make selections pertaining to a relative time, and the system then provides corresponding views of the state of all related objects based on stored metadata associated with each version of the object. A things window may include an archive of objects in a place or a collaboration place, which may be displayed as a folder or available in compressed format. The time line feature may be used to review an object as it appeared on a particular date, and to review the state of all related objects as of that date. A metadata-rich version of the object is provided, which permits a user to review various related attributes, such as who worked on a particular document on a selected date. The time line feature also includes a "play" option that permits a user to review how a document or other object has changed over a selected time range, including the ability to review associated metadata concerning the object that may supply further useful information. For example, in an implementation, the time line feature can be used with any of the place data files in the things window 326, such as with a particular folder or document. For example, if a document is created by the collaborative efforts of a plurality of users in a particular place at a particular time, it may subsequently be moved, deleted, renamed or misplaced by one or many users. One of the collaborators who wishes to locate the document after such changes have been made will have difficulty finding the document using traditional search methods, such as by querying the document by name, content or other metadata, because such methods will not work if that document has been drastically altered or deleted. Moreover, the user wishing to locate a specific document may not recall such information, only recalling that it was created in a certain place on or about a certain date. Thus, the time line feature can be utilized to search for the document, and to observe how the document was changed over time.

Figure 13B:
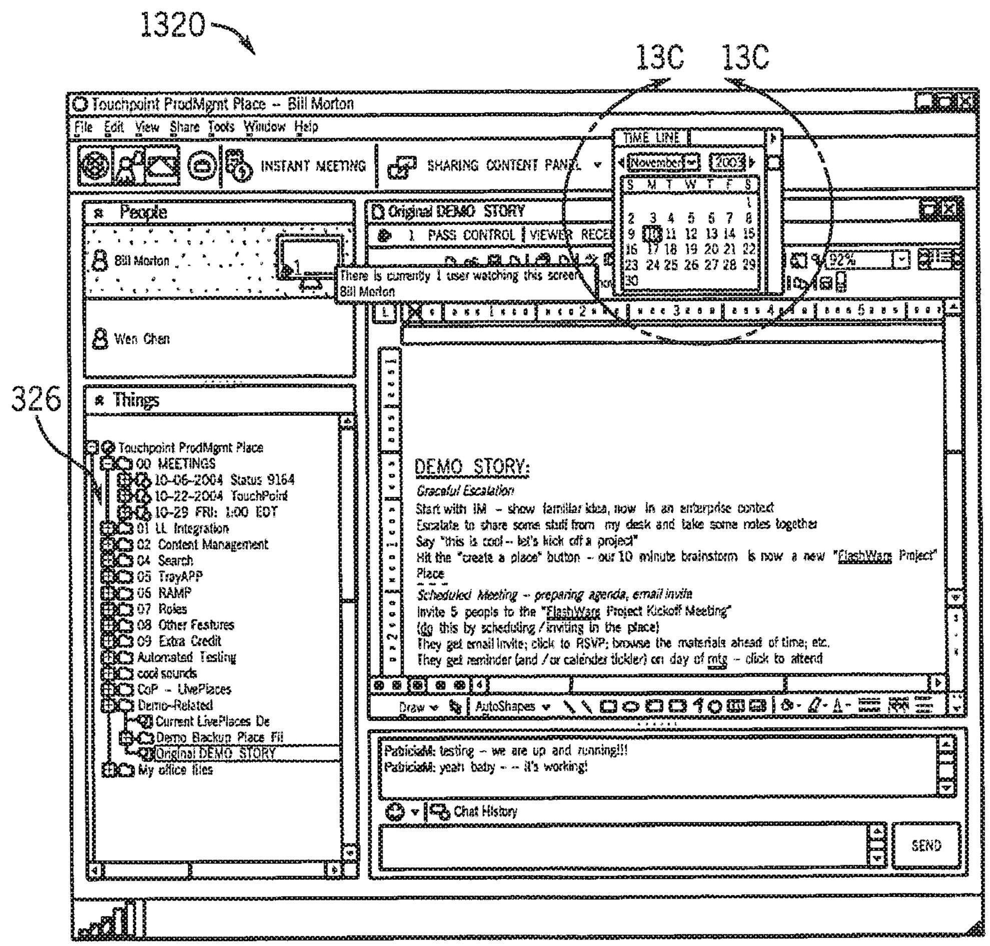
FIGS. 13B and 13C schematically illustrate an embodiment of an interface providing a timeline feature in accordance with one embodiment of the present invention.
Figure 13C:
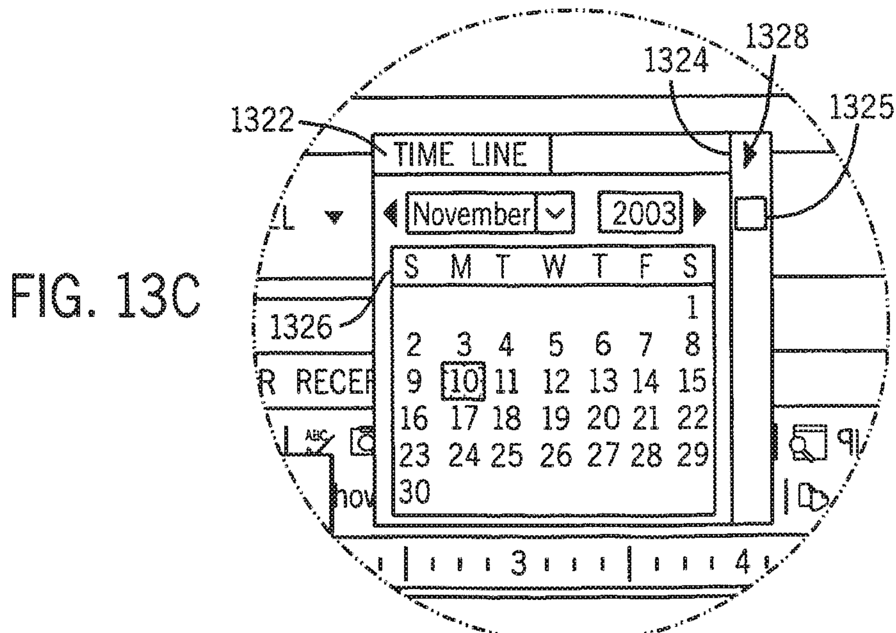

FIGS. 13B and 13C depict a screen shot of a place interface 1320 similar to that shown in FIG. 3D, but it includes the time line feature that may be utilized by a user to find a document, for example. As will be understood by those of ordinary skill in the art, the methods and systems are not limited to the embodiment shown in FIGS. 13B and 13C, and the time line feature can be offered to a user in a different manner than that depicted in FIGS. 13B and 13C. In this example, the user remembers that a document was created with respect to a particular place, and thus selects that place so that it appears with all of the associated data. The user then clicks on the time line icon 1322 to obtain a time line slider 1324 as shown. In this embodiment, the time slider 1324 includes a related pop-up calendar 1326 to help the user pinpoint a date and time. The user can utilize the time line slider and calendar to select a date and time that the user recalls viewing or working on the document of interest. In particular, the cursor can be moved over the time slider and the right mouse button held down to move or drag the time line button 1325 up and down along a track that represents time, which may include the beginning date when the place or object was created up to the present date. As the time line slider button 1325 is moved along the path, the data presented in the place interface window and the calendar view 1326 changes to present a view of the documents, other objects available on that date and time, a set of objects in the collaboration place or entire contents of a collaboration place. When the mouse button is released, the time line slider button 1325 is located somewhere along the track, and the data that was present at that time and in that place is shown. In this particular example, the user selected Nov. 10, 2003 as the date of interest. The user can then identify and chose a particular document, other object, sets of objects, or the collaboration to review, for example. The timeline feature can, thus, provide context to state of an objects in place and its evolution in that place.

The user may also utilize the play feature by clicking on a play icon 1328 associated with the time line slider 1324. The play feature automatically moves the time slider button 1325 along the track from the selected date to the present, which causes the place interface to display changing views of the selected document and related objects during that time period. The user can also use the calendar feature 1322 to rewind to a particular date to find a particular view of an object. For example, the calendar could be used to review the data and/or objects available in a specific place that was present last week, and then fast forward to the present time to see how the data and/or objects were manipulated, who changed any or all of the data, and where such data went in the system.

A time line feature may include other aspects. The feature can include displays that permit a previous time with the specificity of hours, minutes, or seconds. Thus, the user can specify for the software the exact date and time and the software in response, display a selected object, set of objects, or a place as it existed at the selected time. For example, a user can specify a time and date for one or more (e.g. a set of) artifacts that resulted from collaboration in a content window and in result the system will display the artifact(s) (including the information contained in them) as of that date. Thus, the user can actually see the contents of object as it stood at that time to consider, for example, its evolution. In one aspect, the focus can be directed to the contents of folder or a window and how its content evolved. Time stamps and indexing can be used in implementing such features.

Thus, the time line feature can provide information such as who viewed a particular document, and/or who edited that document, and at what time or times a particular person viewed and/or changed the document. Such information is often needed to answer questions concerning compliance and regulatory matters. The time line feature provides a quick and easy means to find the answers to such questions.

Figure 14A:
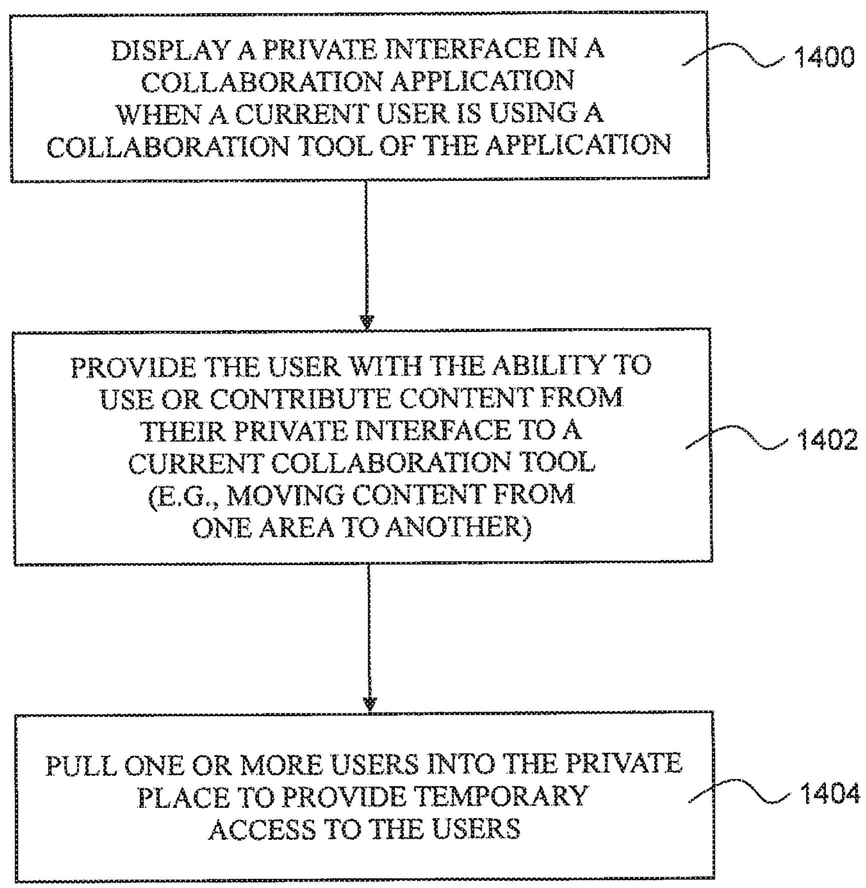
FIG. 14A schematically illustrates an embodiment of a method for a personal place feature in accordance with one embodiment of the present invention.

A feature that can be provided for a collaboration place or other collaboration application is a private interface that is available to a user when interacting in a virtual collaboration environment accessible by other users. For example, with reference to FIG. 14A, illustrative steps are provided for providing a private interface or "personal place." At step 1400, a private interface is displayed in a collaboration application when a user is interacting with a collaboration tool of the application. A private interface may be displayed with content that is available to the user but is not viewable by others who may also be interacting with the collaboration tool (e.g., not available to other users in a collaboration place). At step 1402, the user is provided with the ability (e.g., option buttons, movable files, active content, etc. in the private interface) to use or contribute content from the user's private interface to the activity in the current collaboration tool. Such a contribution is preferably provided without opening access to other content in the user's private interface. At step 1404, a user may, if desired, provide temporary access to the private interface or content in the interface to another user (e.g., access that only exists while the collaboration session with the other user is still open).

Figure 14B:
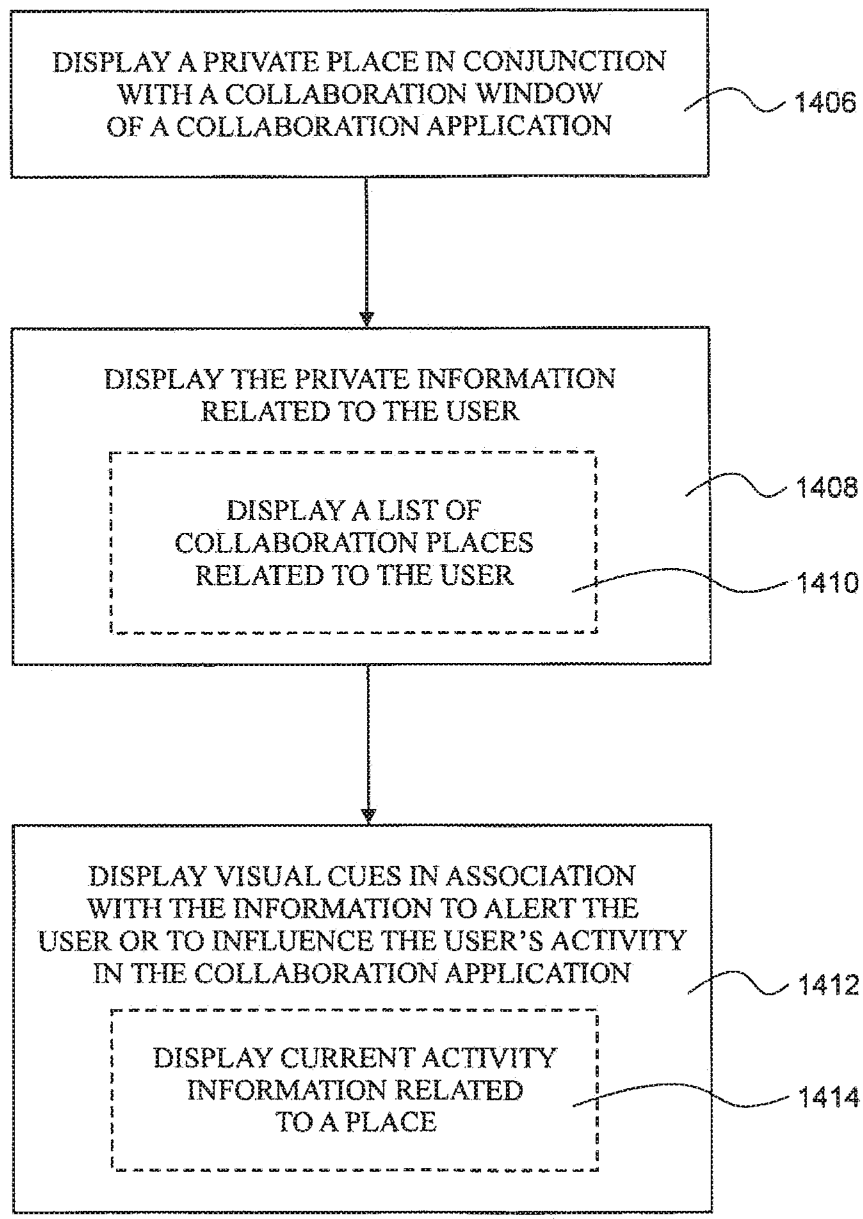
FIG. 14B schematically illustrates an embodiment of a method for a personal place feature providing visual cues to a user in accordance with one embodiment of the present invention.

In another aspect, a user can be privately provided with information necessary for the user's consideration in influencing the user's activity within the collaboration application. For example, with reference to FIG. 14B, at step 1406, a private place, which is based on a collaboration place, is displayed in conjunction with a collaboration window of a collaboration application. At step 1408, private information related to the user is displayed in the private place (e.g., displays personally selected documents, applications, files, objects, etc.). Step 1408 may include steps 1410 for displaying a list of collaboration places related to the user. At step 1412, visual cues in association with the information in the private place is displayed to privately alert the user or to influence the user's activity in the collaboration application. Step 1412 may include step 1414 for displaying information in the private place on current activity related to places of interest to the user.

Figure 14C:
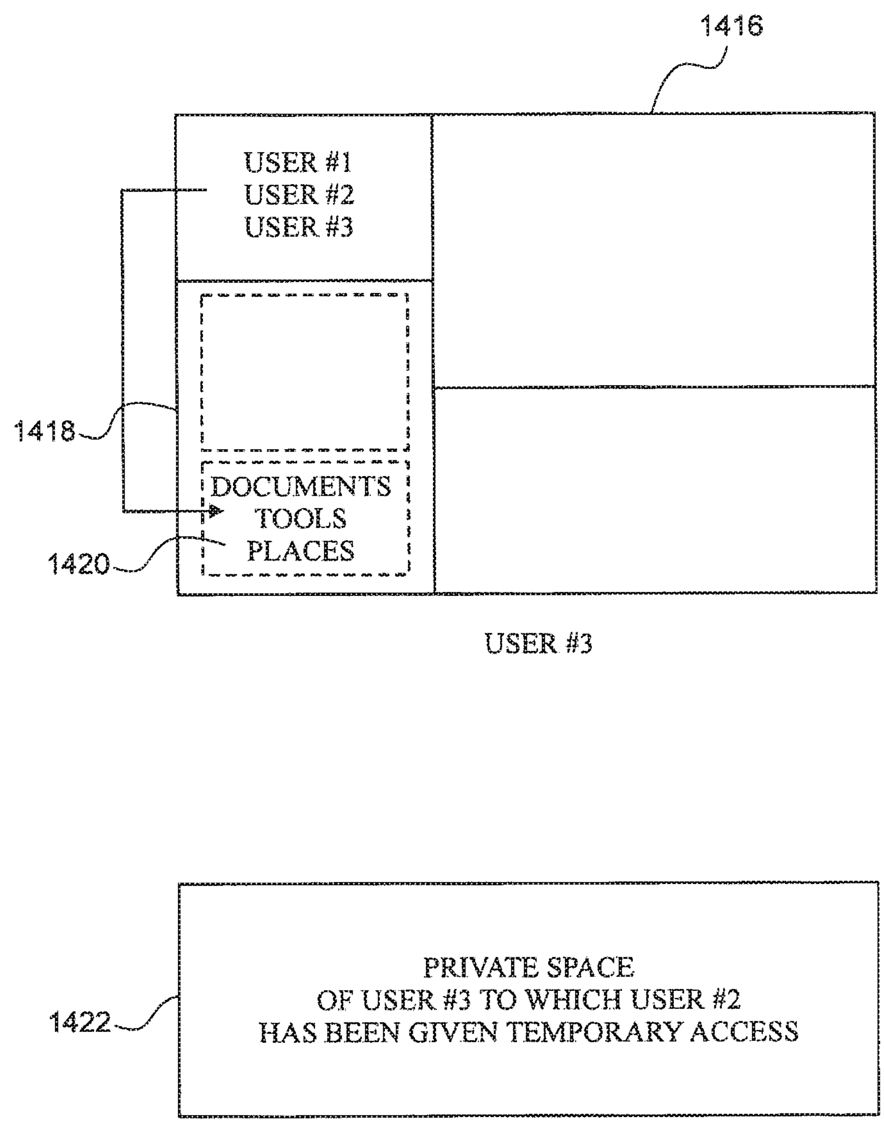
FIGS. 14C and 14D schematically illustrates interfaces for a personal place feature in accordance with one embodiment of the present invention.

For example, with reference now to FIG. 14C, collaboration application window 1416, which is based on the collaboration place interface illustratively shown in FIGS. 3A-3G, include things window 1418 for storing files or folders that are part of the current collaboration place. Things window 1418 is shown to include private place 1420. Each user in the collaboration application can have his or her own such interface that follows the user in every collaboration activity within the collaboration application. Private place 1420 can for example include the user's documents, software tools, places, or other objects selected by the user. If desired, the current user #3 can initiate interaction with user #2 by moving the icon for user #2 over an item in private place 1420. In response, interface 1422 can be displayed (e.g., without exiting interface 1416). Interface 1422 implements temporary authorization for user #2 to provide access to an item for the private place of user #3. In interface 1422, user #2 and user #3 can view and, for example, collaborate with respect to the item in private place 1420, which user #3 selected by dragging and dropping user #2 on that item. Once the session is over, user #2 preferably will no longer have not access to any content of the private place of user #3.

Figure 14D:
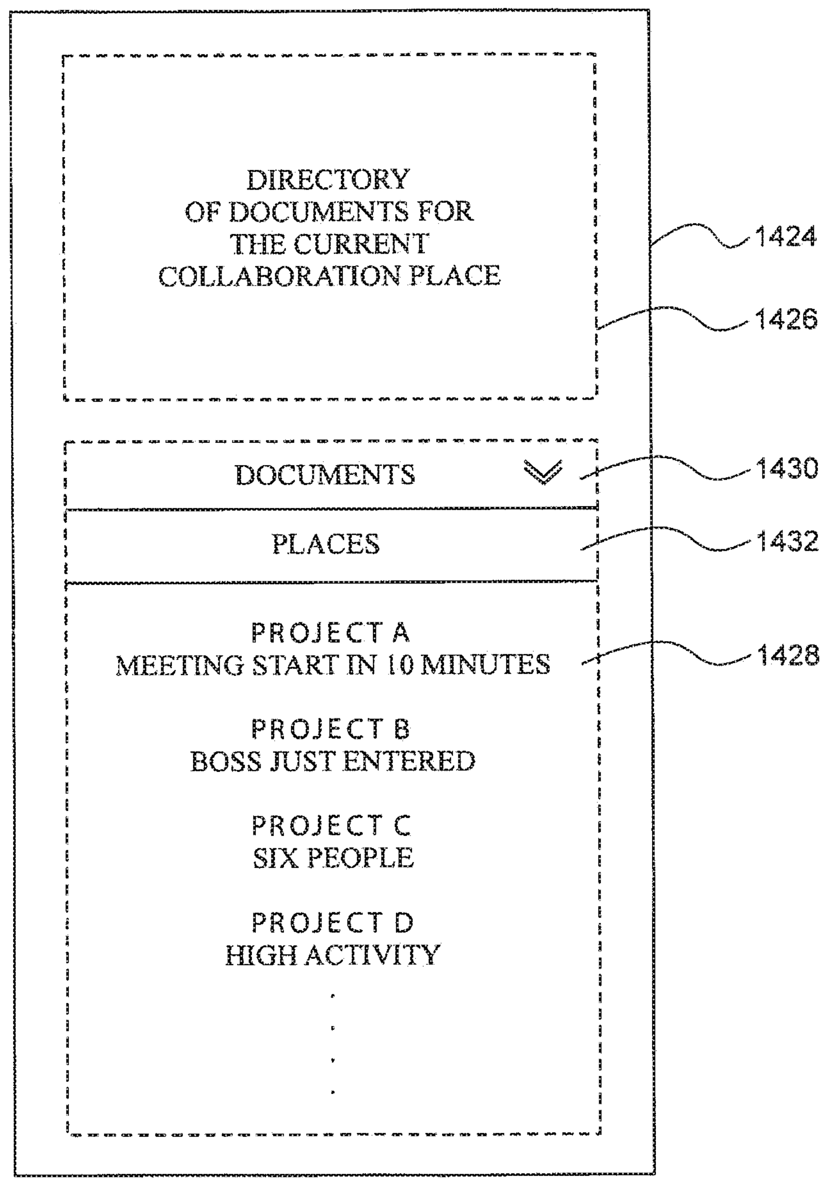

A number of different visual cues can be provided to a user in a private place. For example, with reference to FIG. 14D, things window 1424 can include private place 1428. Private place 1428 includes documents bar 1430 which can be expanded to display a directory of the current user's personal documents and files. Private place 1428 also includes places bar 1432 and includes list of places displayed under bar 1432. The list of places is identified to be displayed in private place 1428 based, for example, on the user's frequency of visits to a place, the user's membership in a place, key places that are pertinent to that user's role in the organization, or based on other relational characteristics that are automatically or manually selected. The list may also be displayed based on priority of information that is displayed in association with the place. Information is displayed in association with the places to alert or influence the user's actions. For example, as shown, with respect to Project A place, the system is informing the user that a meeting is about to start in that place in ten minutes. With respect to Project B place, the system is displaying information alerting the user that his supervisor has just entered that place. With respect to Project C place, the system is informing the user that there are currently six people in that place. With respect to Project D place, the system can simply provide information indicating that the level of activity in that place is currently high. The level may be determined based on various factors such as number of people in the place, the rate of activity in the place, an increase in downloaded documents in that last hour, or other factors.

The disclosed systems and methods can provide user-based presence awareness and place-based presence awareness. User-based presence awareness refers to the ability of a user in a place to detect the activity of other users in the place. For example, as previously described herein, a first user in a place can detect the activity of a second user in the place based on an activity indicator and/or a miniature screen shot for the second user. Place-based presence awareness refers to the ability of a user in a place to detect the activity of users in other places.

User-based presence awareness and place-based presence awareness are implemented based on one or more peripheral vision schemes. Some features of place-based presence awareness and the corresponding accompanying peripheral vision schemes will now be described.

Generally, the disclosed systems and methods allow a user to construct a so-called "virtual geography" of one or more places and monitor, track, and/or otherwise detect the activity occurring in those places. Usually, the places in the virtual geography include places of which the user is a member. In some embodiments, however, the places in the virtual geography include places in which the user is not a member.

Figure 15:
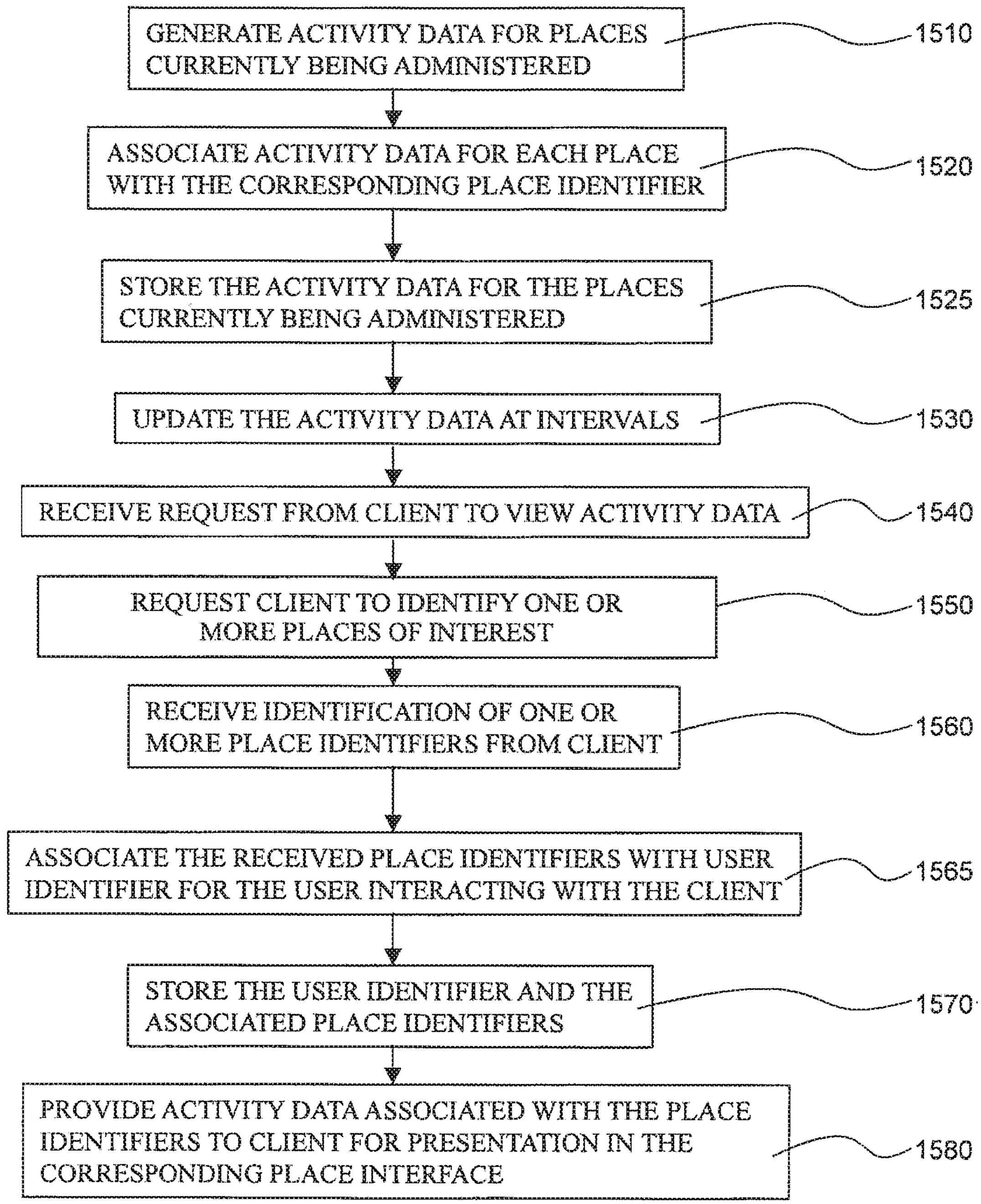
FIG. 15 schematically illustrates an embodiment for peripheral vision feature in accordance with one embodiment of the present invention.

FIG. 15 schematically illustrates an embodiment of a method for providing place-based presence awareness. The method is described with respect to the administration of places by server 140 in system 100. As will be understood by those of ordinary skill in the art, the disclosed systems and methods are not limited to the embodiment shown in FIG. 15 can provide place-based presence awareness based on features that are different than and/or additional to the features shown in FIG. 15.

As shown in FIG. 15, server 140 generates activity data for each place that it currently administers (e.g., for each place with one or more users logged or otherwise entered into the place) (1510 in FIG. 15). The activity data for a place can include one or more of the following: data based on the users currently entered and/or otherwise logged into a place (e.g., the number of users in the place and/or their user identifiers), data based on the activity of each of the users in the place (e.g., activity indicators or thumbnails for each user in the place), and data based on multi-user activities in the place (e.g., data identifying the type of each multi-user activity in the place (such as instant meeting, polling, chatting, emailing, sharing of content, and voice conversation) and the numbers and/or identifiers of the users participating in each such multi-user activity. Server 140 associates the activity data for each place with the corresponding place identifier 225 (1520 in FIG. 15) and stores the activity data in place data 250 (1525 in FIG. 15) and updates the activity data at one or more intervals (e.g., periodic intervals) (1530 in FIG. N).

A request from a user 102 interacting with client 120 and desiring to view the activity data for one or more of the currently administered places (e.g., one or more places in which the client is participating and/or otherwise present and/or one or more places in which the client is not participating and/or not otherwise present) is received at server 140 (1540 in FIG. 15). In some embodiments, the request can be generated based on a selection from a pull-down menu 332 in the exemplary place interface 320 shown in FIG. 3D. Based on receiving the request, server 140 prompts, queries, and/or otherwise requests client 120 to identify the one or more places of interest (1550 in FIG. 15).

In some embodiments, system 100 allows a user to view the activity data only for places in which the user is a member. In some of such embodiments, therefore, server 140 queries databases 150 to find place identifiers 255 associated with the user identifier 215 for user 102 and prompts, queries, and/or otherwise requests client 120 to select among those place identifiers.

Alternatively, in some embodiments, system 100 allows a user to view the activity data for places in which the user is a member and for places in which the user is a non-member but nonetheless has permission to view the activity data. Such a permission can be granted by an administrator of system 100, an originator of a place, and/or a user of a place. In some of such embodiments, therefore, server 140 queries databases 150 to find (i) place identifiers 255 associated with the user identifier for user 102 and (ii) place identifiers 255 associated with viewing permissions for user 102 and then prompts, queries, and/or otherwise requests client 120 to select among those place identifiers.

Subsequently, server 140 receives a selection and/or an identification of one or more place identifiers 225 from client 120(1) (1560 in FIG. 15). In most embodiments, server 140 associates those place identifiers 255 with the user identifier 215 (1565 in FIG. 15) and stores the user identifier 215 and the thusly associated place identifiers 255 in user data 210 for subsequent retrieval (1570 in FIG. 15). For example, server 140 can store such information as a default set of places for which to provide activity data to user 102. Of course, in some embodiments, user 102 can select and/or otherwise identify a different set of default places. For example, in some of such embodiments, user 102 can select the default places to include the previous n places visited by the user (e.g., the previous five (5) places).

Server 140 provides the activity data associated with the selected place identifiers to client 120 for presentation (1580 in FIG. 15). In some embodiments, server 140 provides the activity data to client 120 for presentation in the corresponding place interface, e.g., in a window in the place interface reserved for presenting activity data for places. For example, in one such embodiment, server 140 provides the activity data to client 120 for presentation in a window similar to the people window 324 in the exemplary place interface 320 of FIG. 3D. Such a window can list and/or otherwise identify the place identifiers and present indicia of the corresponding activity data. Also for example, in one such embodiment, server 140 provides the activity data to client 120 for presentation in the personal place of the user.

Figure 16:
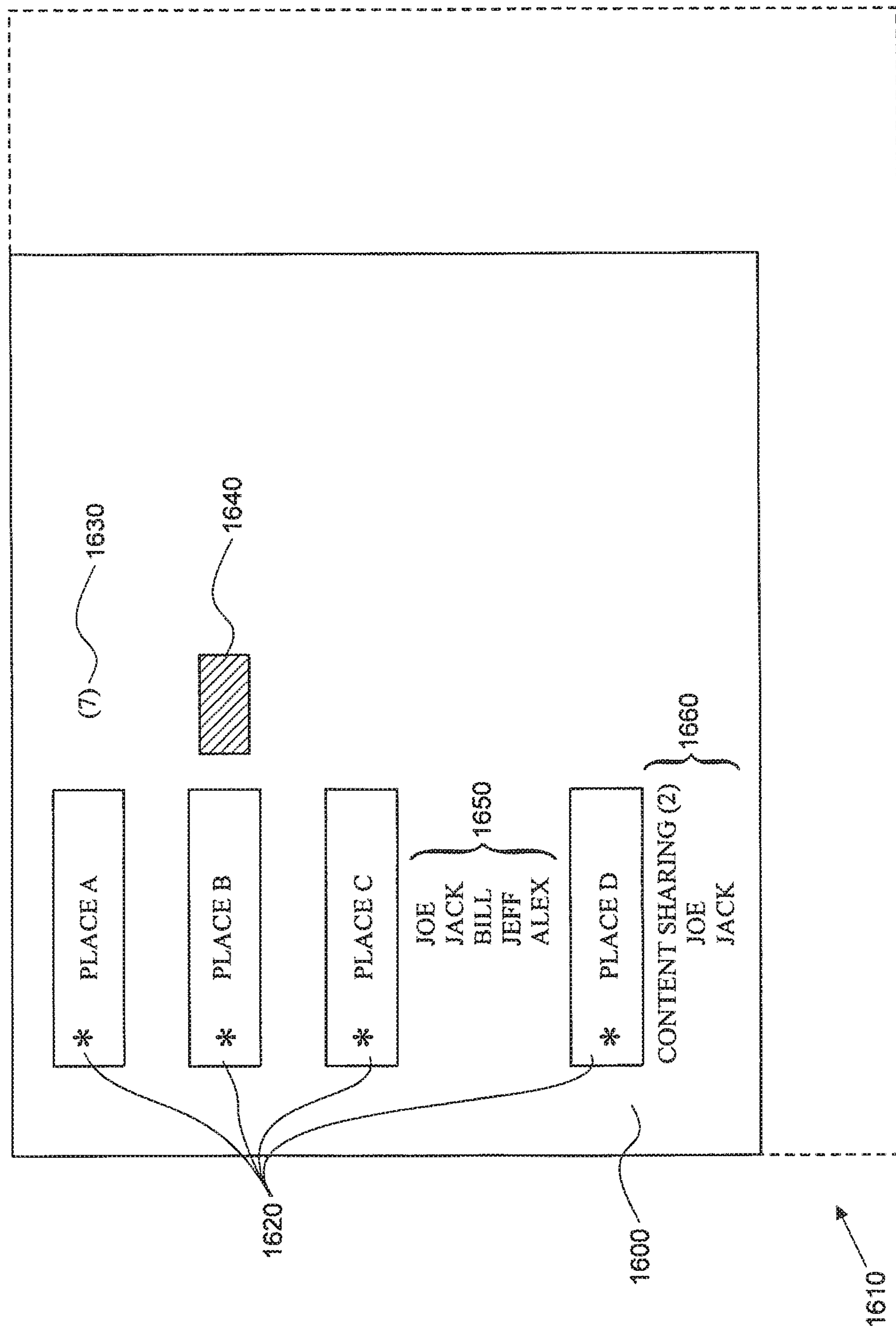
FIG. 16 schematically illustrates an interface for providing peripheral visions in accordance with one embodiment of the present invention.

FIG. 16 shows an exemplary places activity window for presenting activity data associated with one or more places. As shown in FIG. 16, the window 1600 can form part of a place interface 1610 (denoted by dashed lines in FIG. 16) and can present an icon 1620 for each place of interest to a user. In some embodiments, activation of the icon 1620 for a place (e.g., by moving a cursor over the icon 1620) can cause activity data for the corresponding place to be displayed. As will be understood by those of ordinary skill in the art, the activity data for a place can be presented in a variety of different formats. Some of these formats are shown in FIG. 16 and include one or more of a numerical indicator 1630 representative of the number of users in a place, a colored or otherwise shaded indicator 1640 representative of a type of collaboration activity in a place, a listing and/or other identification of the users in the place 1650, and/or a listing or other identification of the users in the place participating in a collaboration activity 1660.

In some embodiments, the activity data provided by server 140 can be presented in the form of the previously described worldview that presents interrelationships among places as well as activity data associated with those places. As such, the activity data can be provided for a desired number of places in the worldview. For example, the activity data can be provided for a single place, a neighborhood of two or more places, and a world of all currently administered places. Also for example, the activity data can be provided for all places of which the client is currently a member, a first subset of the places of which the client is a member, and a second subset of the places of which the client is a member, in which the first subset is larger than the second subset. In one such example, more types of activity data can be provided in the all places view than in the first subset view and, separately, the second subset view, and more types of activity data can be provided in the first subset view than in the second subset view.

In some embodiments, the disclosed systems and methods can advise, alert, and/or otherwise notify the users of a place that the activity data for the place is being detected by a user of system 100. Such an inverse view allows the users in the place to "reverse-detect" the presence of the observing user. For example, in some of such embodiments, the disclosed systems and methods can provide to the users in a collaboration place data based on the quantity of requests received from other users for the activity data of the place. In some embodiments, the disclosed systems and methods allow the users in the place to invite the observing user into the place and/or otherwise signal to the observing user the status of the activity in the place.

Another feature enhancement for collaboration is to locally store or shadow server data such as content available through the things window or private place interface. This feature will for example permit a folder to exist on a user's computer that shadows content in a collaboration place.

In another enhancement, a user may be provided with offline access to data associated with a collaboration place. For example, a copy of a file from the things window of a collaboration place may be stored in a user's computer for access and manipulation after the user has exited the collaboration place. In another example, a copy of the things window can be stored locally for access by the collaboration place interface by a user when the interface is not connected to the server. This, for example, implements the interface with related features when a user is not network connected, is not in the respective place, or has chosen to work in a solitary fashion.

If desired, a collaboration place may include links to other applications, systems, sites, or places. A single sign-on may be implemented for the content of the collaboration place. Thus, once a user has entered a particular place of which he is a member (e.g., by passing through security), his access can be extended to the systems, applications, sites, or places that are linked to that place (e.g., linked because they are related in substance to the activities of the current place). As such a user who has logged into a place is automatically logged into the linked sites, systems, applications, or places. One way to accomplish this is to store login information for the user (e.g., user-id, password) and automatically apply that information when the user selects the link for a desired application, site, system, or places available through the place.

As mentioned above, in some embodiments, systems and methods are implemented that inform a user of a collaboration application of events of interest to the user. A user may be informed by way of alert within the collaboration place or through an indicator that appears on the user's desktop (e.g., a floating overlay over the active desktop application that rises and drops out of view). The alerts may be triggered by system-configured threshold activity or events that are expected to be of interest to users. In another aspect, each user can be provided with options for configuring the alerts or information that will be communicated to that user in response to an activity of interest. For example, the user can select an option to be informed if a place that he is a member of currently contains six people and one of those people has a particular title or role within the user's organization. Another example is for the user to setup the collaboration application to inform the user when five people have a meeting that lasts for more than 60 minutes and involves 5 or more files in the agenda.

A thing type object is an additional type of object that has certain attributes. A thing type object can provide a work object that supports collaboration in many different respects. It has attributes that permits users to open the object and collaborate synchronously "live" and asynchronously (e.g., after the live session has ended). It provides a tool by which live collaboration can be saved and continued through asynchronous collaboration. It can also provide the ability to send the object to another user via e-mail and continue the collaboration on another server.

In some embodiments, the disclosed systems and methods can support one or more thing types that facilitate collaboration. The thing type can be an object that allows for both synchronous and asynchronous interactions, combining features of publishing, asynchronous discussions, IM, and note taking. The thing type can support chat, blogs, wikis, discussion groups, and other collaborative activities, as the foregoing terms are understood by those of ordinary skill in the art. It can, for example, incorporate support primary features of blogs, wiki's, and instant messaging.

In some embodiments, a thing type can be generated based on one or more of the following features: defining the data that the thing type would manipulate (e.g., for a blog, user identification, blog entry, title, date-time stamp, etc.), defining the granularity and nature of events for distribution to clients (e.g., for blogs, defining what types of changes will cause change notifications), implementing a new thing type on the client(s) in system 100 to display the updated data, and modify the clients (e.g., the collaboration place interfaces) to update the display when change notifications arrive.

A thing type object can be provided in a collaboration place. For example, an interface can be displayed in which a user can select to open or create a thing type object. In response, the content window or some other window may display the object, which may include pre-set areas for user entry such as a title, or other parameters. Moreover, it includes areas for content insertion of a greater size such agenda, notes, outline, document writing, figures, drawings, task items, etc. Once for example displayed in a content window, users can collaborate in a live session to generate details as the work on the subject (e.g., enter agenda, notes on a subject, bullets for a presentation) progresses. The resultant of the live session can be saved and the its existence can be reflected with an icon or some file type indicator in for example the things window. The icon on indicator may reflect that it is a special object type. The saved object can later be opened by others or the original participant to add comments, revisions, additions, deletions, etc. to the information in the object. Thus, for example, a continuous working file that is for example unattached to a particular type of collaborative activity can exist (e.g., not tied to a meeting). Users can add notes or remarks to a particular information in the object or can pick up the object for further "live" discussions. The collaboration application can have a publication functionality that once for example the participant are happy the results of their collaboration in a thing type object can publish their work (e.g., generate a MS Word document, an HTML document, an XML document, etc.). Information from multiple types of collaborative activity in a collaboration place (e.g., chat and generating an agenda) can be saved as part of the object. For example, chat communications or content information displayed in conjunction with a thing type object may be saved as part of the object.

Another illustrative and non-limiting example follows. Users A and B meet in a collaboration place and use the thing type to take notes as they collaborate on a working outline for a technology strategy proposal. Users A and B leave the notes in the collaboration place for comment and review by other users. At various intervals, other users can review and comment on the notes (e.g., by inserting comments directly into the notes). Subsequently, users A and B (and/or other users) meet in the collaboration place to review and concurrently edit the notes and comments to generate a finished outline for the proposal. The finished outline is then posted in the collaboration place as a charter.

In some embodiments, the disclosed systems and methods can implement one or more schemes to manage and/or optimize display screen real estate. For example, in some embodiments implementing graceful escalation features, the disclosed systems and methods can rebalance and/or redistribute the presentation data for display in an escalated collaboration place interface based on forming and/or otherwise opening one or more windows or panels within the place interface, as opposed to opening additional windows external to the place interface and/or additional instances of the place interface itself. Also for example, in some of such embodiments, the display screen real estate in a collaboration place interface can be managed to provide one or more of the following features: simultaneous display of four panels (e.g., panel for display of content (e.g., content window), panel for display of chat (e.g., chat window), panel for display of data files in the repository or database (e.g., things window), and panel for providing activity data about people in the place (e.g., people window)); each of the four panels can be opened or closed by a user; the size of each panel can be modified by the user (e.g., based on adjusting a horizontal and/or a vertical dimension of the panel); preferably, the people and things windows will be disposed in a vertically aligned relationship; and, preferably, the content and chat panels will be placed in a vertically aligned relationship. In at least some of such embodiments, the default sizing of one or more of the four panels (or, more generally, any panel or display in a collaboration place interface) can be based on the types and/or quantities of data to be displayed in the panels. For example, panels displaying greater numbers of types of data than other panels can be allotted greater default amounts of screen space to enhance readability. Also for example, panels displaying greater quantities of data of the same type as other panels can be allotted greater default amounts of screen space to enhance readability.

Thus, improved systems and methods for collaboration can be provided. Some of the advantages of the systems and methods of the present invention can include, among others, providing collaboration software enhancements on an on-demand or as needed basis on a real-time basis to users during collaboration, providing the necessary software tools consistent with the type, state, or level of current real-time collaboration, and augmenting an enterprise space of individual users to provide collaboration techniques that parallel in-person collaboration.

In accordance with the principles of the present invention, an object of the technology is to allow collaboration software enhancements on an on-demand or on as needed basis. Another object is to provide the necessary software tools consistent with the type, state, or level of current collaboration. Other objects of the technology are to augment an enterprise space of individual users to provide collaboration techniques that parallel in-person collaboration. Other objects are evident from the figures and specification for systems and methods illustratively provided herein.

The systems and methods described herein are not limited to a hardware or software configuration; they can find applicability in many computing or processing environments. The systems and methods can be implemented in hardware or software, or in a combination of hardware and software. The systems and methods can be implemented in one or more computer programs, in which a computer program can be understood to include one or more processor-executable instructions. The computer programs can execute on one or more programmable processors, and can be stored on one or more storage media readable by the processor, comprising volatile and non-volatile memory and/or storage elements.

The computer programs can be implemented in high level procedural or object oriented programming language to communicate with a computer system. The computer programs can also be implemented in assembly or machine language. The language can be compiled or interpreted.

The computer programs can be stored on a storage medium or a device (e.g., compact disk (CD), digital video disk (DVD), magnetic tape or disk, internal hard drive, external hard drive, random access memory (RAM), redundant array of independent disks (RAID), or removable memory device) that is readable by a general or special purpose programmable computer for configuring and operating the computer when the storage medium or device is read by the computer to perform the methods described herein.

Unless otherwise provided, references herein to memory can include one or more processor-readable and -accessible memory elements and/or components that can be internal to a processor-controlled device, external to a processor-controlled device, and/or can be accessed via a wired or wireless network using one or more communications protocols, and, unless otherwise provided, can be arranged to include one or more external and/or one or more internal memory devices, where such memory can be contiguous and/or partitioned based on the application.

Unless otherwise provided, references herein to a/the processor and a/the microprocessor can be understood to include one or more processors that can communicate in stand-alone and/or distributed environment(s) and can be configured to communicate via wired and/or wireless communications with one or more other processors, where such one or more processor can be configured to operate on one or more processor-controlled devices that can include similar or different devices. Use of such processor and microprocessor terminology can be understood to include a central processing unit, an arithmetic logic unit, an application-specific integrated circuit, and/or a task engine, with such examples provided for illustration and not limitation.

Unless otherwise provided, use of the articles "a" or "an" herein to modify a noun can be understood to include one or more than one of the modified noun.

While the systems and methods described herein have been shown and described with reference to the illustrated embodiments, those of ordinary skill in the art will recognize or be able to ascertain many equivalents to the embodiments described herein by using no more than routine experimentation. Such equivalents are encompassed by the scope of the present disclosure and the appended claims.

For example, the disclosed systems and methods are not limited to implementation in a client-server infrastructure, but can be implemented in one or more infrastructures known to those of ordinary skill in the art, such as, but not limited to, peer-to-peer infrastructures.

Also for example, the disclosed time line features are not limited to application in a collaboration place, but can be applied to one or more systems and/or software applications known to those of ordinary skill in the art, such as, but not limited to, document management systems.

It should be understood that the above description of the invention and specific examples, while indicating preferred embodiments of the present invention, are given by way of illustration and not limitation. Many changes and modifications within the scope of the present invention may be made without departing from the spirit thereof, and the present invention includes all such changes and modifications.

What is claimed is:

1. A computer implemented collaboration system, comprising:
- a data repository;
- a server coupled to the data repository, the server capable of supporting a plurality of collaboration places, the server configured to:
  - maintain a database configured to store data for supporting the plurality of collaboration places, the data for supporting the plurality of collaboration places comprising user identifiers, place identifiers for the collaboration places, place participant identifiers identifying participants in the collaboration places;
  - establish a persistently addressable first collaboration place responsive to a client instruction to establish the first collaboration place and store a set of data supporting the first collaboration place, the set of data supporting the first collaboration place comprising a place identifier for the first collaboration place, user identifiers of authorized participants of the first collaboration place and one or more objects that are modifiable by clients, each of the one or more objects having content;
  - generate searchable attributes of the one or more objects, wherein generating the searchable attributes of the one or more objects comprises accessing the contents of the one or more objects and generating at least a portion of the searchable attributes based on the content of the one or more objects;
  - enable a first client data connection with a first client and, responsive to a request associated with a first authorized user of the first collaboration place for a first object of the one or more objects, provide the first object to the first client for presentation in a user interface of the first client;
  - modify the first object based on an instruction to modify the first object received via the first client data connection;
  - modify the searchable attributes of the one or more objects based on a modification of the first object;
  - enable a second client data connection with a second client to provide the second client access to the one or more objects and the searchable attributes; and
  - responsive to a request associated with a second authorized user of the first collaboration place for the first object of the one or more objects, provide the first object to the second client for presentation in a user interface of the second client.

2. The computer implemented collaboration system of claim 1, wherein the server is configured to provide simultaneous access to the first object to the first client and the second client.

3. The computer implemented collaboration system of claim 2, wherein the server is configured to:
- receive the instruction to modify the first object while the first object is simultaneously presented at the first client and the second client; and
- based on the instruction to modify the first object, send an update to the second client to update a presentation of the first object in the user interface of the second client.

4. The computer implemented collaboration system of claim 2, wherein the server is configured to:
- receive from the first client an indication of an editing location in the content of the first object; and
- modify a display of the first object to denote the editing location of the first client in the user interface of the second client.

5. The computer implemented collaboration system of claim 1, wherein enabling the first client data connection comprises:
- providing access to the one or more objects and the searchable attributes to the first authorized user via a page within a browser.

6. The computer implemented collaboration system of claim 5, wherein providing access to the one or more objects and the searchable attributes to the first authorized user via the page in the browser comprises:
- providing the first collaboration place within the page; and
- providing a collaborative interface to control and manage the page.

7. The computer implemented collaboration system of claim 1, wherein the first object comprises a document associated with a collaborative activity of the first collaboration place and modifying the first object includes modifying the document.

8. The computer implemented collaboration system of claim 7, wherein the document includes document content, generating the searchable attributes of the one or more objects comprises accessing the document content and generating the at least the portion of the searchable attributes based on the document content.

9. A computer program product comprising a non-transitory computer readable medium storing instructions executable by a processor for:
- maintaining, in a data repository, a database configured to store data for supporting a plurality of collaboration places, the data for supporting the plurality of collaboration places comprising user identifiers, place identifiers for the collaboration places, place participant identifiers identifying participants in the collaboration places;
- establishing a persistently addressable first collaboration place responsive to a client instruction to establish the first collaboration place and storing a set of data supporting the first collaboration place, the set of data supporting the first collaboration place comprising a place identifier for the first collaboration place, user identifiers of authorized participants of the first collaboration place and one or more objects that are modifiable by clients, each the one or more objects comprising content;
- generating searchable attributes of the one or more objects, wherein generating the searchable attributes of the one or more objects comprises accessing the content of the one or more objects and generating at least a portion of the searchable attributes based on the content of the one or more objects;
- enabling a first client data connection with a first client and, responsive to a request associated with a first authorized user of the first collaboration place for a first object of the one or more objects, providing the first object to the first client for presentation in a user interface of the first client;

modifying the first object based on an instruction to modify the first object received via the first client data connection;

modifying the searchable attributes of the one or more objects based on a modification of the first object;

enabling a second client data connection with a second client to provide the second client access to the one or more objects and the searchable attributes; and responsive to a request associated with a second authorized user of the first collaboration place for the first object of the one or more objects, providing the first object to the second client for presentation in a user interface of the second client.

10. The computer program product of claim 9, further comprising instructions for providing simultaneous access to the first object to the first client and the second client.

11. The computer program product of claim 10, further comprising instructions for:

receiving the instruction to modify the first object while the first object is simultaneously presented at the first client and the second client; and based on the instruction to modify the first object, sending an update to the second client to update a presentation of the first object in the user interface of the second client.

12. The computer program product of claim 10, further comprising instructions for:

receiving from the first client an indication of an editing location in the content of the first object; and modifying a display of the first object to denote the editing location of the first client in the user interface of the second client.

13. The computer program product of claim 9, wherein enabling the first client data connection comprises:

providing access to the one or more objects and the searchable attributes to the first authorized user via a page within a browser.

14. The computer program product of claim 13, wherein providing access to the one or more objects and the searchable attributes to the first authorized user via the page in the browser comprises:

providing the first collaboration place within the page; and providing a collaborative interface to control and manage the page.

15. The computer program product of claim 9, wherein the first object comprises a document associated with a collaborative activity of the first collaboration place and modifying the first object includes modifying the document.

16. The computer program product of claim 15, wherein generating the searchable attributes of the one or more objects comprises accessing the content of the document and generating the at least the portion of the searchable attributes based on the content of the document.

17. A computer implemented method comprising:

maintaining, by a server coupled to a data repository and capable of supporting a plurality of collaboration places, a database configured to store data for supporting the plurality of collaboration places, the data for supporting the plurality of collaboration places comprising user identifiers, place identifiers for the collaboration places, place participant identifiers identifying participants in the collaboration places;

establishing a persistently addressable first collaboration place responsive to a client instruction to establish the first collaboration place and storing a set of data supporting the first collaboration place, the set of data supporting the first collaboration place comprising a place identifier for the first collaboration place, user identifiers of authorized participants of the first collaboration place and one or more objects that are modifiable by clients, each of the one or more objects including content;

generating searchable attributes of the one or more objects, wherein generating the searchable attributes of the one or more objects comprises accessing the content of the one or more objects and generating at least a portion of the searchable attributes based on the content of the one or more objects;

enabling by the server a first client data connection with a first client and, responsive to a request associated with a first authorized user of the first collaboration place for a first object of the one or more objects, providing the first object to the first client for presentation in a user interface of the first client;

modifying the first object based on an instruction to modify the first object received via the first client data connection;

based on a modification of the first object, modifying the searchable attributes of the one or more objects by the server;

enabling by the server a second client data connection with a second client to provide the second client access to the one or more objects and the searchable attributes; and responsive to a request associated with a second authorized user of the first collaboration place for the first object of the one or more objects, providing by the server the first object to the second client for presentation in a user interface of the second client.

18. The method of claim 17, further comprising:

providing simultaneous access to the first object to the first client and the second client; and receiving at the server an indication from the first client of an editing location in the content of the first object;

modifying by the server a display of the first object to denote the editing location of the first client in the user interface of the second client; and sending an update by the server to the second client to update a presentation of the first object in the user interface of the second client based on the instruction to modify the first object from the first client, wherein the instruction to modify the first object is received by the server while the first object is simultaneously presented at the first client and the second client.

19. The method of claim 17, further comprising:

providing the first collaboration place within a page in a browser; and providing access to the one or more objects and the searchable attributes to the first authorized user via the page.

20. The method of claim 17, wherein the first object comprises a document associated with a collaborative activity of the first collaboration place, wherein the document includes document content, wherein modifying the first object includes modifying the document, wherein generating the searchable attributes of the one or more objects comprises accessing the document content and generating the at least the portion of the searchable attributes based on the document content.

* * * * *